United States Patent
Takahashi et al.

(10) Patent No.: US 8,218,414 B2
(45) Date of Patent: Jul. 10, 2012

(54) INFORMATION RECORDING MEDIUM, RECORDING METHOD, AND REPRODUCING METHOD

(75) Inventors: Yoshihisa Takahashi, Osaka (JP); Hiroshi Ueda, Nara (JP); Motoshi Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/061,871

(22) PCT Filed: Sep. 18, 2009

(86) PCT No.: PCT/JP2009/004709
§ 371 (c)(1),
(2), (4) Date: Mar. 2, 2011

(87) PCT Pub. No.: WO2010/035444
PCT Pub. Date: Apr. 1, 2010

(65) Prior Publication Data
US 2011/0170382 A1 Jul. 14, 2011

(30) Foreign Application Priority Data

Sep. 29, 2008 (JP) ................. 2008-250150
Nov. 4, 2008 (JP) ................. 2008-283432
Dec. 2, 2008 (JP) ................. 2008-307389

(51) Int. Cl.
*G11B 7/00* (2006.01)

(52) U.S. Cl. ......................................... 369/94

(58) Field of Classification Search .............. 369/116, 369/275.3, 44.27, 47.51, 47.53, 94, 275.2
See application file for complete search history.

(56) References Cited

U.S. PATENT DOCUMENTS

2004/0264317 A1 12/2004 Lee
(Continued)

FOREIGN PATENT DOCUMENTS

JP 2004-327038 A 11/2004
(Continued)

OTHER PUBLICATIONS

Illustrated Blu-ray Disc Reader published by Ohmsha, Ltd., Dec. 10, 2006, p. 137 with concise explanation and partial English translation.

(Continued)

*Primary Examiner* — Nabil Hindi
(74) *Attorney, Agent, or Firm* — Renner, Otto, Boisselle & Sklar, LLP

(57) ABSTRACT

Minimized is the influence which is exerted by recording calibration (test recording) such as power calibration, strategy calibration or the like, performed in an area for recording calibration (recording calibration area or test area) provided in each of a plurality of recording layers, on recording calibration performed in the other recording layers.

On a recording medium, data is recorded on at least one of a plurality of recording layers by laser light incident on a surface of the recording medium. The plurality of recording layers include a first recording layer, and second through N-th recording layers (N is an integer of 3 or greater) which are sequentially located in a direction from the first recording layer toward the surface on which the laser is incident. The plurality of recording layers each have a first calibration area and a second calibration area located outer to the first calibration area. The first calibration area located in each of the first through N-th recording layers is located at a different radial position from a radial position of the first calibration area in each of the other recording layers; and the second calibration area located in each of the first through N-th recording layers is located at the same radial position as a radial position of the second calibration area in each of the other recording layers.

6 Claims, 36 Drawing Sheets

U.S. PATENT DOCUMENTS

| | | |
|---|---|---|
| 2004/0264339 A1 | 12/2004 | Miyagawa et al. |
| 2005/0025013 A1 | 2/2005 | Yamamoto |
| 2007/0159942 A1 | 7/2007 | Takeshita et al. |
| 2008/0056093 A1 | 3/2008 | Ishida |
| 2008/0291798 A1 | 11/2008 | Takeshita et al. |
| 2009/0323493 A1* | 12/2009 | Ohkubo et al. .................. 369/94 |

FOREIGN PATENT DOCUMENTS

| | | |
|---|---|---|
| JP | 2005-038584 A | 2/2005 |
| JP | 2005-285254 A | 10/2005 |
| JP | 2007-066398 | 3/2007 |
| JP | 2007-521606 T | 8/2007 |
| JP | 2007-305188 A | 11/2007 |
| WO | 2006/035721 A1 | 4/2006 |

OTHER PUBLICATIONS

White paper, Blu-ray Disc Format, General, Aug. 2004, pp. 1-37.
White paper, Blu-ray Disc Format, 3. File System Specifications for BD-RE, R, ROM, Aug. 2004, pp. 1-6.
White paper, Blu-ray Disc Format, 4. Key Technologies, Aug. 2004, pp. 1-8.
International Search Report for corresponding International Application No. PCT/JP2009/004709 mailed Sep. 29, 2009.
Form PCT/ISA/237 and partial English translation for International Application No. PCT/JP2009/004709 dated Sep. 29, 2009.
Supplementary European Search Report for corresponding European Application No. EP 09 81 5866 dated Mar. 28, 2012.

* cited by examiner

LASER LIGHT

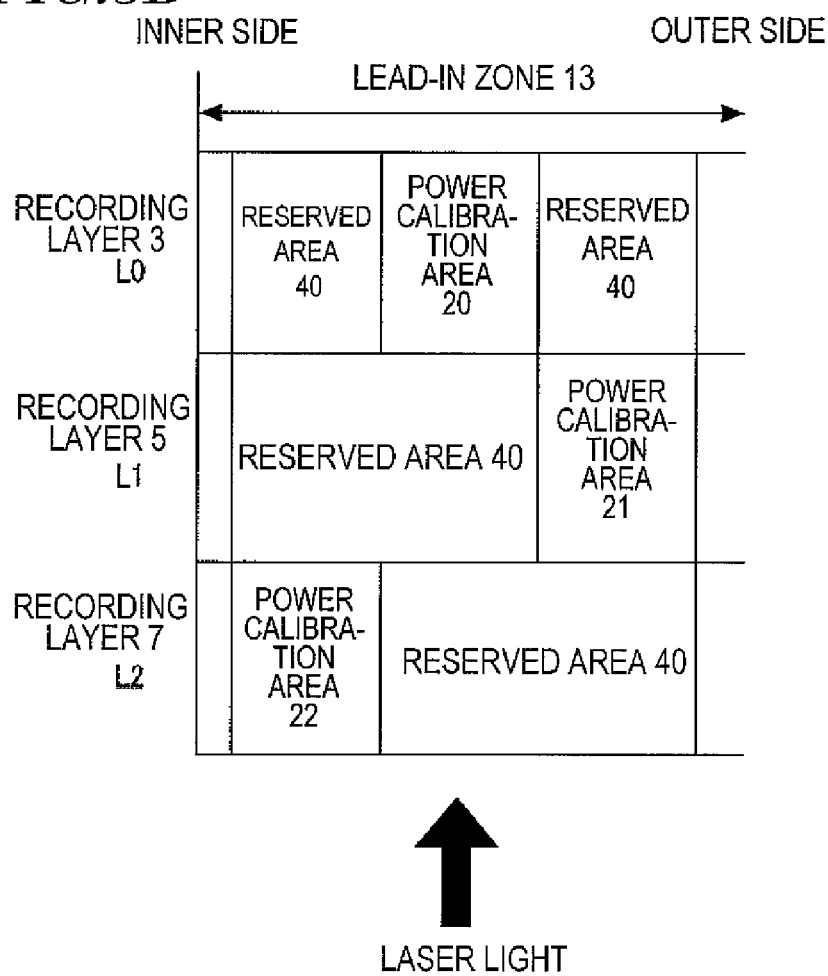

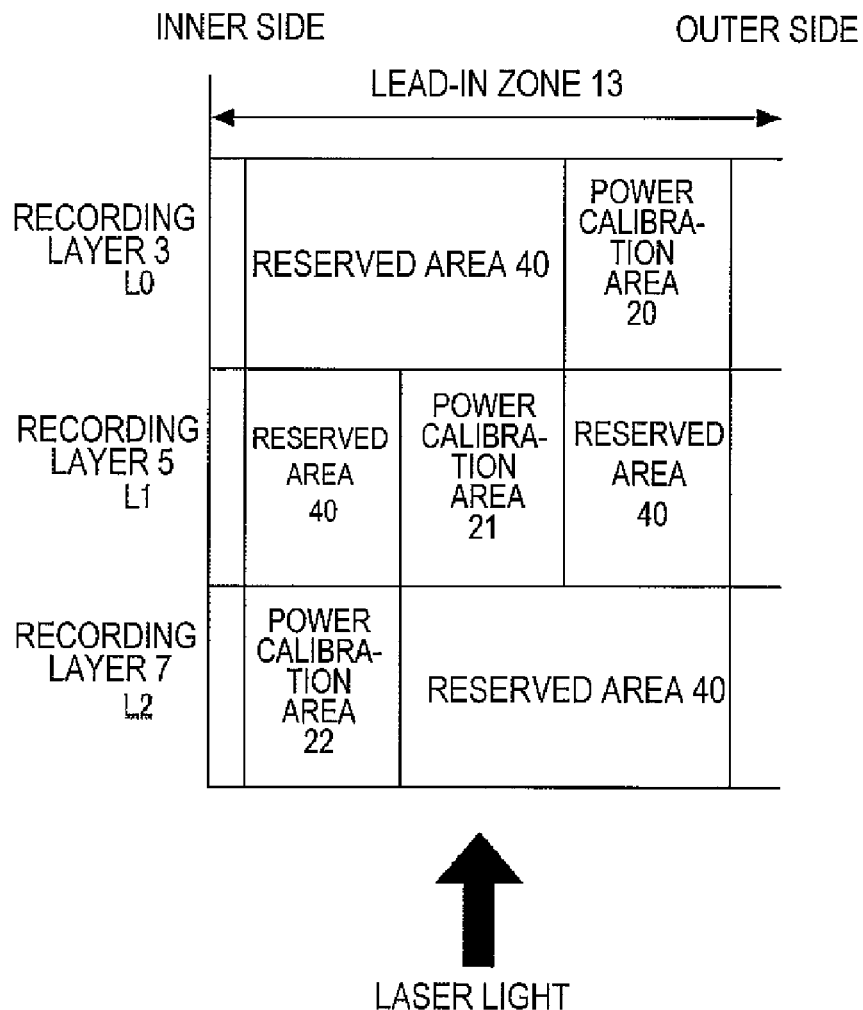

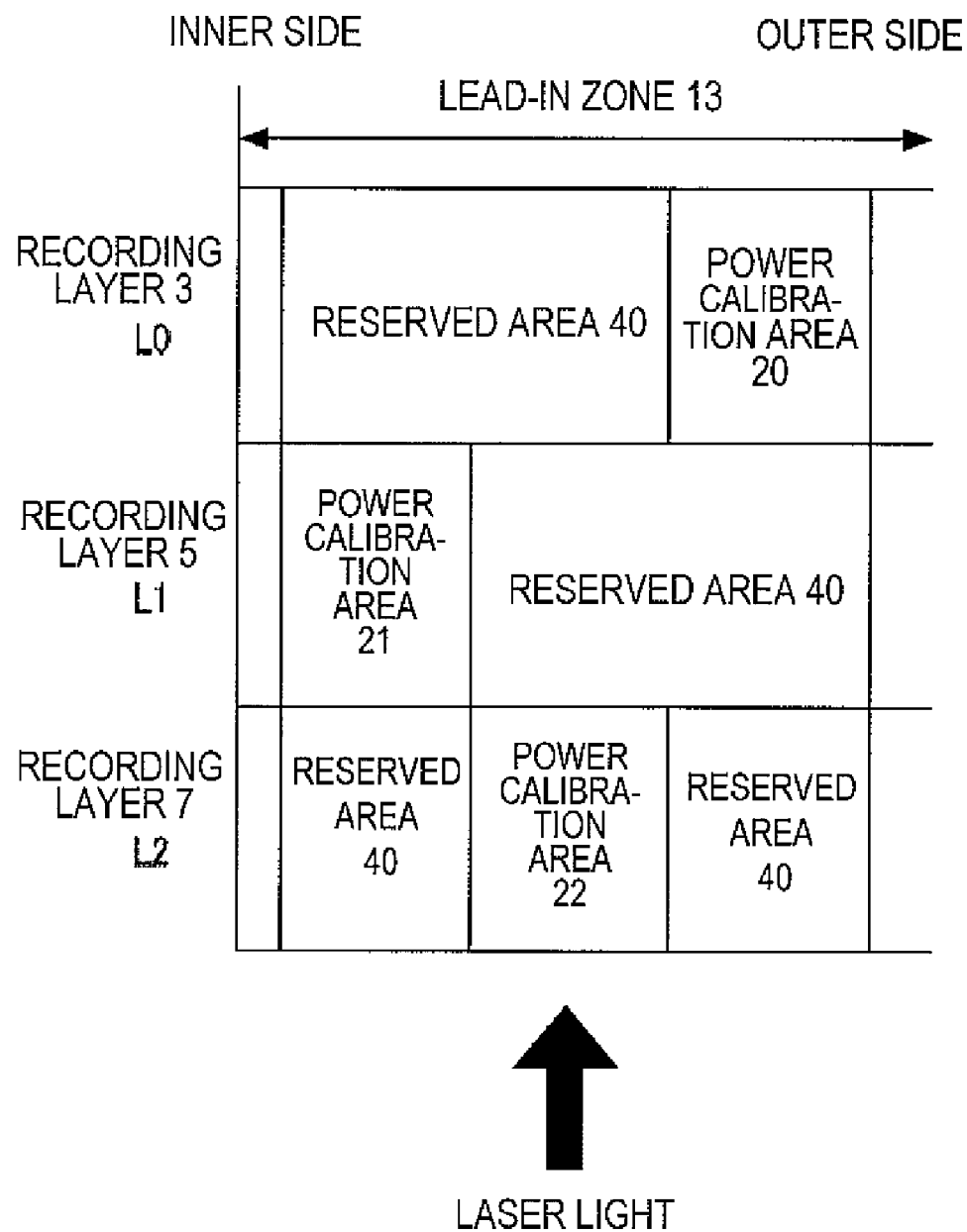

FIG.20
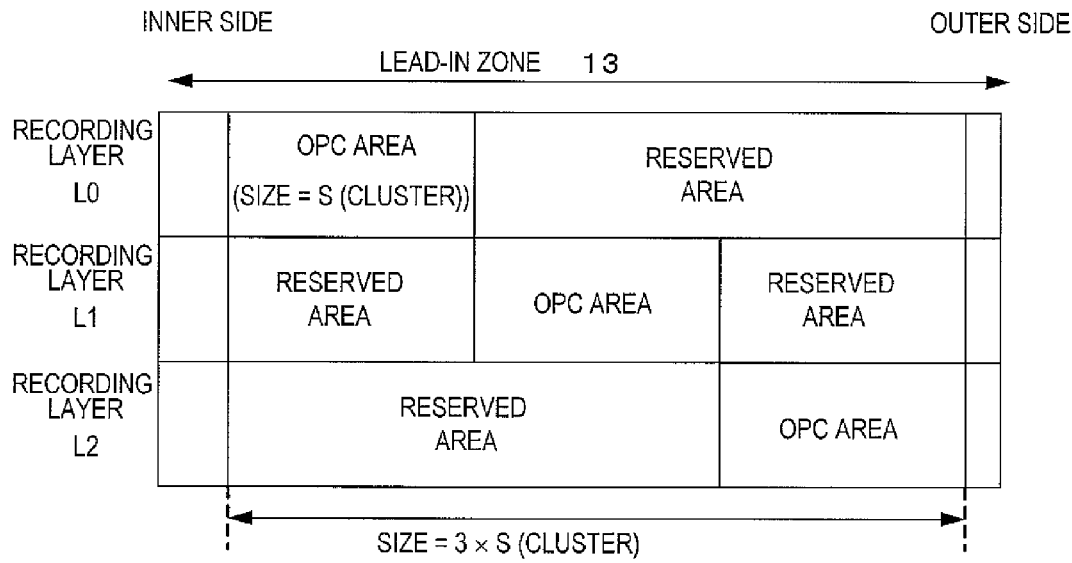
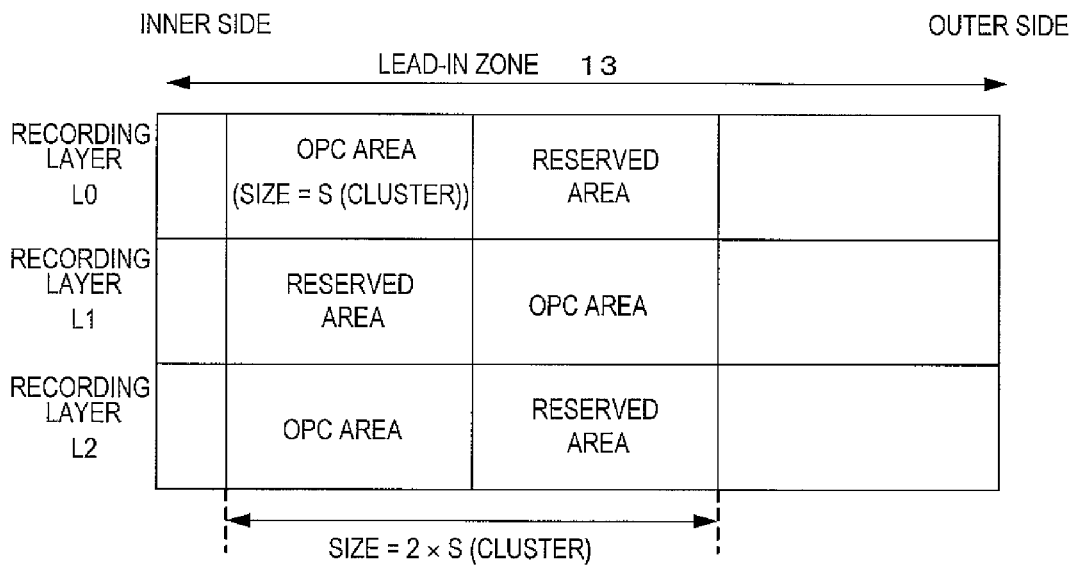

FIG.23
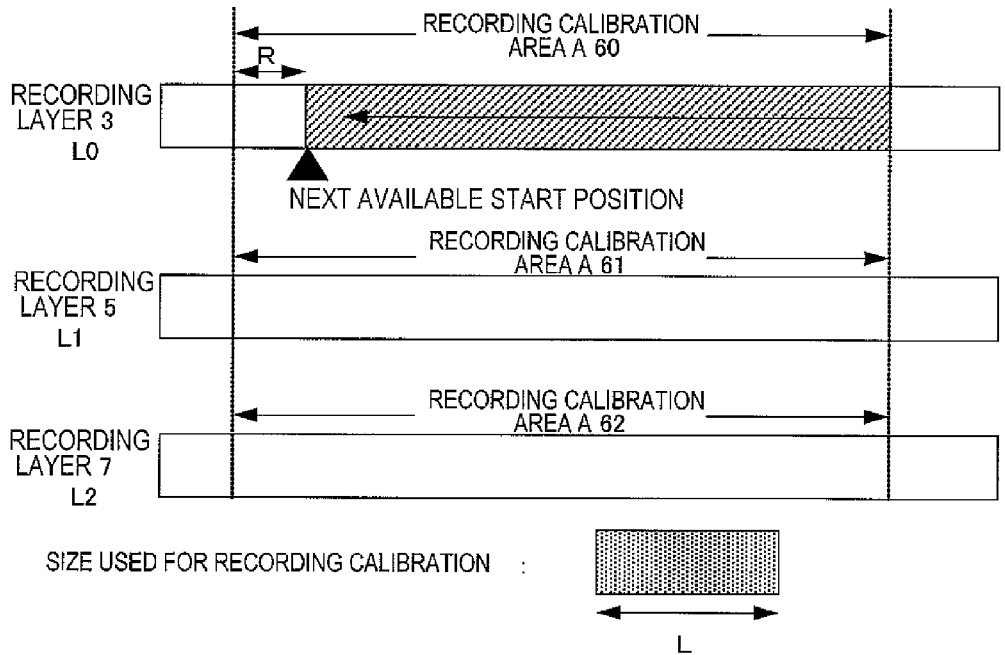
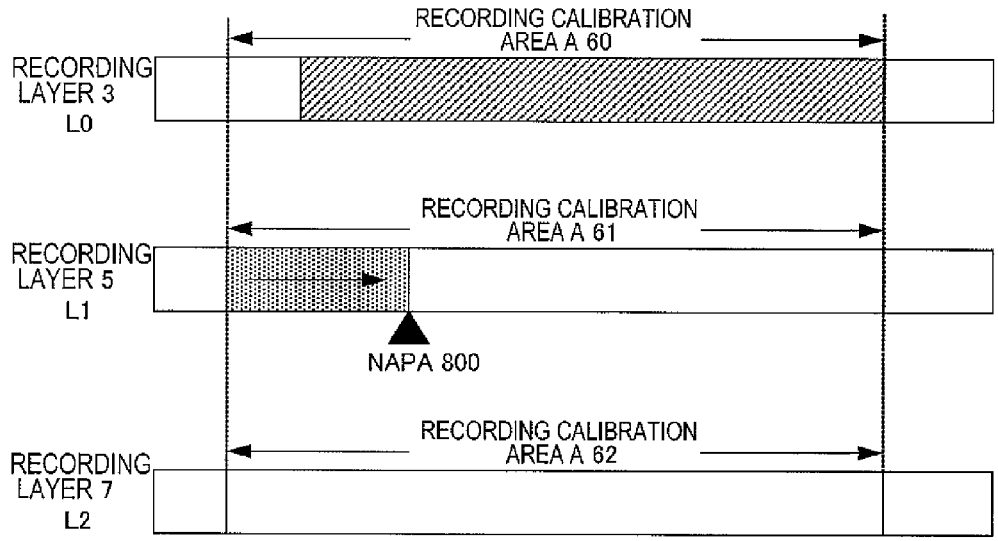

FIG.35
(A) CONVENTIONAL RECORDING DENSITY DISC A
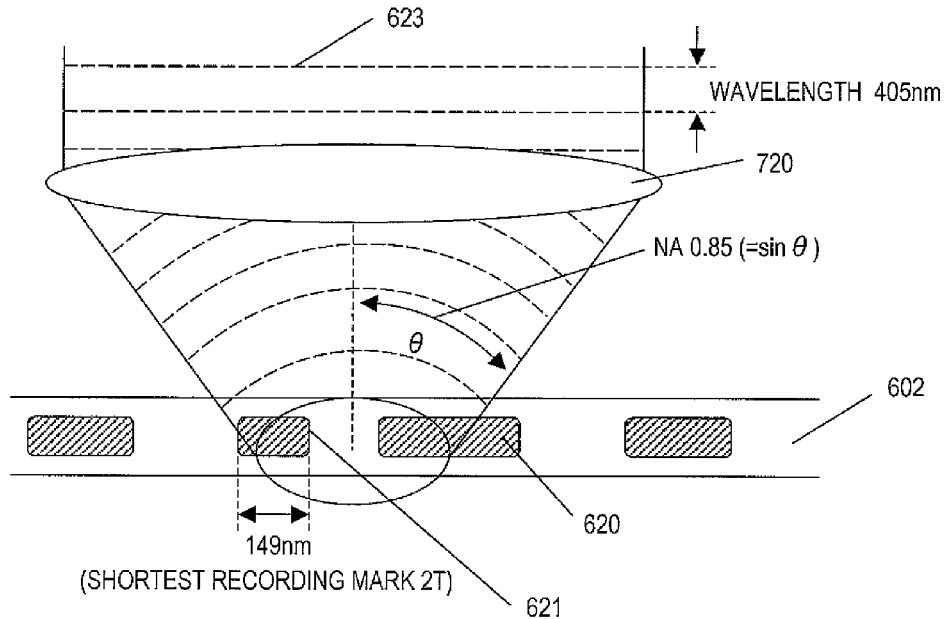
(B) HIGH RECORDING DENSITY DISC B
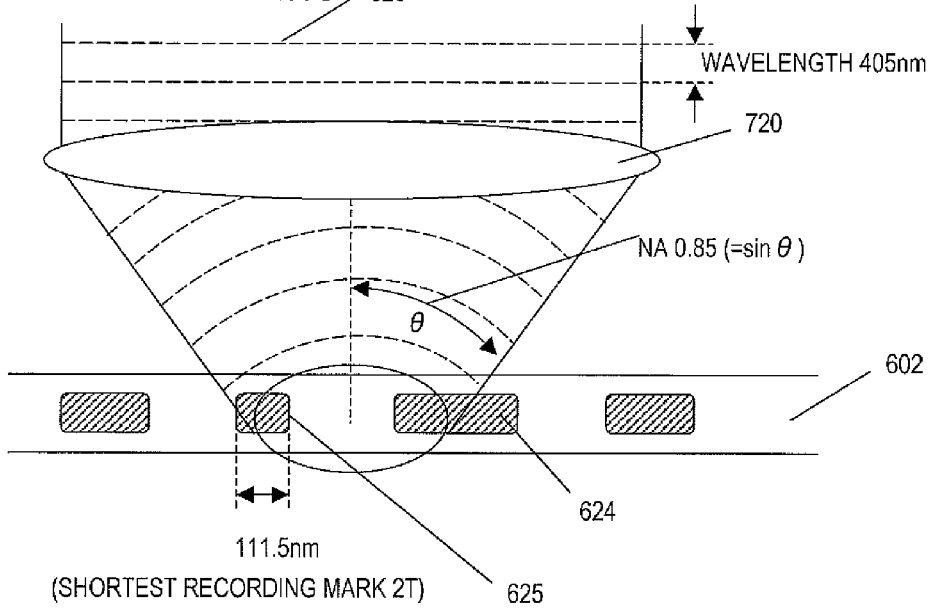

602    621    630

INFORMATION RECORDING MEDIUM, RECORDING METHOD, AND REPRODUCING METHOD

TECHNICAL FIELD

The present invention relates to an information recording medium including a plurality of recording layers having an area for recording adjustment (i.e., recording calibration), and a recording and reproduction method and a recording and reproduction apparatus for such a recording medium. More specifically, the present invention relates to an information recording medium, including a plurality of recording layers, which is effective for a write once optical disc such as a BD-R, a rewritable optical disc such as a BD-RE and the like, and an recording and reproduction method and an recording and reproduction apparatus using such an information recording medium.

BACKGROUND ART

Recently, large-capacity and exchangeable information recording mediums and disc drives used for the same are in wide use.

As conventional large-capacity and exchangeable information recording mediums, optical discs including DVDs and Blu-ray discs (hereinafter, also referred to as "BDs") are well known. An optical disc drive apparatus performs recording or reproduction by forming tiny pits (recording marks) on an optical disc using laser light, and is suitable for large-capacity and exchangeable information recording. DVDs are characterized by using red laser light, and BDs are characterized by using blue laser light having a wavelength shorter than that of red laser light. Owing to this, BDs have a higher recording density to realize a larger capacity than DVDs.

Moreover, in recent years, multi-layer optical discs, namely, optical discs including a plurality of recording layers have been actively developed for further increasing the capacity. As DVDs and BDs, two-layer discs including two recording layers are already on the market. In the future, discs including a larger number of layers, such as a six-layer or eight-layer discs, are expected to be available.

FIG. 1 is a conceptual view of a three-layer optical disc including three recording layers. An optical disc 1 includes a substrate 2, and recording layers 3, 5 and 7 stacked on the substrate 2. Between the recording layers, intermediate layers 4 and 6 having a role of protecting the recording layers are provided, and a surface of the disc is covered with a cover layer 8 formed of a polycarbonate resin or the like. Optical laser light is directed from the side of the cover layer 8, which is the disc surface. The recording layer formed in contact with the substrate 2, i.e., the recording layer farthest from the disc surface is used as the reference layer. The recording layers are numbered orderly from the reference layer; i.e., the recording layer 3 is called L0 layer, the recording layer 5 is called L1 layer, and the recording layer 7 is called L2 layer. Hereinafter, in this specification, this manner of labeling will be adopted. This manner of labeling is merely an example, and there are occasions where the recording layers are called L0 layer, L1 layer, etc. from the recording layer closest to the disc surface.

FIG. 2 shows an area arrangement of a recording layer of a general optical disc. On a recording layer of a discus-shaped optical disc 1, a great number of tracks 11 are formed spirally. In each track 2, a great number of tiny blocks 12 are formed.

The width of the track 11 (track pitch) is, for example, 0.32 µm in the case of a BD. The block 12 is an error correction unit, and is a minimum unit by which a recording or reproduction operation is performed. The block 12 has a size of, for example, 1ECC (size: 32 kbytes) in the case of a DVD and 1 cluster (size: 64 kbytes) in the case of a BD. In terms of "sector" (size: 2 kbytes), which is the minimum unit of data of an optical disc, ECC and cluster are represented as 1ECC=16 sectors and 1 cluster=32 sectors.

Each recording layer includes a lead-in zone 13, a data zone 14 and a lead-out zone 15.

The data zone 14 is a zone where the user can record any information, for example, real-time data of music or video, computer data such as sentences, data bases or the like.

The lead-in zone 13 is positioned inner to the data zone 14 along a radial direction of the optical disc 1. The lead-out zone 15 is positioned outer to the data zone 14 along the radial direction of the optical disc 1. These zones include an area usable for recording management information on the optical disc 1 (DMA area or temporary DMA area), an area usable for adjusting a recording power, etc. (OPC (Optimum Power Control) area) and the like. These zones also have a role of preventing overrun of an optical pickup (not shown).

On such an optical disc, it is important to record information with an optimal recording condition (for example, recording power, and for example, pulse generation timing and pulse length called "strategy", and the like) from the viewpoint of the recording and reproduction quality. For realizing this, trial recording (hereinafter, referred to as "recording calibration") is widely performed in a prescribed area of the optical disc to find the optimal power and strategy (for example, Patent Document No. 1).

Recording calibration is performed in a recording calibration area (hereinafter, referred to also as an "OPC area") included in the lead-in zone 13, the lead-out zone 15 or the like.

FIG. 18 shows a flow of a general recording calibration procedure.

Step 1801: The recording power is adjusted (hereinafter, referred to "power calibration"). Specifically, recording is performed while changing the recording power step by step (step-by-step recording), the recording quality of the recorded area (for example, modulation degree or BER (Block Error Rate), etc.) is measured, and an optimal power at which the recording quality is optimal is found.

Step 1802: The recording strategy is adjusted while the recording power is fixed (hereinafter, referred to as "strategy calibration"). Specifically, recording is performed while changing the pulse width with the recording power being fixed at the optimal power found in step 1801, the recording quality of the recorded area is measured, and an optimal strategy at which the recording quality is optimal is found.

On an optical disc such as a BD, data is recorded by irradiating the recording layer with laser light to change the recording layer, for example, from an amorphous state to a crystalline state. Since the state of the recording layer is changed in this manner, the transmittance and reflectance of the light (i.e., optical characteristics) are changed. Namely, a recorded area and a non-recorded area have different optical characteristics.

Therefore, when an optimal recording power is found by power calibration for an optical disc including two or more recording layers, the power found for one recording layer varies depending on the recording state of the other recording layer (either already recorded or unrecorded). Specifically, the following may occur, for example: recording is performed with an excessively large power while adjusting the recording power, and as a result, the area used for the calibration is destroyed, which influences the recording characteristic of the other recording layer corresponding to the destroyed area.

Even if an excessively large power sufficient to destroy an area is not used, the transmittance varies by the magnitude of the power used for the recording. Especially, an area in which recording has been performed with a power not suitable to the optical disc allows the transmittance to vary more than, and is more likely to be influenced by the transmittance balance than, an area in which recording has been performed with a suitable power.

In a multi-layer disc, the transmittance of the laser light is varied by the recording state of the recording layer passed by the laser light. Therefore, the recording characteristics of a second recording layer counted from the surface on which laser light is incident or a recording layer(s) deeper than the second recording layer (farther from the laser light incidence surface than the second layer) are varied by the recording state of the recording layer closer to the laser light incidence surface, even on the same recording layer. Especially, in the case of power calibration by which recording is performed while changing the power, recording may possibly be performed at a recording power exceeding the range suitable to the optical disc in order to find an optimal recording power. An area in which power calibration has been performed is one of areas which influence the transmittance most.

Therefore, when laser light for recording information on a recording layer passes an area of another, shallower layer which has been used for power calibration, the laser light is significantly influenced by the transmittance balance of the another layer. From the recording quality of an area in which recording has been performed with a transmittance in such a varied state, an optimal power cannot be correctly obtained. As a method for avoiding these problems, a method of restricting the locations of OPC areas is well known (for example, Patent Document No. 2 and Patent Document No. 3).

FIG. 19 shows locations of the OPC areas in an optical disc including two recording layers. A first recording calibration area 200 provided in the recording layer L0 and a second recording calibration area 201 provided in the recording layer L1 are located at different radial positions. In addition, an area of the other layer existing between the recording calibration area and the disc surface (the laser light incidence surface) is secured as a reserved area 210 (unused area). In the example of FIG. 19, an area of the recording layer L1 at the same radial position as that of the first recording calibration area 200 (an area of the recording layer L1 corresponding to the first recording calibration area 200) is secured as the reserve area 210 (unused area). In the case of a write once medium on which recording can be performed only once, an unused area, i.e., a reserved area is in an unrecorded state. Therefore, regardless of the recording layer in which the recording calibration area is to be used, the laser light does not pass any recorded area before reaching the recording calibration area. Thus, the recording calibration area is not influenced by the transmittance of the other recording layer, and recording calibration can be always performed under the same conditions.

In consideration of a recording medium including more than two recording layers, Patent Document No. 3, for example, provides a case where an OPC area in an odd-numbered recording layer and an OPC area in an even-numbered recording layer adjacent to the odd-numbered recording layer are located at different radial positions. Namely, the OPC areas in odd-numbered recording layers or the OPC areas in the even-numbered recording layers may be located at the same radial position. Alternatively, the OPC areas may be located at different radial positions in all the recording layers.

CITATION LIST

Patent Literature
Patent Document No. 1: Japanese Laid-Open Patent Publication No. 2007-305188
Patent Document No. 2: Japanese Laid-Open Patent Publication No. 2005-038584
Patent Document No. 3: PCT National Phase Japanese Laid-Open Patent Publication 2007-521606

SUMMARY OF INVENTION

Technical Problem
With this method, however, the following problem occurs when the number of recording layers increases. The most serious problem is that as the number of recording layers increases, it becomes difficult to securely obtain OPC areas and reserved areas.

FIGS. 20(A) and 20(B) show locations of OPC areas in an optical disc including three recording layers arranged by the conventional method. For the convenience of description, the OPC areas in all the recording layers have the same size (for example, S cluster). As shown in FIG. 20(A), when the OPC areas are located at different radial positions among all the three layers, the size of 3×S cluster is necessary for each layer. Among this size, the 2×S cluster areas corresponding to the reserved areas are not usable. Considering that the size of each of the lead-in zone 13 and the lead-out zone 15 is limited, as the number of layers increases, the size of the reserved areas, i.e., the unusable areas increases. In addition, as the number of recording layers increases, the size of the reserved areas increases, and so it is expected to be difficult to securely obtain the OPC area in the lead-in zone or the lead-out zone.

As shown in FIG. 20(B), when the OPC areas in the odd-numbered recording layers or in the even-numbered recording layers are located at the same radial position, the required size is 2×S as in the case of an optical disc including two recording layers. However, in this case, the problem that the power found is varied by the recording state of another recording layer cannot be solved.

There is another method, by which the size of the lead-in zone 13 or the lead-out zone 15 is increased in order to obtain the OPC areas. However, as the size of these zones increases, the size of the data zone 14 is decreased accordingly. When the size of the data zone 14 is decreased in order to obtain the size of the OPC areas, the capacity usable for recording user data is decreased, which is disadvantageous to the user. Therefore, it is preferable that the lead-in zone 13 and the lead-out zone 15 are as small as possible.

In order to obtain the OPC areas at different radial positions in all the layers as in FIG. 20(A), it is conceivable to decrease the size of the OPC areas. This can suppress the ratio of the OPC area (and the reserved area) with respect to the lead-in zone 13 or the lead-out zone 15. However, as the size of the OPC areas is decreased, the number of times the recording calibration can be performed is decreased accordingly. In general, on mediums (recording layers) for which recording calibration cannot be performed, recording of information is often prohibited because the recording power or the like cannot be guaranteed to be suitable to such mediums. When the size of the OPC area is decreased and so recording calibration is made impossible, recording cannot be performed anymore. This provides disadvantages to the user at a high possibility and is not preferable.

The present invention made in light of the above-described problems has an object of minimizing the influence which is exerted by recording calibration (test recording) such as power calibration, strategy calibration or the like, performed in an area for recording calibration (recording calibration area or test area) provided in each of a plurality of recording layers, on recording calibration performed in the other recording layers. Another object of the present invention is to provide an information recording medium having an area arrangement by which recording calibration areas are efficiently located in a lead-in zone and a lead-out zone to prevent an increase of the lead-in zone or the lead-out zone and a decrease of a (user) data zone, and a method for using the same.

Solution to Problem

An information recording medium according to the present invention is an information recording medium in which data is recorded on at least one of a plurality of layers by laser light incident on a surface of the information recording medium. The plurality of recording layers include a first recording layer, and second through N-th recording layers (N is an integer of 3 or greater) which are sequentially located in a direction from the first recording layer toward the surface on which the laser is incident; each of the plurality of recording layers has a first calibration area and a second calibration area located outer to the first calibration area; the first calibration area located in each of the first through N-th recording layers is located at a different radial position from a radial position of the first calibration area in each of the other recording layers; and the second calibration area located in each of the first through N-th recording layers is located at the same radial position as a radial position of the second calibration area in each of the other recording layers.

A varying rate width of a recording power used for the second calibration area may be equal to or smaller than a varying rate width of a recording power used for the first calibration area.

The first through N-th recording layers may be each assigned physical addresses; the physical addresses in the first recording layer may be assigned in an ascending order from an inner side toward an outer side, the physical addresses in the second recording layer may be assigned in an ascending order from the outer side toward the inner side, and the physical addresses in the third recording layer may be assigned in an ascending order from the inner side toward the outer side; and the first calibration area and the second calibration area located in the first recording layer may be used from the outer side toward the inner side, the first calibration area and the second calibration area located in the second recording layer may be used from the inner side toward the outer side, and the first calibration area and the second calibration area located in the third recording layer may be used from the outer side toward the inner side.

A recording method according to the present invention is for recording information on the above-described information recording medium and comprises the steps of performing recording calibration in at least one of the first calibration area and the second calibration area; and recording information on the information recording medium based on a result of the recording calibration.

A reproduction method according to the present invention is for reproducing information from the above-described information recording medium. At least one of the first through N-th recording layers of the information recording medium has a control area in which information on the information recording medium is recorded. The reproduction method comprises the step of reproducing information on the information recording medium from the control area.

A recording method according to the present invention is for recording information on the above-described information recording medium. Each of the plurality of recording layers has a recording calibration area usable for performing recording calibration to find an optimal recording condition; and by the recording method, the recording calibration is performed only on a k-th (k is an integer of 1 or greater and N or smaller) recording layer at the timing when recording is performed on the k-th recording layer for the first time.

Advantageous Effects of Invention

On a recording medium including a plurality of recording layers, an area provided for performing recording power calibration or other type of calibration, by which recording is conducted at a recording power not guaranteed to be an optimal recording power while changing the recording power and thus significantly influences the transmittance of the laser light passing the area, and an area provided for strategy calibration or other type of calibration, by which recording is conducted at a recording power fixed to the optimal power and thus does not much influence the transmittance of the laser light passing the area, are separated from each other. In addition, the area provided for performing the calibration at a recording power which is not guaranteed to be an optimal recording power while changing the recording power is located at a different radial position among different recording layers. Owing to this, the size of the area required by the OPC area (and the reserved area) for recording calibration is suppressed to be minimum, and also the influence on the calibration results of other recording layers can be minimized.

BRIEF DESCRIPTION OF DRAWINGS

FIG. 3D shows a modification of the area arrangement of the optical disc.

FIG. 3E shows a modification of the area arrangement of the optical disc.

FIG. 3F shows a modification of the area arrangement of the optical disc.

FIG. 20 shows an area arrangement of an optical disc including three recording layers to which the conventional art is applied.

FIG. 23 shows how to use the recording calibration areas A of the optical disc according to Embodiment 4 of the present invention.

FIG. 35(A) shows an example of a 25 GB BD, and FIG. 35(B) shows an example of an optical disc having a higher recording density than that of the 25 GB BD.

DESCRIPTION OF EMBODIMENTS

Hereinafter, embodiments of an information recording medium, and an apparatus and a method for performing information recording and/or information reproduction according to the present invention will be described with reference to the attached drawings.

In the embodiments of the present invention, a write once information recording medium on which recording can be performed only once is used as an information recording medium.

(Embodiment 1)

(1) Area Arrangement

Figure 1:
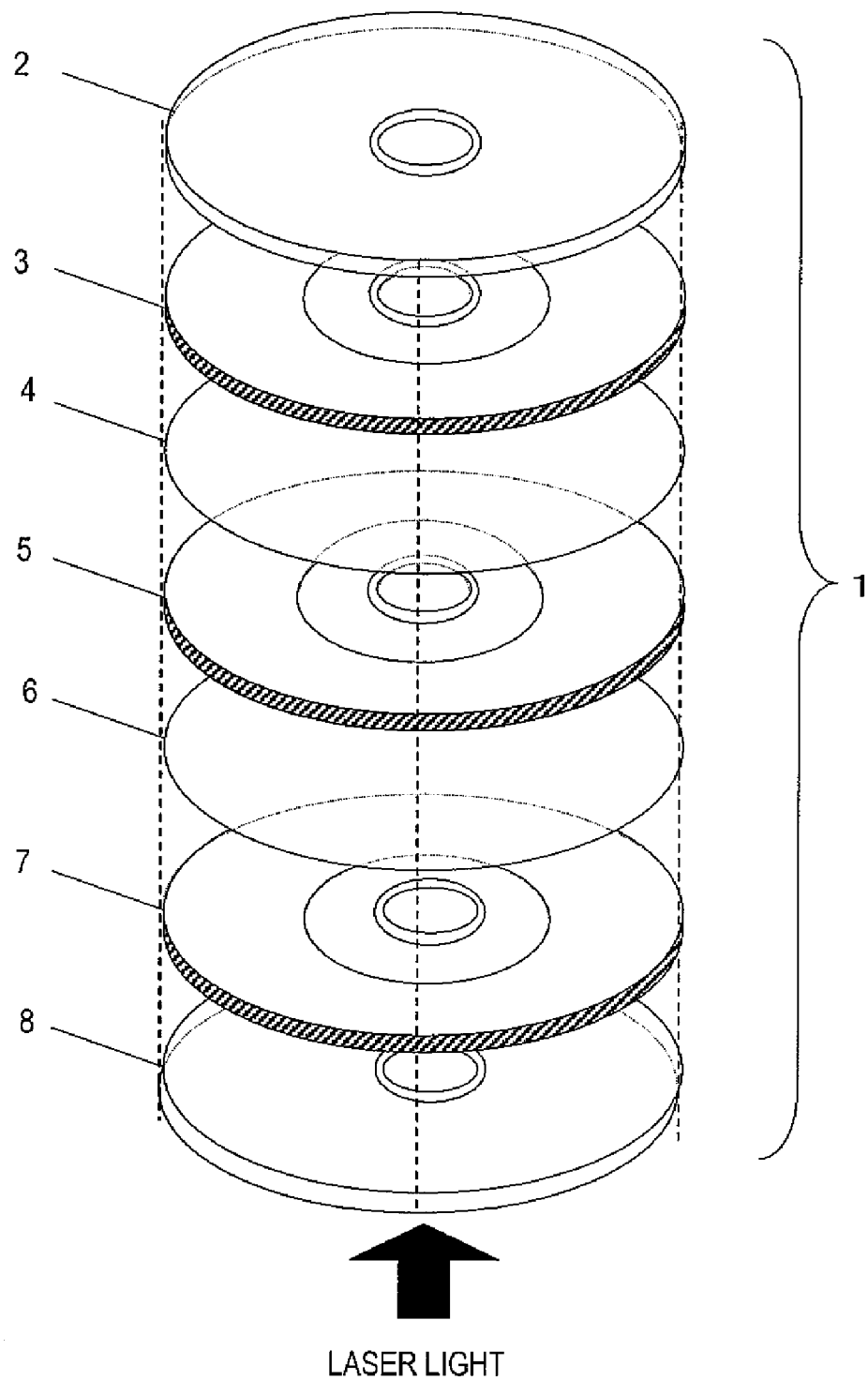
FIG. 1 is a structural view of a general optical disc including three recording layers.

FIG. 1 shows a stacking structure of a write once optical disc 1 including three recording layers.

As shown in FIG. 1, the optical disc 1 includes L0 layer (recording layer 3), L1 layer (recording layer 5) and L2 layer (recording layer 7) sequentially from the one farthest from a cover layer 8 of the optical disc 1 irradiated with the laser light (namely, sequentially from a substrate 2 toward the cover layer 8 on which the laser light is incident).

Figure 2:
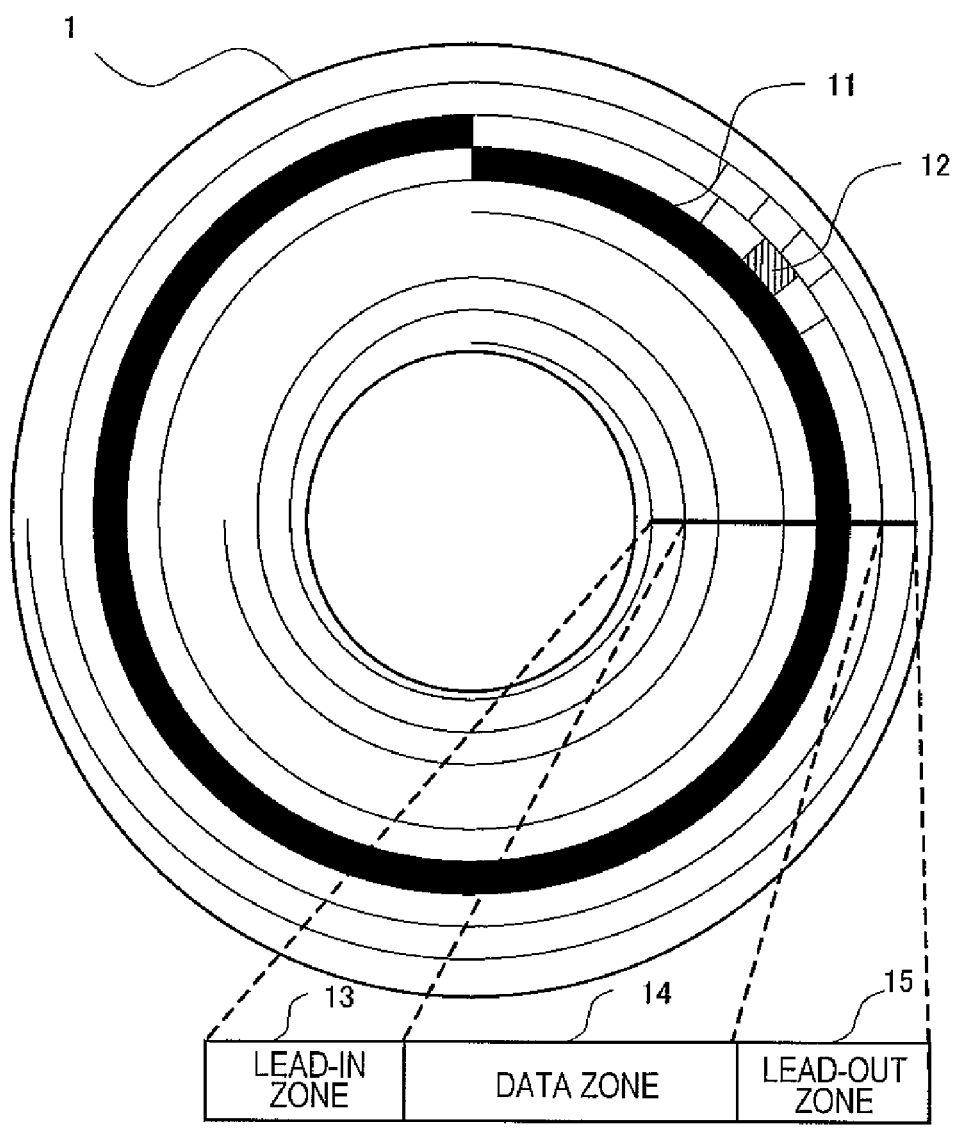
FIG. 2 shows a recording layer of a general optical disc.

As shown in FIG. 2, each recording layer includes a lead-in zone 13, a data zone 14 and a lead-out zone 15.

Figure 3A:
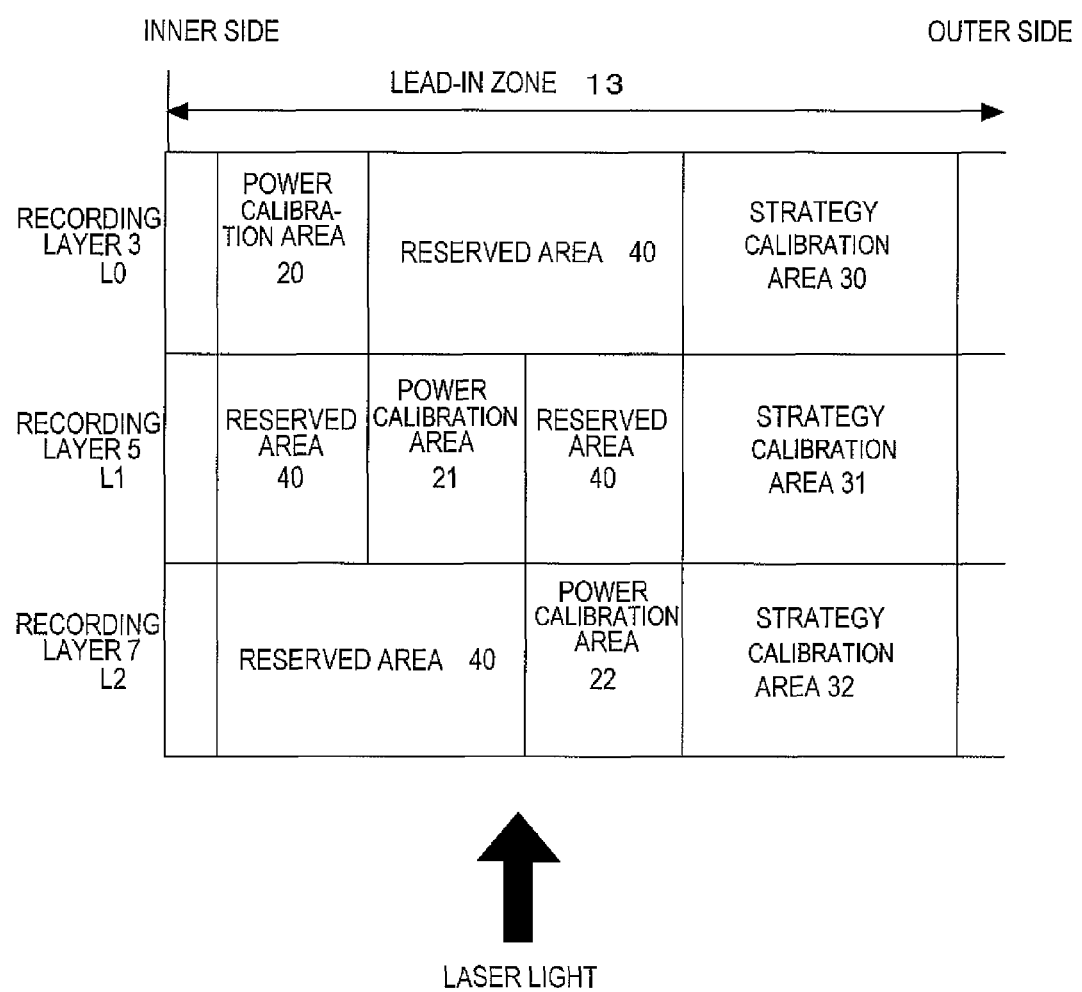
FIG. 3A shows an area arrangement of an optical disc according to Embodiment 1 of the present invention.

FIG. 3A shows an area arrangement of the write once optical disc 1 according to Embodiment 1 of the present invention. The write once optical disc 1 includes three recording layers. The lead-in zone 13 of each recording layer includes a power calibration area and a strategy calibration area each as an OPC area for recording calibration. In the example shown here, the L0 layer includes a power calibration area 20 and a strategy calibration area 30, the L1 layer includes a power calibration area 21 and a strategy calibration area 31, and the L2 layer includes a power calibration area 22 and a strategy calibration area 32. An area of one recording layer which is located at the same radial position as that of the power calibration area of another recording layer is assigned as a reserved area 40.

The power calibration area is an area usable for performing calibration of a recording power (power calibration). The power calibration area is mainly used for finding an optimal recording power by performing recording therein while, for example, changing the recording power. As shown in FIG. 3A, the power calibration area 20, the power calibration area 21 or the power calibration area 22 present in each recording layer is located so as not to include an area overlapping the power calibration area of another recording layer in the radial direction, i.e., is located at a different radial position from the power calibration area of another recording layer. The reason is, as described above, a difference in an optical characteristic such transmittance, reflectance or the like caused by the recording state of another recording layer (especially, the transmittance or reflectance in the case where an area of another recording layer located at an overlapping radial position was used for power calibration of performing recording while changing the recording power) significantly influences the recording power. The above setting is especially made such that an area of another recording layer which passes the laser light for recording calibration does not overlap an area which was used for power calibration of performing recording while changing the recording power. For example, the optical characteristic can be prevented from being varied by keeping constant the recording state of another recording layer (by putting the reserved area 40 into an unused state).

The strategy calibration area is an area usable for performing recording pulse width calibration (strategy calibration). The strategy calibration area is mainly used for finding an optimal strategy by performing recording therein while, for example, fixing the recording power at the recording power suitable to the optical disc 1 which was found by the power calibration and changing the pulse width. As shown in FIG. 3A, the strategy calibration area 30, the strategy calibration area 31 or the strategy calibration area 32 present in each recording layer is secured as a different area from the power calibration area, and is located so as to include an area overlapping the strategy calibration area of another recording layer in the radial direction, i.e., is located at the same radial position as the strategy calibration area of another recording layer as shown in FIG. 3A. Such an arrangement is made because the strategy calibration is performed after the power calibration, namely, after a recording power generally suitable to each recording layer is determined. The transmittance balance of an area having data recorded at a recording power generally suitable to the optical disc 1 is not largely destroyed, and the transmittance can be suppressed within a prescribed range in such an area. By strategy calibration, recording is performed at a recording power suitable to the optical disc 1. Therefore, even if recording is performed with laser light which was passed through an area of another recording layer in which strategy calibration was already performed, the transmittance of the current strategy calibration area is not substantially influenced by the recording state of the another recording layer (can be suppressed to a negligible level).

In FIG. 3A, the borders between the power calibration areas and the reserved areas of two adjacent recording layers are shown as being exactly the same radial position. In actuality, however, the borders do not need to be exactly the same radial position. The borders between the power calibration areas and the reserved areas of two adjacent recording layers may be deviated due to aligning errors of the recording layers made during the optical disc production, or influences of characteristics of laser light.

In Embodiment 1 of the present invention, an example in which the OPC areas for recording calibration are located in the lead-in zone 13 will be described. However, the present invention is not limited to this. The OPC area for recording calibration may be located in the lead-out zone 15 in addition to the lead-in zone 13, or either in the lead-in zone 13 or the lead-out zone 15 in each recording layer.

In this embodiment, the entire OPC areas (both of the power calibration area and the strategy calibration area) are located in the lead-in area 13. In this embodiment, however, each of the power calibration area and the strategy calibration area may be located at any position as long as both of the areas are located on the same recording layers. The reason for this is that the issue of this embodiment is the positional relationship among the power calibration areas respectively located on a plurality of recording layers and also the positional relationship among the strategy calibration areas respectively located on a plurality of recording layers. As long as the condition that the power calibration area and the strategy calibration area are both located on the same recording layer, it is not necessary that both of the areas are located in the same zone (the lead-in zone 13, the lead-out zone 15, etc.). For example, the power calibration area and the strategy calibration area may be separately located in different areas, such that the power calibration area is located in the lead-in zone 13 and the strategy calibration area is located in the lead-out zone 15.

Now, the reserved area 40 will be described. Until the power calibration area of one recording layer is used, the reserved area in another recording layer located between the one recording layer and the disc surface (the laser light incidence surface) is kept in an unused state. In the case of a write once optical disc, the reserved area 40 is kept in an unrecorded state.

The positions of the areas in FIG. 3A is merely an example, and the areas may be located at different positions.

For example, in FIG. 3A, the power calibration areas are sequentially located from the inner side in the L0 layer toward the outer side in the L2 layer. This is merely an example. Any area arrangement is sufficient as long as the following conditions are fulfilled: the power calibration areas are located at different positions among the recording layers; and an area located at a corresponding position to that of the power calibration area of another recording layer is in an unused state when the power calibration area of the another recording layer is in use. For example, the power calibration areas may be located in the recording layers as shown in FIGS. 3B through 3F. It is understood that in any of FIGS. 3B through 3F, the power calibration areas are located at different positions among different recording layers.

Figure 4:
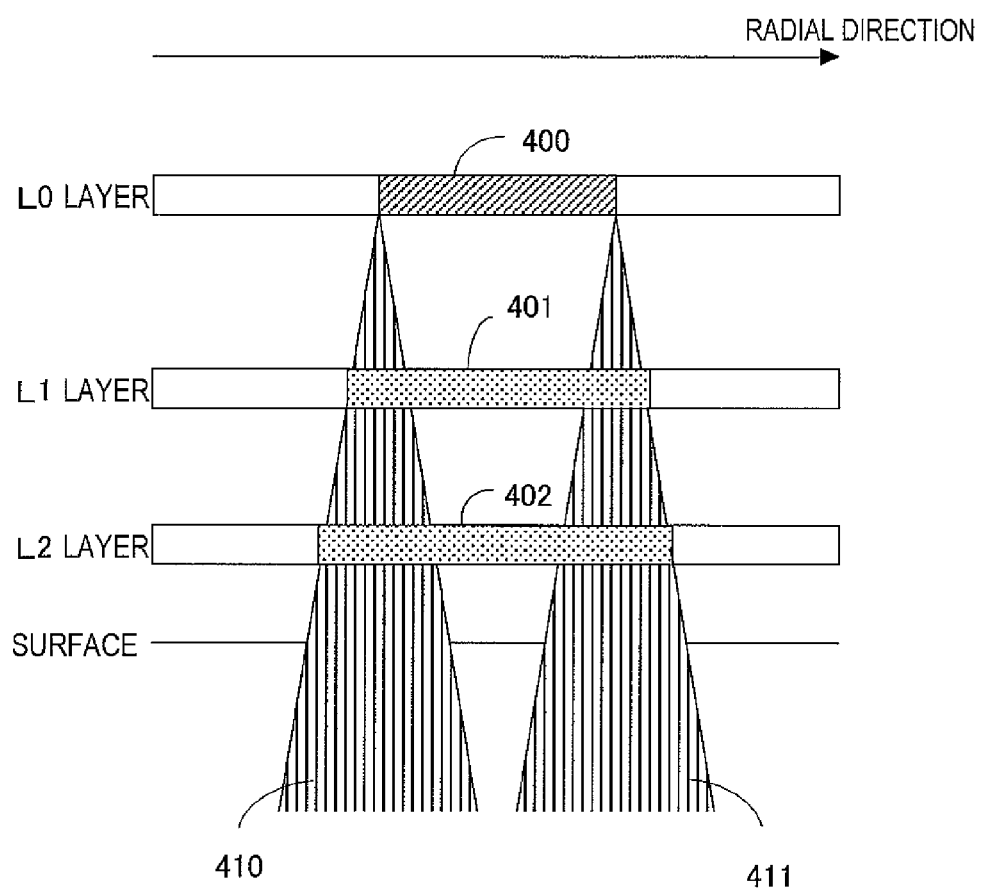
FIG. 4 shows a range influenced by laser light radiation according to Embodiments 1, 2, 3 and 4 of the present invention.

FIG. 4 shows the influence of laser light on each recording layer. For example, it is assumed that recording is performed in an area 400 of L0 layer continuously. Laser light is collected on L0 layer and moves between a range 410 and a range 411. Therefore, the information recording in the area 400 of L0 layer is influenced by the optical characteristic provided by the recording state of an area 401 of L1 layer and also by the optical characteristic provided by the recording state of an area 402 of L2 layer. When information is recorded on one recording layer, the area of the laser light transmitted through a recording layer is larger as the recording layer is shallower than the one recording layer (i.e., closer to the laser light incidence surface). Therefore, in order to keep constant the optical characteristics of the reserved area of such a shallower recording layer(s) to be transmitted by the laser light, namely, in order to keep the recording state of such a reserved area in an unused state, the reserved area needs to have a size at least approximately matching the expansion of the laser light on each of the shallower recording layer(s). For this reason, the actual arrangement of the power calibration areas need to be made in consideration of such an influence as well as the radial positions.

It should be noted that although the positions are not exactly the same in radial direction, but such influences will not be described unless otherwise specified in this specification, for the convenience of explanation. Namely, even where not explicitly described, the influence of the aligning errors and the expansion of the laser light should be considered. A person of ordinary skill in the art would expect how far such an influence is exerted and so could provide an arrangement of power calibration areas, reserved areas and strategy areas in consideration of such an influence. In this specification, the radial positions which are the same with the influence of the aligning errors and the expansion of the laser light being considered may be explicitly referred to the "same radial range positions" occasionally, and such "same radial positions" still include these influences.

As described above, a power calibration area is an area in which recording is performed at a recording power which is not guaranteed to be an optimal recording power while changing the recording power. The recording power used for the power calibration may possibly be stronger or weaker than the optimal recording power, and the transmittance of the laser light transmitted through the recorded power calibration area may not be constant (the transmittance balance may possibly be destroyed). Namely, in the case where in order to perform recording calibration on a recording layer, the laser light passes an area of another recording layer on which power calibration has already been performed, this may significantly influence the recording calibration results of, especially, a recording layer(s) deeper (farther) from the light incidence surface. By contrast, a strategy calibration area is an area in which recording is performed at an optimal recording power or a recording power which is guaranteed to generally suitable in order to find an optimal strategy or the like. Therefore, the influence of the transmittance caused by the recording state of the other recording layers is almost negligible.

As described in Embodiment 1 of the present invention, a power calibration area is located at a different radial position from the power calibration area of another recording layer, and a strategy calibration area is located at the same radial position among all the recording layers. Owing to such an arrangement, the recording calibration results of all the recording layers are protected against being influenced by the recording state of a different recording layer. In addition, the size of areas secured as OPC areas, which are required when the number of recording layers is increased (i.e., the total size of the power calibration area, the strategy calibration area and the reserved area(s)) can be suppressed to be minimum. As a result, an area necessary for recording calibration can be secured, and the problem that the number of times of usage by the user (=the number of times the recording calibration can be made) is decreased is solved. In addition, an increase of the size of the lead-in zone 13 or the lead-out zone 15 can be suppressed, and the problem that the size of the data zone 14 is decreased and the size of the area usable by the user is decreased can be solved.

The reserved area 40 is basically kept unused, but may be used depending on the conditions. Specifically, this area only needs to be unused until the power calibration area of another recording layer is used (in the case of a write once optical disc, unrecorded). Namely, after the power calibration area of the another recording layer located at the same radial position is used, this area is usable with no influence. Accordingly, for example, when a strategy calibration area is short of, or out of, capacity, the reserved area can be re-assigned and used as a strategy calibration area.

This is applicable to other areas as well as the reserved area 40. For example, when a power calibration areas is used up but the strategy calibration area still has some room left, a part of such a strategy calibration area may be re-assigned and used as a power calibration area, as long as the recording state of the other recording layers at the same radial position is in the same state (unused); or vice versa. The reserved areas may be used for other purposes than recording calibration, for example, for recording of updates of the management information or for storing inherent information of the recording apparatus which performed the recording.

(2) How to Use the Areas

In general, an access to the optical disc 1 is made using an address physically assigned on the recording layer (physical address; hereinafter, referred to simply as "PBA"). A physical address is roughly classified as one physically embedded in the form of a wobble or the like on the track 11 of the disc, i.e., on a wall surface of the recording groove; or as one provided in the data recorded on the disc. In this specification, the "physical address" indicates the former, namely, the one physically embedded using the wobble or the like of the recording groove, unless otherwise specified.

Physical addresses (PBAs) are sequentially assigned in an ascending order in the direction of the track path of the disc. More specifically, in the case of a two-layer recording disc including two recording layers (L0 layer and L1 layer), an addressing method called "opposite path" is generally used. Namely, physical addresses are assigned in an ascending order from the inner side toward the outer side in L0 layer, whereas physical addresses are assigned in an ascending order from the outer side toward the inner side in L1 layer.

Figure 3B:
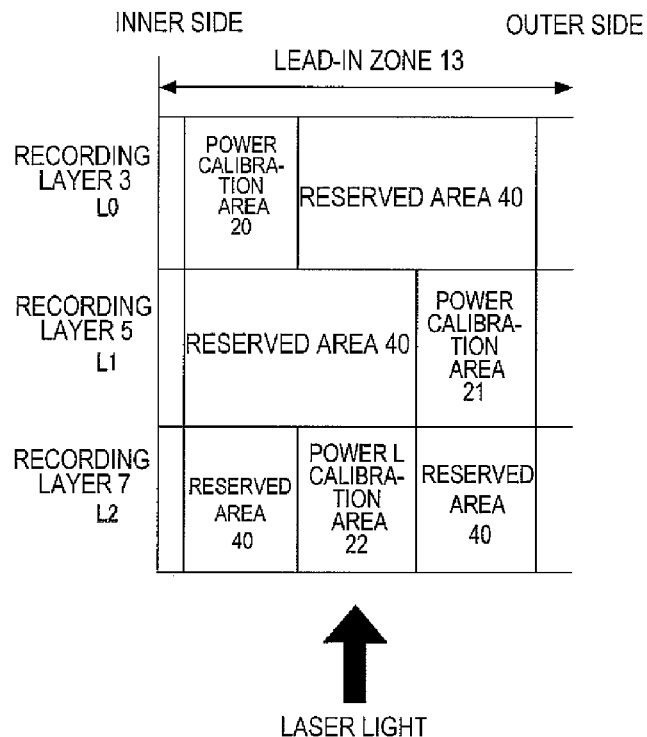
FIG. 3B shows a modification of the area arrangement of the optical disc.
Figure 3C:
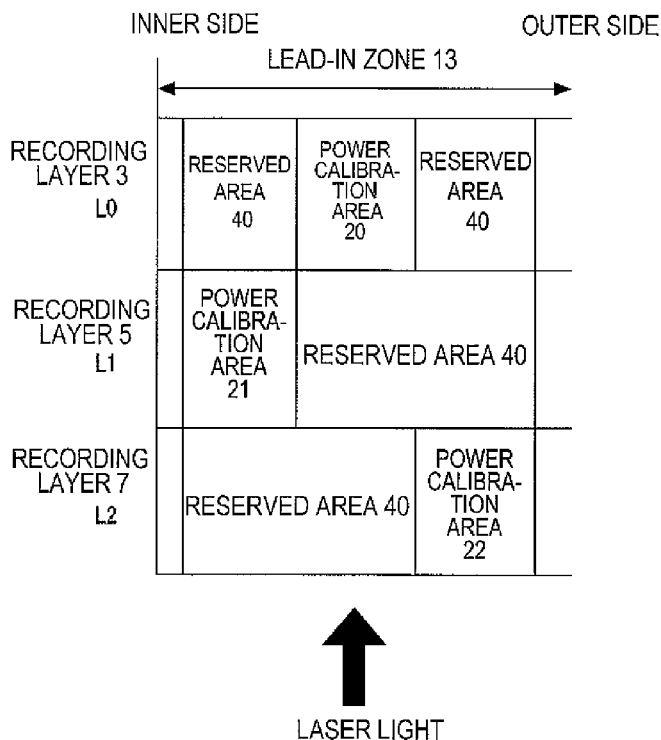
FIG. 3C shows a modification of the area arrangement of the optical disc.
Figure 5:
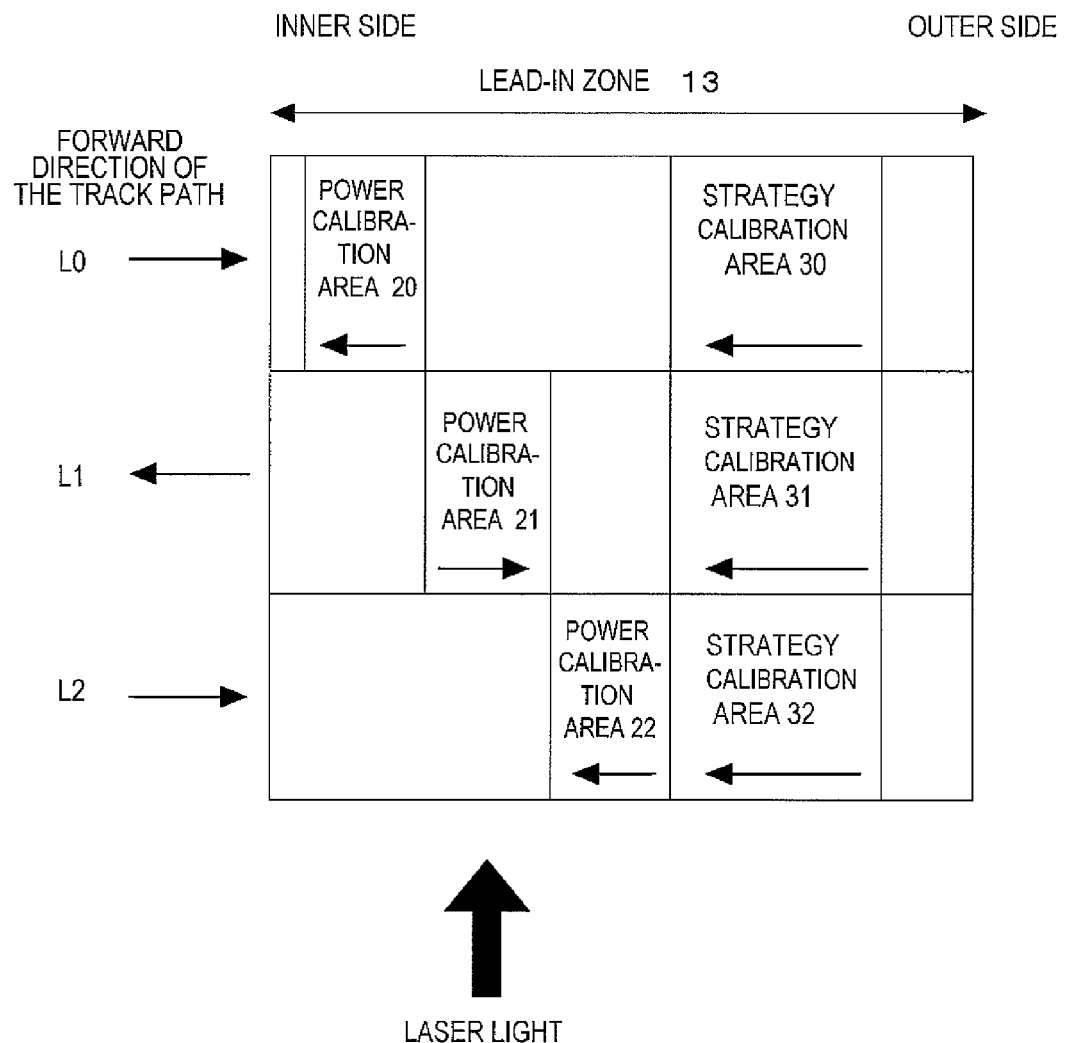
FIG. 5 shows how to use the areas of the optical disc according to Embodiment 1 of the present invention.

FIG. 5 shows an example of how to use the power calibration areas and the strategy calibration areas in a write once optical disc according to Embodiment 1 of the present invention. In the example of FIG. 5, the same area arrangement as shown in FIG. 3 is used. However, the method of using the power calibration areas and the strategy calibration areas described below is applicable to any area arrangement of FIGS. 3B through 3F.

In FIG. 5, arrows represent the directions in which the power calibration areas and the strategy calibration areas are used (recording directions).

As shown in FIG. 5, the power calibration areas are used in the opposite direction to the track path. The reason is as follows. At the stage of power calibration, the power has not been adjusted, naturally. It cannot be guaranteed at which power the recording will be performed. Therefore, the track 11 may be possibly destroyed by performing recording at an excessively high power. In consideration of this, the power calibration areas are used in the opposite direction to the track path.

Figure 6:
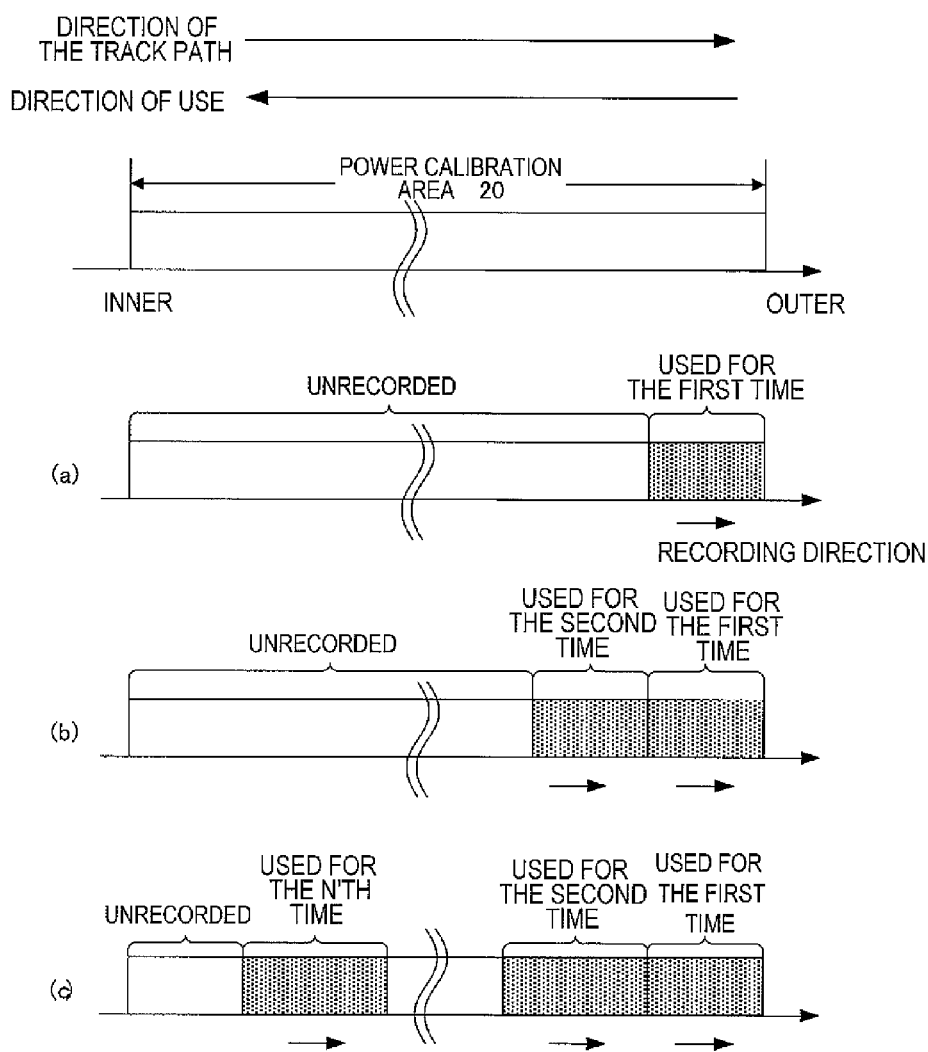
FIG. 6 shows the order in which the power calibration areas of the optical disc are used according to Embodiment 1 of the present invention.

FIG. 6 shows an example of how to use the power calibration areas more specifically. A method of using the power calibration areas in the opposite direction to the track path will be described. In FIG. 6, the power calibration area 20 of L0 layer will be described as an example.

Whereas the track path of L0 layer is used from the inner side toward the outer side, the power calibration area 20 is used from the outer side toward the inner side. Namely, the first time the power calibration area 20 is used, as shown in FIG. 6(a), a position which is inner from the outer border of the power calibration area 20 by the size to be used is set as the start position of the data. Then, the data is recorded in the direction of the track path.

The next time the power calibration area 20 is used, as shown in FIG. 6(b), the start position of the recording in FIG. 6(a) is set as the end position. A position which is inner from the end position by the size to be used is set as the start position of the data. Then, the data is recorded in the direction of the track path. This is repeated thereafter. As a result, as shown in FIG. 6(c), even after the power calibration area 20 is used N times, the start position of a track path inner from the used track paths is kept in an unrecorded state.

By contrast, the strategy calibration areas are used in one same direction as shown in FIG. 5.

The reason why such a method of use is adopted will be described in more detail. An access to the optical disc is made using a PBA, and accesses for continuous recording or the like are made in an ascending order of the PBA. For making an access to a target address for recording or the like, confirmation processing (synchronization) of the access position is performed as follows. The optical head (not shown) is moved (seek operation) to a position before the target address, and the optical head is moved along the track 11 relying on the reflected light from the track 11, utilizing the rotation of the optical disc 1 by focus servo, until reaching the target address. Thus, the optical head is made ready to emit laser light for recording and reproduction from the target address.

Since such an access method is used, if the power calibration area is used in the ascending order of the PBA like the track path, the following occurs. When the track is destroyed as described above, the address cannot be obtained the next time the power calibration area is used because the area before the target address is destroyed. As a result, the optical head cannot seek to an area before the target address, and cannot access the target address.

The strategy calibration area is used after the power calibration, i.e., after the power is adjusted. Therefore, it is guaranteed that recording is performed at a recording power generally suitable to the optical disc. For this reason, such a restriction that the strategy calibration area is used in the opposite direction to the track path is not necessary, unlike the power calibration area. Hence, it is conceivable as one example, as shown in FIG. 5, that the strategy calibration areas of all the recording layers are used in the same direction (for example, from the outer side toward the inner side, regardless of the direction of the track path of the recording layers).

With such a manner of use, if a power calibration area is used up but the strategy calibration areas of all the recording layers still have some room left, this manner of usage makes it possible to assign a strategy calibration areas for power calibration. More specifically, the strategy calibration areas may be used as follows. The strategy calibration areas of all the recording layers are used from the outer side toward the inner side. When the strategy calibration areas of all the recording layers have some capacity left, a part at the innermost end of a strategy calibration area can be re-assigned as the power calibration area for power calibration (because the innermost end is unused in all the recording layers, the same condition as that of the power calibration areas can be guaranteed).

(3) How to Provide Information on the OPC Areas

In the case of a rewritable optical disc such as BD-RE, the OPC areas can be randomly used. By contrast, in the case of a write once optical disc such as BD-R, recording can be made only once in the OPC areas also. As described above, recording may not be performed at an optimal power in the OPC areas, especially in the power calibration areas. Therefore, how much of the areas has been used may not be determined based on the recording state of the medium. As the number of recording layers or areas increases, it is wasteful to check the using state of all the areas each time. Therefore, it is effective that a write once optical disc or the like has pointer information which indicates how much of the areas has been used as management information.

Figure 7:
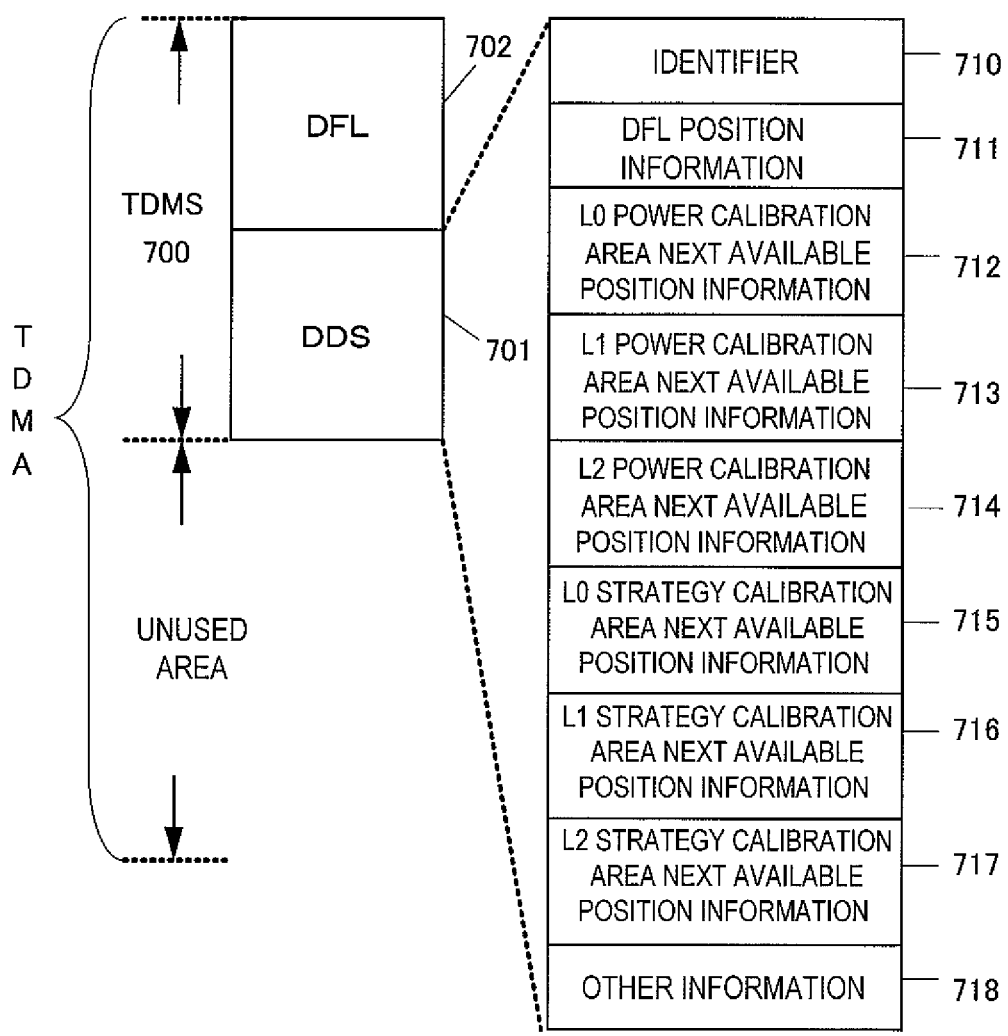
FIG. 7 shows a data structure relating to recording calibration in the optical disc according to Embodiment 1 of the present invention.

FIG. 7 shows an example of information regarding the power calibration areas and the strategy calibration areas in a write once optical disc. Here, the same area arrangement as shown in FIG. 3A will be described as an example.

In the lead-in zone 13, the lead-out zone 15 or the like of the optical disc 1, a management information area (not shown) called a DMA (Disc Management Area or Defect Management Area) usable for recording management information is provided. In the case of a write once optical disc, a DMA is an area in which final management information (DMS) is recorded at the time of finalization. Therefore, a temporary DMA area (not shown; hereinafter, referred to as "TDMA") separate from the DMA area may be secured, so that transitional management information before finalization can be updated in a write once manner.

In the TDMA, a TDMS 700 is recorded including a DFL 702 which is information on defect positions or alternative recording and a DDS 701 including the position information on the DFL 702, the position information on the areas of the optical disc and the like. A DDS is also referred to as a "disc definition structure". As the TDMS and the DMS, basically the same type of data is recorded. Between TDMS and the DMS, the locations of the DFL 702 and the DDS 701 are inverted. FIG. 7 is provided to show information on the recording calibration. Therefore, the TDMS 700, which is information recorded at recordable timings, i.e., at transitional timings before the finalization, will be described as an example.

There may be a plurality of DMA's or TDMA's on the optical disc 1. Specifically, for example, DMA's may be securely obtained in the lead-in zone 13 or the lead-out zone 15. The TDMA's may be securely obtained in the lead-in zone or a spare area (not shown) for alternative recording which is securely obtained in the data zone 14.

The information included in the TDMS (DMS) is not limited to the DFL 702 which is the disc management information and the DDS 701 including the information on the position thereof. Specifically, for example, the information recorded in the TDMS (DMS) may occasionally include SRRI, which represents the location, or the state of use, of a track (SRR) in the data zone 14 on the optical disc 1, and SBM, which represents the recorded/unrecorded state which is used for random recording, as the disc management information in addition to the DFL 702.

The DDS 701 includes an identifier 710 indicating that this information is a DDS, DFL position information 711 indicating the position at which the DFL 702 is recorded, L0 power calibration area next available position information 712 indicating a position of the power calibration area 20 which can be used the next time, L1 power calibration area next available position information 713 indicating a position of the power calibration area 21 which can be used the next time, L2 power calibration area next available position information 714 indicating a position of the power calibration area 22 which can be used the next time, L0 strategy calibration area next available position information 715 indicating a position of the strategy calibration area 30 which can be used the next time, L1 strategy calibration area next available position information 716 indicating a position of the strategy calibration area 31 which can be used the next time, and L2 strategy calibration area next available position information 717 indicating a position of the strategy calibration area 32 which can be used the next time.

Figure 8:
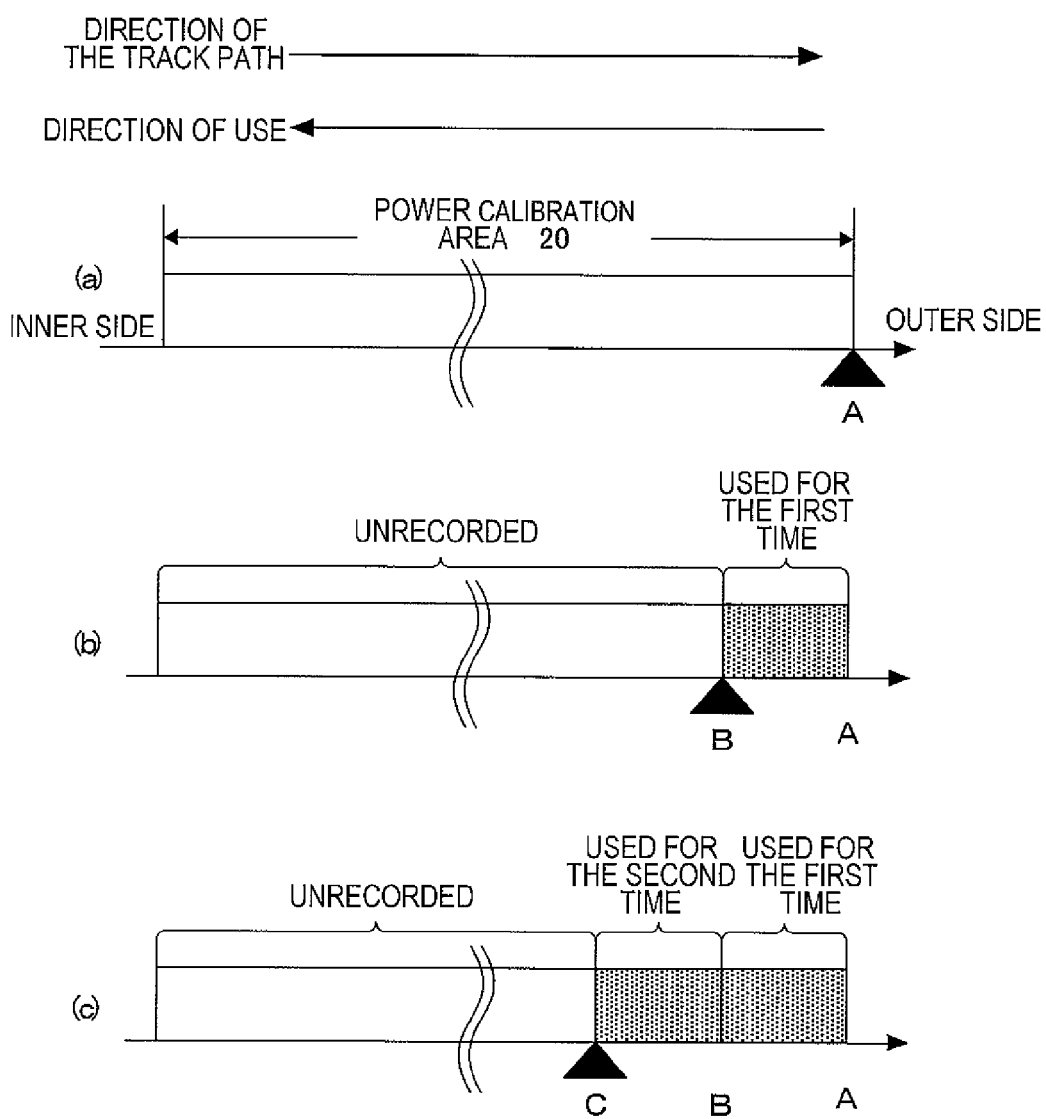
FIG. 8 shows information relating to power calibration in the optical disc according to Embodiment 1 of the present invention.

FIG. 8 shows next available position information. In FIG. 8, the power calibration area 20 of L0 layer will be described as an example.

It is assumed that the power calibration area 20 is to be used from the outer side toward the inner side as shown in FIG. 8. In the state where the power calibration area 20 is not used at all, as shown in FIG. 8(a), the L0 power calibration area next available position information indicates PBA:A, which is the outermost position of the power calibration area 20. After the power calibration area 20 is used once, as shown in FIG. 8(b), the L0 power calibration area next available position information indicates PBA:B. After the power calibration area 20 is used one more time, as shown in FIG. 8(c), the L0 power calibration area next available position information indicates PBA:C. The position indicated by the L0 power calibration area next available position information is changed in this manner.

Such position information is indicated by, for example, a PBA, which is position information in the optical disc 1.

As described above, the optical disc can include information on the position of each of the power calibration area and the strategy calibration area which can be used the next time for each recording layer. In the case where such a structure is adopted, as the number of recording layers increases, the number of pieces of required information increases accordingly.

(4) Recording and Reproduction Apparatus

Figure 9:
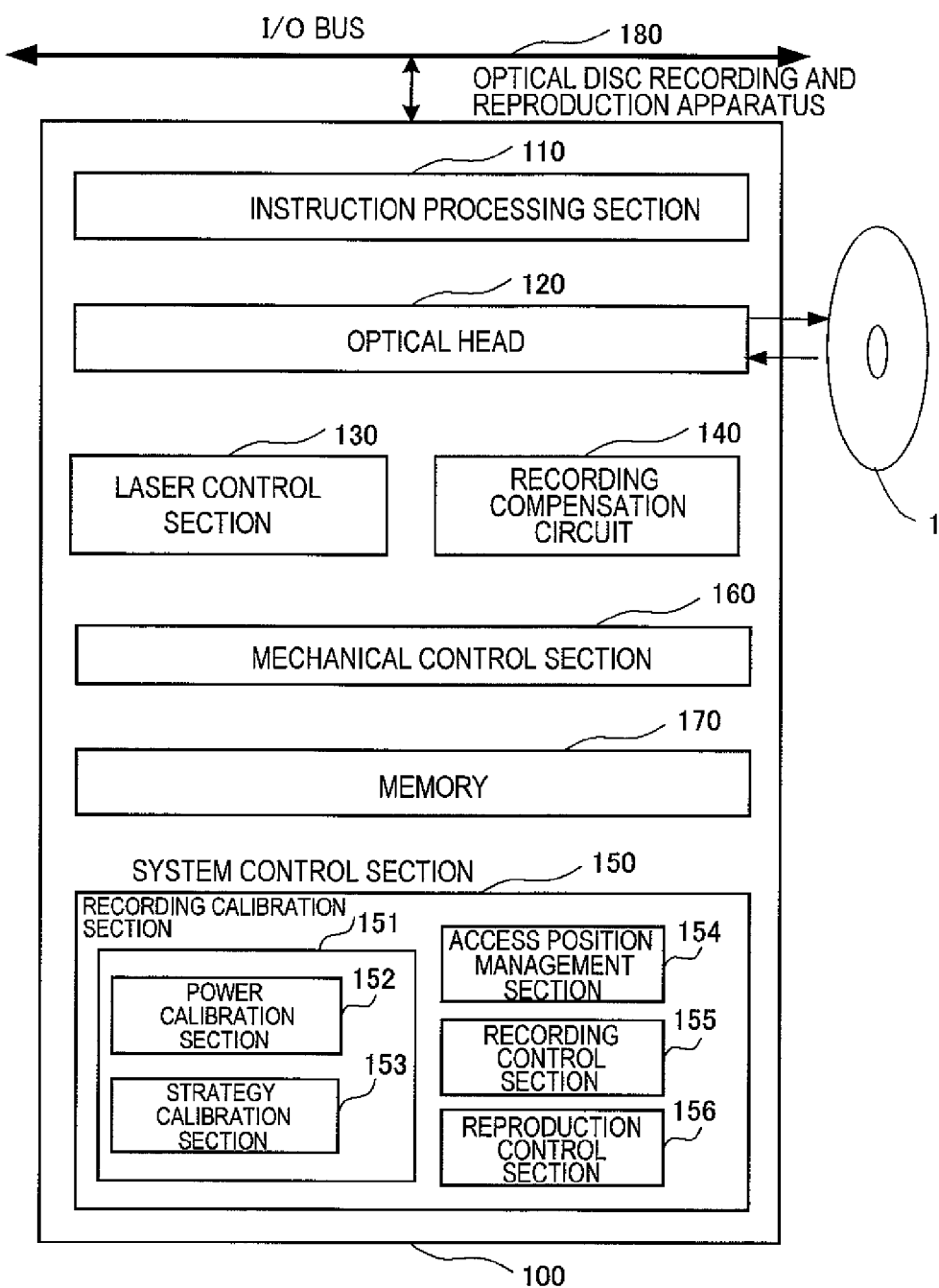
FIG. 9 is a structural view of an optical disc recording and reproduction apparatus according to Embodiments 1, 2 and 3 of the present invention.

FIG. 9 shows a structure of an optical disc recording and reproduction apparatus 100 according to Embodiment 1 of the present invention, for performing recording to or reproduction from the optical disc 1.

The optical disc recording and reproduction apparatus 100 is connected to an upper-level control apparatus (not shown) via an I/O bus 180. The upper-level control apparatus is, for example, a host computer (host PC).

The optical disc recording and reproduction apparatus 100 includes an instruction processing section 110 for processing an instruction from the upper-level control apparatus, an optical head 120 for irradiating the optical disc 1 with laser light for performing recording or reproduction, a laser control section 130 for controlling the laser power which is output from the optical head 120, a recording compensation circuit 140 for converting a specified pulse width (strategy) into a recording pulse signal suitable to pit formation, a mechanical control section 160 for moving the optical head 120 to a target position or performing servo control, a system control section 150 for performing total control of the entire system processing including recording or reproduction processing to or from the optical disc 1 and also performing control on the entire recording calibration processing, and a memory 170 for temporarily storing data.

Furthermore, the system control section 150 includes a recording calibration section 151 for controlling recording calibration processing in the optical disc 1, an access position management section 154 for finding a position at which recording or reproduction is to be performed, from the management information or the like on the optical disc 1, and a recording control section 155 and a reproduction control section 156 for respectively performing recording and reproduction of user data or management information included in the TDMA or the like in response to an instruction from the host, an instruction from the system control section 150 or the like. Furthermore, the recording calibration section 151 includes a power calibration section 152 for controlling the power calibration and a strategy calibration section 153 for controlling the strategy calibration.

When the optical disc 1 is inserted into the optical disc recording and reproduction apparatus 100, the action of the laser control section 130 and the mechanical control section 160 causes the optical head 120 to reproduce, at a prescribed radiation power, a control area (not shown) in the lead-in zone 13 of the recording layer L0. The control area has information on the optical disc 1 embedded in the lead-in zone 13 in advance. Thus, the optical head 120 reads recording parameter information such as the radiation power or the like for performing recording on the recording layer L0, the recording layer L1 and the recording layer L2.

When a recording request is issued from the upper-level control apparatus, the recording calibration section 151 of the system control section 150 of the optical disc recording and reproduction apparatus 100 performs recording calibration in an OPC area provided in each recording layer, and then performs recording on a target recording layer at the obtained recording power.

For performing recording calibration, the power calibration section 152 of the recording calibration section 151 performs power calibration for finding an optimal power using the power calibration area of each recording layer, and the strategy calibration section 153 of the recording calibration section 151 performs strategy calibration for finding an optimal strategy using the strategy calibration area in each recording layer. Thus, the optimal recording parameters are found. A position of each area used for recording calibration is found as follows. For example, in the case where the optical disc 1 is a write once optical disc, the reproduction control section 156 reads the management information or the like shown in section (4) of Embodiment 1 of the present invention onto the memory 170, and the access position management section 154 determines a position usable for the recording calibration based on the read data. Alternatively, in the case where the optical disc is a rewritable optical disc, the access position management section 154 finds an arbitrary position from the range of the power calibration area and the strategy calibration area provided in each recording layer.

(5) Recording Calibration Method

Figure 10:
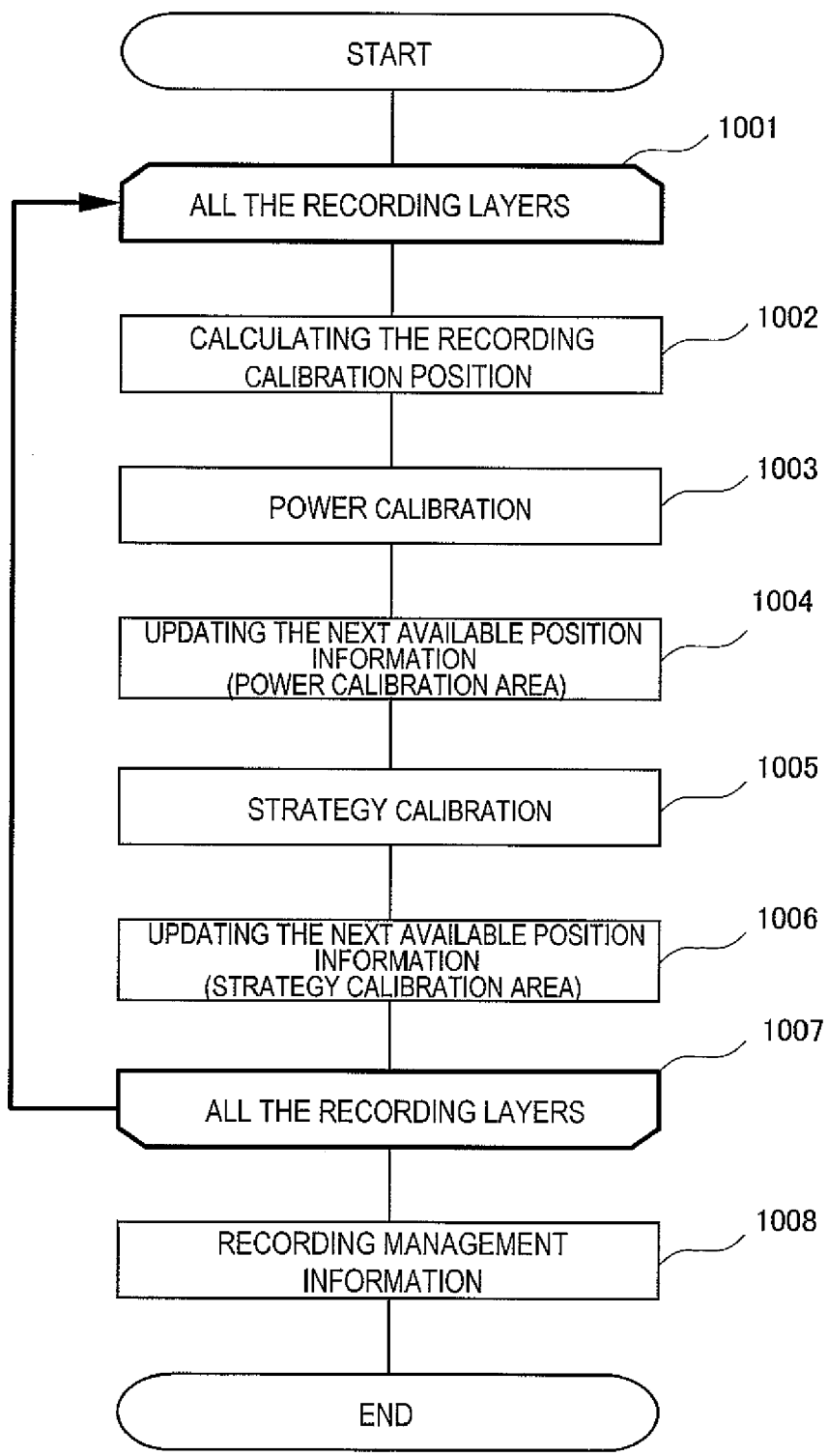
FIG. 10 shows a recording calibration procedure according to Embodiments 1, 2 and 3 of the present invention.

FIG. 10 shows a flow of a recording calibration procedure on the optical disc 1 of a write once type according to Embodiment 1 of the present invention. Here, the same area arrangement of the optical disc 1 as shown in FIG. 3 will be described as an example.

Step 1001: Processing in steps 1002 through 1007 described later is repeated for all the recording layers. For example, in the case of the optical disc 1 having the area arrangement shown in FIG. 3A, the processing is repeated for the recording layer 3 (L0 layer), the recording layer 5 (L1 layer) and the recording layer 7 (L2 layer). In this example, the recording calibration is sequentially performed from the recording layer farthest from the disc surface (laser light incidence surface) toward the recording layer closest to the disc surface. This order is merely an example, and the present invention is not limited to this.

Step 1002: A position used for the recording calibration is calculated. Specifically, the reproduction control section 156 of the system control section 150 reads the latest DDS 701 included in the latest DMS 700 from the TDMA of the optical disc 1 onto the memory 170. Based on the read data, the access position management section 154 obtains the information on the position which can be used the next time, of each of the power calibration area and the strategy calibration area in a recording layer on which the recording calibration is to be performed (for example, for L0 layer, the L0 power calibration area next available position information 712 and L0 strategy calibration area next available position information 715). Based on this information, the access position management section 154 determines the size of the power calibration area and the strategy calibration area to be used for recording, and the direction of using the power calibration area and the strategy calibration area in the recording layer on which the recording calibration is to be performed. Then, the access position management section 154 calculates the start position of recording for power calibration to be performed next and the start position of recording for strategy calibration to be performed next. The "latest" DDS 701 means the DDS 701 included in the latest of the DMS's 700 included in the TDMA, in which the transitional management information is updated.

Step 1003: Power calibration is performed. Specifically, the power calibration section 152 of the recording calibration section 151 determines the laser radiation power on the recording layer on which the recording calibration is to be performed (for example, a plurality of patterns of laser power), and sets the power in the laser control section 130. The power calibration section 152 also sets a prescribed strategy (for example, the strategy described in the control area) in the recording compensation circuit 140. Then, the power calibration section 152 moves the optical head 120 to the start position of the recording for power calibration found in step 1002 using the mechanical control section 160, and allows the optical head 120 to perform the recording. Based on the recording quality of the recorded area (for example, the modulation degree or BER), the power calibration section 152 finds an optimal power (for example, a power, among the plurality of patterns of laser power, at which the modulation degree is closest to the expected value).

If the recording for power calibration results in a failure, the access position management section 154 may find the access position again based on the position at which the failed recording was performed, and perform step 1003 again as a retry.

Step 1004: The power calibration area next available position information is updated. Specifically, the power calibration section 152 updates the power calibration area next available position information, included in the data corresponding to the DDS 701 read onto the memory 170, of the recording layer on which the recording for power calibration was performed (for example, in the case of L0 layer, the L0 power calibration area next available position information 712). The update is made from the position at which the recording for power calibration was performed in step 1003.

Step 1005: Strategy calibration is performed. Specifically, the strategy calibration section 153 of the recording calibration section 151 sets the optimal recording power for the recording layer for the recording calibration, found in step 1003, in the laser control section 130, and also sets a strategy (for example, a plurality of patterns of strategy) in the recording compensation circuit 140. Then, the strategy calibration section 153 moves the optical head 120 to the start position of the recording for strategy calibration found in step 1002 using the mechanical control section 160, and allows the optical head 120 to perform the recording. Based on the recording quality of the recorded area (for example, the modulation degree or phase shift), the strategy calibration section 153 finds an optimal recording strategy (for example, a strategy, among the plurality of patterns of strategy, at which the phase shift is smallest).

If the recording for strategy calibration results in a failure, the access position management section 154 may find the access position again based on the position at which the failed recording was performed, and perform step 1005 again as a retry.

Step 1006: The strategy calibration area next available position information is updated. Specifically, the strategy calibration section 153 updates the strategy calibration area next available position information, included in the data corresponding to the DDS 701 read onto the memory 170, of the recording layer on which the recording for strategy calibration was performed (for example, in the case of L0 layer, the L0 strategy calibration area next available position information 715). The update is made from the position at which the recording for strategy calibration was performed in step 1005.

Step 1007: The processing from steps 1002 through 1006 described above is repeated for all the recording layers. When there is a recording layer on which recording calibration has not been finished, the processing returns to step 1001. When recording calibration has been finished on all the recording layers, the processing advance to step 1008.

Step 1008: The management information is updated. Specifically, the system control section 150 uses the recording control section 155 to record data, corresponding to a new DDS updated in steps 1004 and 1006 and stored in the memory 170, in the TDMA as the new TDMS 700 in a write once manner.

The management information does not need to be updated after the recording calibration, and may be performed anytime before the optical disc 1 is discharged from the optical disc recording and reproduction apparatus 100.

The laser power and the strategy used in this case are based on those obtained by the recording calibration described above.

The recording calibration is performed in the procedure described above.

In FIG. 10, the recording calibration is performed at the same timing for all the recording layers. It is not necessary to perform the recording calibration at the same timing. The recording calibration on the target recording layer only needs to be done before usual recording is performed on the target recording layer at the latest. It is not necessary to actually perform the recording calibration on all the recording layers. For example, it is acceptable that the recording calibration is performed on at least one recording layer and the optimal parameters for the other recording layers are found by calculation based on the results obtained for the at least one recording layer. Even in this case, it is regarded that actual calibration is performed on the other recording layers.

Although not shown in FIG. 10, after the power calibration and the strategy calibration, margin checking processing or the like may be performed for checking whether or not the parameters obtained by the calibration are truly the optimal parameters.

It is not necessary to perform both the power calibration of step 1003 and the strategy calibration of step 1005. Specifically, for example, the following control is usable: in the case where the results of the calibration performed in the past by the optical disc recording and reproduction apparatus 100 (calibration history) are left in a drive inherent information area (also referred to as a "drive area") or the like of the optical disc 1, strategy calibration is not performed (i.e., only the power calibration is performed).

In FIG. 10, the write once optical disc is described as an example. The recording calibration can be realized on a rewritable disc using substantially the same method. In this case, in step 1002, the recording calibration position is randomly selected from each of the power calibration area and the strategy calibration area, and the management information updating processing of steps 1004, 1006 and 1007 is not necessary, unlike in the case of the write once optical disc.

In Embodiment 1 of the present invention, the OPC areas for recording calibration are provided in the lead-in zone 13. Where, for example, the OPC areas for recording calibration are also provided in the lead-out zone 15, recording calibration is performed in the OPC areas in, for example, the lead-out zone 15 in the above-described manner when necessary.

Figure 11:
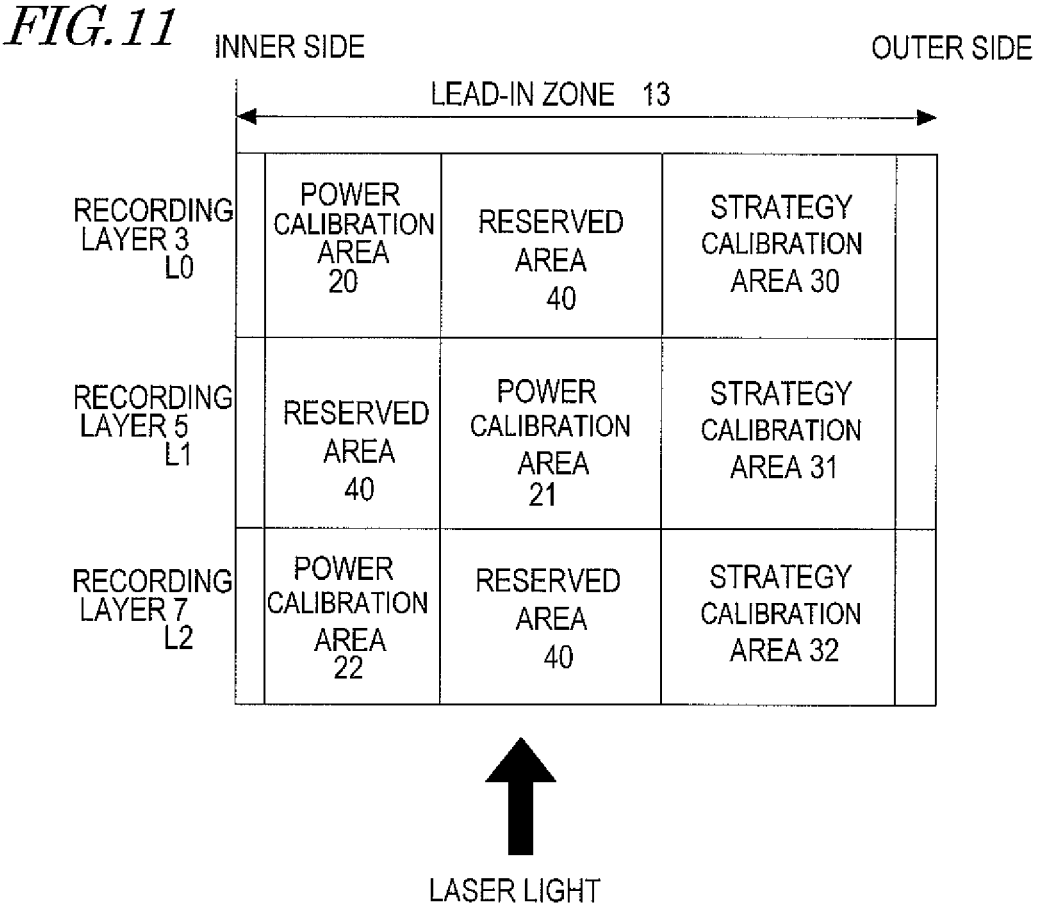
FIG. 11 shows another example of an area arrangement of an optical disc according to Embodiment 1 of the present invention.

In Embodiment 1 of the present invention, the power calibration areas of all the recording layers are located at different radial positions. It is not necessary that the power calibration areas of all the recording layers are located at different radial positions. More specifically, the recording characteristic (transmittance or the like) of one recording layer significantly influences the recording state of an adjacent recording layer. Therefore, for example, as shown in FIG. 11, it is acceptable that the power calibration areas of at least the adjacent recording layers (for example, the power calibration area 21 of L1 layer and the power calibration area 20 of L0 layer, or the power calibration area 21 of L1 layer and the power calibration area 22 of L2 layer) are located at different positions, and that the power calibration areas of the non-adjacent recording layers (for example, the power calibration area 20 of L0 layer and the power calibration area 22 of L2 layer) are located at the same radial position. This arrangement does not significantly influence the power calibration results. Namely, even where the power calibration areas of the adjacent recording layers (in other words, the recording layers in which the directions of the track path are opposite to each other) are located at different radial positions and the strategy calibration areas of such recording layers are located at the same radial position, substantially the same effect as described in Embodiment 1 of the present invention can be provided. In addition, the following control is usable: in the case where the number of recording layers is further increased to six or eight, the number of recording layers in which the power calibration areas can be located at the same radial position is limited to N (N is a positive integer of 0 or greater).

(6) Production Method

Now, a method for producing the information recording medium in this embodiment will be briefly described.

First, a disc substrate 2 having a track used for recording information signals corresponding to an address signal or control data on a surface thereof is formed or prepared. Thus, the recording layer 3 having calibration areas in an arrangement shown in any of FIGS. 3A through 3F can be formed on the disc substrate 2.

Next, a track used for recording information signals is formed also on a surface of the intermediate layer 4 on which the recording layer 5 is to be formed. Thus, the recording layer 5 having calibration areas in an arrangement shown in any of FIGS. 3A through 3F can be formed on the intermediate layer 4.

Next, a track used for recording information signals is formed also on a surface of the intermediate layer 6 on which the recording layer 7 is to be formed. Thus, the recording layer 7 having calibration areas in an arrangement shown in any of FIGS. 3A through 3F can be formed on the intermediate layer 6.

After the recording layer 7 is formed, the cover layer 8 is formed.

(Embodiment 2)

(1) Area Arrangement

Figure 12:
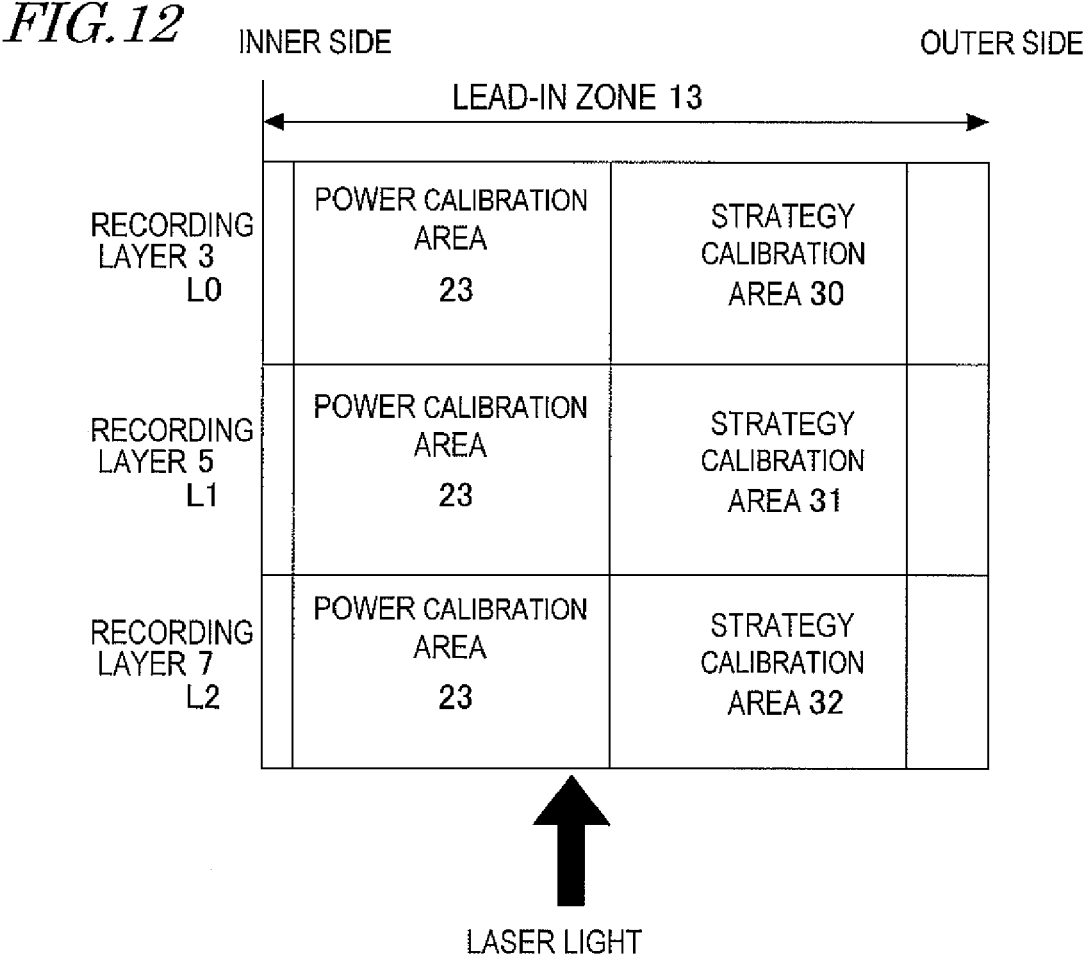
FIG. 12 shows an area arrangement of an optical disc according to Embodiment 2 of the present invention.

FIG. 12 shows an area arrangement of a write once optical disc including three recording layers according to Embodiment 2 of the present invention.

As shown in FIG. 12, Embodiment 2 of the present invention is the same as Embodiment 1 of the present invention (described with reference to FIGS. 3A through 3F) except that the power calibration areas 23 located at a prescribed radial position which is common to all the recording layers in appearance, like the strategy calibration areas 30, 31 and 32, and accordingly no area corresponding to the reserved area is secured. In Embodiment 1 of the present invention, the power calibration areas are located at different radial positions among different recording layers. As described above in Embodiment 1 of the present invention, it is desired that an area of each recording layer used for power calibration is controlled not to be influenced by the recording state of the other recording layers (namely, it is desired that recording for power calibration is not performed at the overlapping radial position among different recording layers). Therefore, Embodiment 2 has a feature in how to use the power calibration areas. This will be described in section (2).

In Embodiment 2 of the present invention, how to use the power calibration areas 23 will be described, but the same manner of usage is also applicable to the strategy calibration areas or the like.

In Embodiment 2 of the present invention, a write once optical disc is described as an example. As described in section (2) of Embodiment 1 of the present invention, the same manner of management is also applicable to a rewritable information recording medium and the same effect as for the write once optical disc is provided. In the case of the rewritable optical disc, the calibration areas are randomly used, and so it is difficult to keep the corresponding areas of the other recording layers unused (unrecorded). Therefore, it is effective to put the power calibration areas and the reserved areas of the recording layers into a uniform recording state (for example, to record 0 data in all these areas).

As described in Embodiment 2 of the present invention, recording power calibration is performed at a recording power which cannot be guaranteed as the optimal power, i.e., while changing the recording power. Therefore, a power calibration area of one recording layer used for recording power calibration is significantly influenced by the transmittance balance provided by the recording state of another recording layer. Such power calibration areas are used such that recording is not performed at an overlapping position among different recording layers. By contrast, strategy calibration is performed while fixing the recording power to the optimal recording power. Therefore, a strategy calibration area of one recording layer used for strategy calibration is unlikely to be influenced by the transmittance provided by the recording state of another recording layer. Such a strategy calibration area is located at the same radial position among all the recording layers. Owing to such an arrangement, the power calibration results of all the recording layers are protected against being influenced by the recording state of a different recording layer. In addition, the size of areas secured as OPC areas, which are required when the number of recording layers is increased (i.e., the total size of the power calibration area, the strategy calibration area and the reserved area(s)) can be suppressed to be minimum. Therefore, an area necessary for recording calibration can be secured, and the problem that the number of times of usage by the user (=the number of times the recording calibration can be made) is decreased is solved. In addition, the increase of the size of the lead-in zone 13 or the lead-out zone 15 can be suppressed, and the problem that the size of the data zone 14 is decreased and the size of the area usable by the user is decreased can be solved.

(2) How to Use the Areas

Regarding how to use the areas for recording calibration, Embodiment 2 of the present invention is the same as Embodiment 1 of the present invention except for the manner of using the power calibration areas 23.

Figure 13:
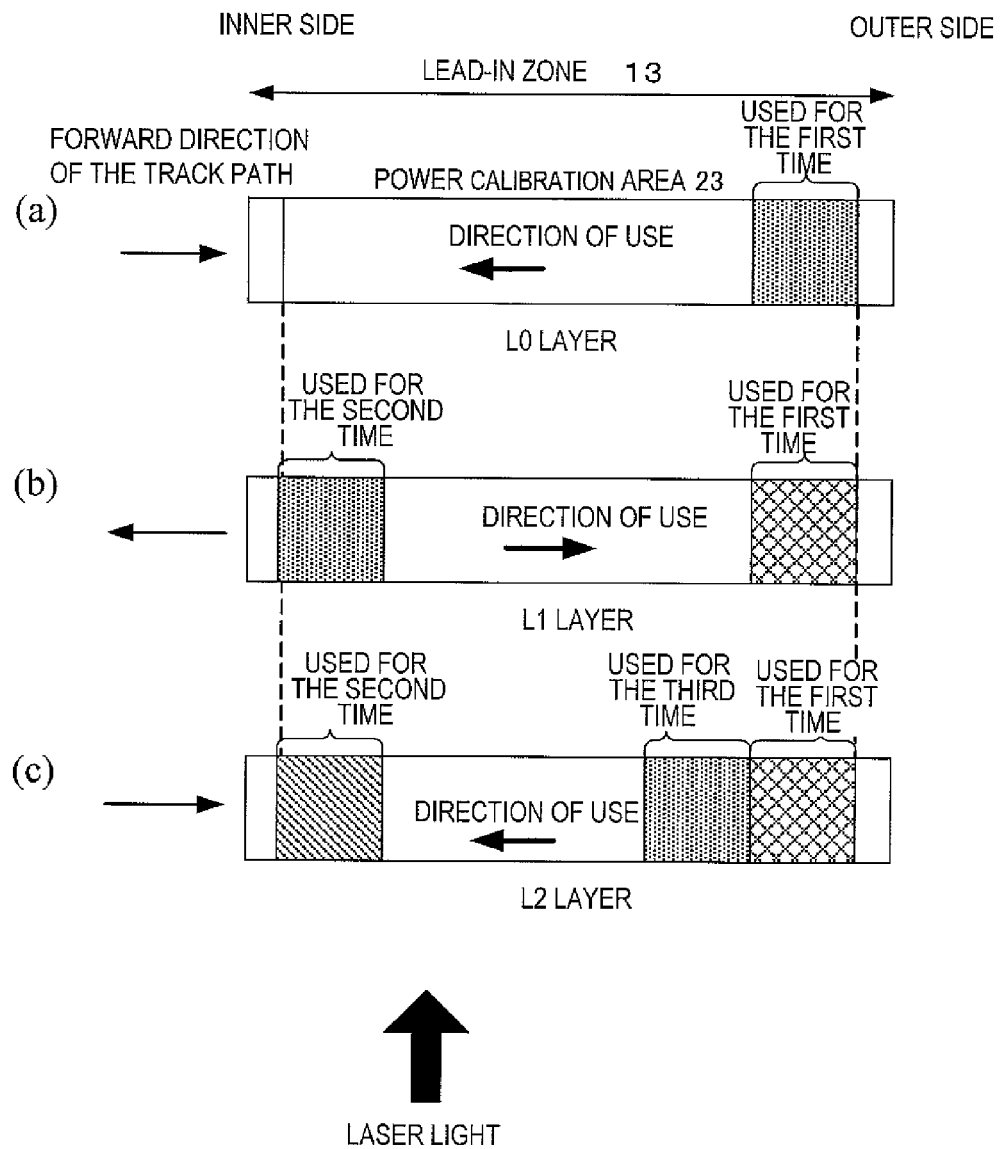
FIG. 13 shows how to use the areas of the optical disc according to Embodiment 2 of the present invention.

FIG. 13 shows an example of how to use the power calibration areas according to Embodiment 2 of the present invention. In this example, the power calibration area 23 of each recording layer is used in the opposite direction to the track path, as described with reference to FIG. 5 in section (2) of Embodiment 1 of the present invention. Namely, in each of L0 layer and L2 layer, the power calibration area 23 is used from the outer side toward the inner side; whereas in L1 layer, the power calibration area 23 is used from the inner side toward the outer side. It is assumed that the recording calibration is sequentially performed first on L0 layer, then on L1 layer and finally on L2 layer.

For performing power calibration on L0 layer in which the track path is used from the inner side toward the outer side, recording is performed in the power calibration area 23 in an unused state as follows. As shown in (a), a position which is inner from the outer border of the power calibration area 23 by the size to be used is set as the start position of the data. Then, the data is recorded in the direction of the track path. For performing power calibration on L1 layer in which the track path is used from the outer side toward the inner side, as shown in (b), a position which is outer from the inner border of the power calibration area 23 by the size to be used is set as the start position of the data. Then, the data is recorded in the direction of the track path. Finally, for performing power calibration on L2 layer in which the track path is used from the inner side toward the outer side like L0 layer, as shown in (c), the start position used in L0 layer shown in (a) is set as the end position. A position which is inner from the end position by the size to be used is set as the start position of the data. Then, the data is recorded in the direction of the track path. This is repeated for each recording layer thereafter.

In this manner, an area at a radial position different from the areas in the other recording layers is used. Namely, the recording for power calibration is performed in an area which does not overlap the areas already used in the other recording layers. Thus, power calibration can be performed with the same recording state among the recording layers. When a portion to be used in the area used from the inner side overlaps a portion to be used in the area used from the outer side, the power calibration areas 23 are used up.

In the example of FIG. 13, the recording power calibration is performed at the same timing for all the recording layers successively. Even in the case where calibration is performed in the power calibration area 23 of only a specific recording layer, the manner of usage and the effect are the same as described above.

As described in section (1) of Embodiment 1 of the present invention, for example, the end position of the area used in (c) is not at exactly the same radial position as the start position used in (a). It is necessary to consider the aligning errors or the influences of the characteristic of the laser light. Therefore, the start position in (c) needs to be the position inner from the end position by the size to be used for the calibration. The end position is set at the position inner from the start position of the area used in (a) by the size corresponding to such influences (hereinafter, referred to as an "offset") in proper working order.

(3) How to Provide Information on the OPC Areas

In Embodiment 2 of the present invention, as described in section (3) of Embodiment 1 of the present invention, it is effective that a write once optical disc or the like has pointer information which indicates how much of the areas has been used as management information.

Figure 14:
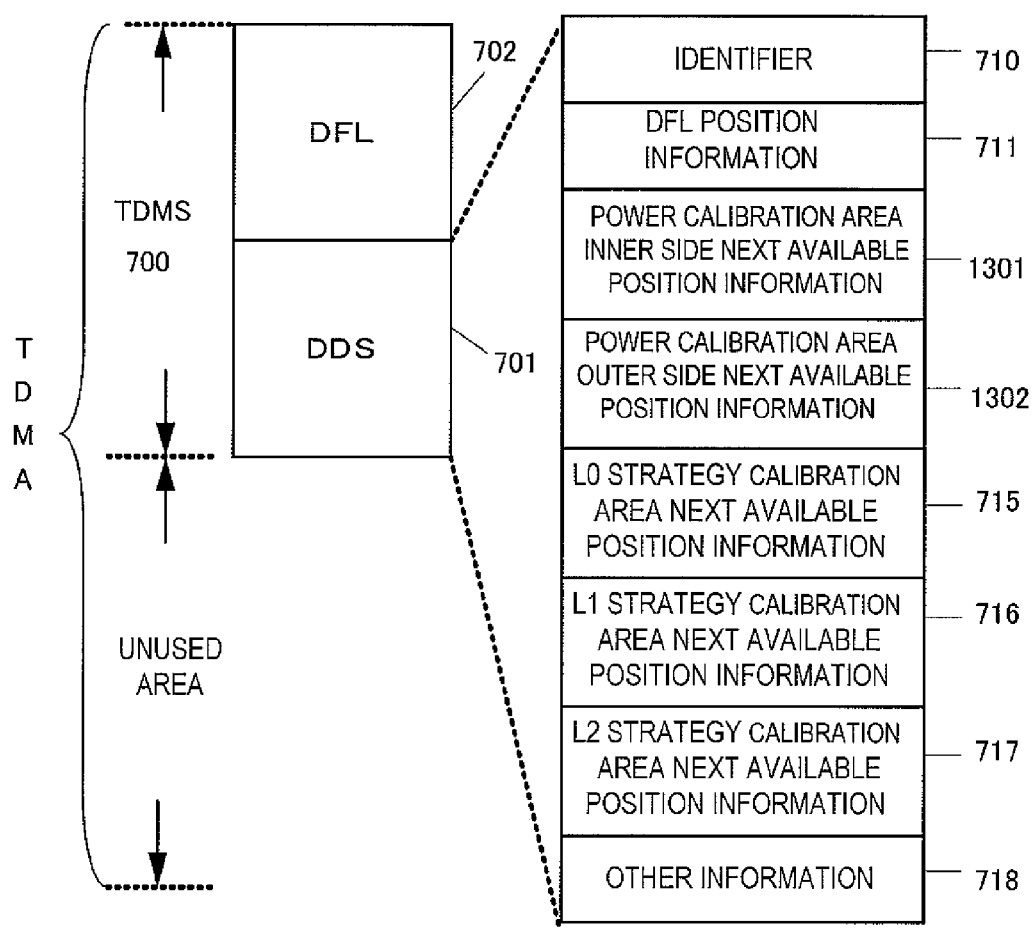
FIG. 14 shows a data structure relating to recording calibration in the optical disc according to Embodiment 2 of the present invention.

FIG. 14 shows an example of information regarding the power calibration areas and the strategy calibration areas in a write once optical disc. In FIG. 14, the same area arrangement as shown in FIG. 12 will be described as an example.

Regarding the strategy calibration areas, next available position information is provided for each recording layer as described in section (3) of Embodiment 1 of the present invention.

Regarding the power calibration areas, power calibration area inner side next available position information 1301 and power calibration area outer side next available position information 1302 are provided as information common to all the recording layers. In the example of FIG. 13, the power calibration area outer side next available position information 1302 is used and updated by the power calibration performed on each of L0 layer and L2 layer, in which the power calibration area is used from the outer side toward the inner side. The power calibration area inner side next available position information 1301 is used and updated by the power calibration performed on L1 layer, in which the power calibration area is used from the inner side toward the outer side. Since these pieces of information are common to all the recording layers, it is not sufficient to specify the position merely with the PBA information, unlike in section (3) of Embodiment 1 of the present invention. For example, the position needs to be specified by information regarding the radial position. Alternatively, the position needs to be specified by the PBA in the recording layer used immediately previously. In the latter case, when using the position actually, the PBA is converted into a PBA in the recording layer to be used.

As described in section (2) of Embodiment 2 of the present invention, the position usable the next time needs to be specified in consideration of the aligning errors of the disc or the influences of the characteristic of the laser light. Therefore, both the inner side next available position information and the outer side next available position information need to specify a position obtained by adding the above-mentioned offset to the actual end position. Alternatively, the areas need to be used from a position obtained by adding the offset, when actually using the position.

(4) Recording and Reproduction Apparatus

The recording and reproduction apparatus in Embodiment 2 of the present invention is the same as that described in section (4) of Embodiment 1 of the present invention with reference to FIG. 9 and will not be described here.

(5) Recording Calibration Method

The procedure of the recording calibration in Embodiment 2 of the present invention is the same as that described in section (5) of Embodiment 1 of the present invention with reference to FIG. 10 except for steps 1002 and 1004. Here, only the steps different from those in Embodiment 1 of the present invention will be described.

Step 1002: A position used for the recording calibration is calculated. Specifically, the reproduction control section 156 of the system control section 150 reads the latest DDS 701 included in the latest TDMS from the TDMA of the optical disc 1 onto the memory 170. Based on the read data, the access position management section 154 obtains the information on the position of each of the power calibration area and the strategy calibration area which can be used the next time, of a recording layer on which the recording calibration is to be performed (for example, for L0 layer, the power calibration area outer side next available position information 1302 and L0 strategy calibration area next available position information 715). Based on such information, the access position management section 154 determines the size of area to be used for recording in the power calibration area and the strategy calibration area, and the direction of using the power calibration area and the strategy calibration area of the recording layer on which the recording calibration is to be performed. Then, the access position management section 154 calculates the start position of recording for power calibration to be performed next and the start position of recording for strategy calibration to be performed next. The "latest" DDS 701 means the DDS 701 included in the latest of the DMS's 700 included in the TDMA, in which the transitional management information is updated.

Step 1004: The power calibration area next available position information is updated. Specifically, the power calibration section 152 updates the power calibration area next available position information, included in the data corresponding to the DDS 701 read onto the memory 170, of the recording layer on which the recording for power calibration was performed (for example, in the case of L0 layer, the power calibration area outer side next available position information 1302). The update is made from the position at which the recording for power calibration was performed in step 1003.

In Embodiment 2 of the present invention, as described in section (1) of Embodiment 1 of the present invention, an unused area of the power calibration area 23 corresponding to the radial position already used in the other recording layers, namely, an area from the inner border of the power calibration area 23 to the power calibration area inner side next available position information 1301, and an area from the power calibration area outer side next available position information 1302 to the outer border, of a recording layer in which such a radial position has not been used, are usable as a strategy calibration area, as a management information area, or for data recording or other processing which is not influenced, unlike power calibration, by the recording state of the other recording layers. It is difficult to determine whether or not such a radial position of that recording layer has been actually used. Therefore, for example, for L1 layer in which the power calibration area 23 is used from the inner side, it is more effective to set an area from the power calibration area outer side next available position information 1302 to the outer border of the power calibration area 23 as a usable area.

In Embodiment 2 of the present invention, the power calibration areas 23 of all the recording layers need to have the same size excluding the influences such as the aligning errors. By contrast, the strategy calibration areas do not need to have the same size among all the recording layers. For example, in the case where the strategy calibration areas in all the recording layers are used in the same direction, for example, from the outer side toward the inner side, the strategy calibration areas of all the recording layers should have the outer border at the same radial position but do not need to have the inner border at the same radial position.

In Embodiment 2 of the present invention, an area in each recording layer used for power calibration does not overlap the areas used in the other recording layers. It is not necessary that the areas used for power calibration are located at different radial positions among all the recording layers. More specifically, as described in Embodiment 1 of the present invention with reference to FIG. 11, the recording characteristic (transmittance or the like) of one recording layer significantly influences the recording state of an adjacent recording layer. Therefore, for example, it is acceptable that among at least adjacent recording layers, areas at different radial positions are used for power calibration, but among non-adjacent recording layers, overlapping areas (areas including the same radial position) are used for power calibration. This arrangement does not significantly influence the power calibration results. Namely, even where the areas used for power calibration of the adjacent recording layers (in other words, the recording layers in which the directions of the track path are opposite to each other) do not overlap, but the strategy calibration areas of such recording layers are located at the same radial position, substantially the same effect as described in Embodiment 2 of the present invention can be provided. In addition, the following control is usable: in the case where the number of recording layers is further increased to six or eight, the number of recording layers in which the power calibration areas can be located at the same radial position is limited to N (N is a positive integer of 0 or greater).

(Embodiment 3)

(1) Area Arrangement

Figure 15:
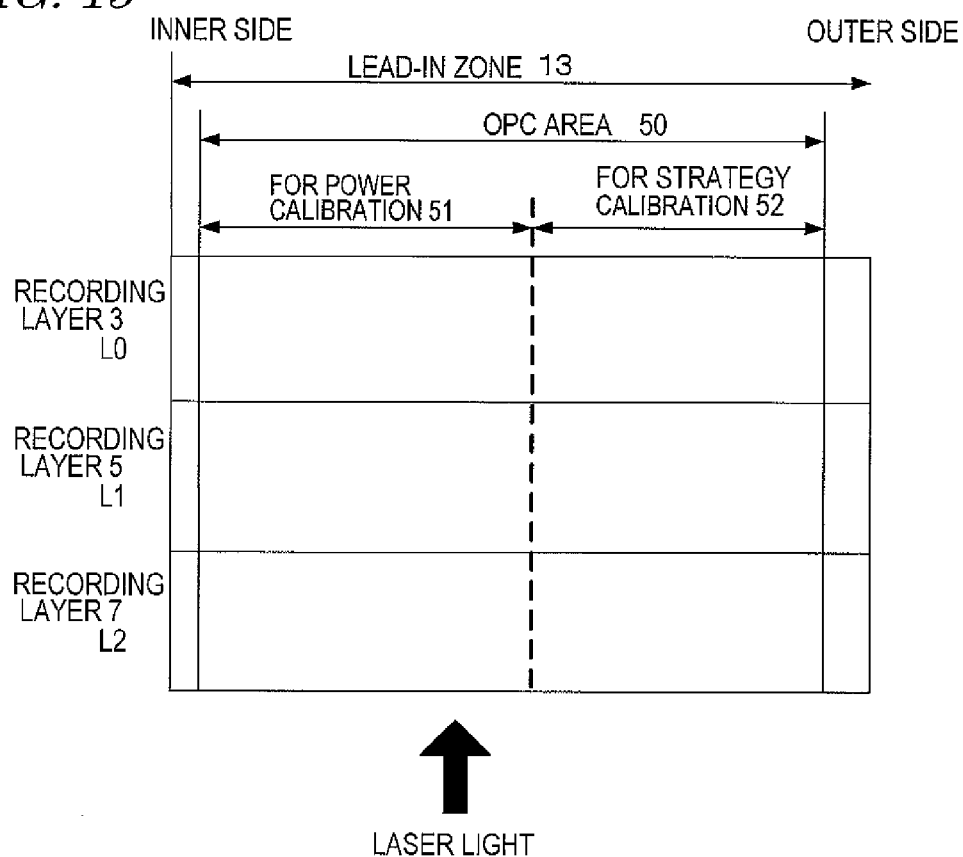
FIG. 15 shows an area arrangement of an optical disc according to Embodiment 3 of the present invention.

FIG. 15 shows an area arrangement of a write once optical disc including three recording layers according to Embodiment 3 of the present invention.

The lead-in zone 13 of the optical disc 1 includes OPC areas 50 for recording calibration.

The OPC areas 50 are located at the same radial position among all the recording layers, and are used for power calibration or strategy calibration. Unlike in Embodiment 1 and 2 of the present invention, the OPC areas 50 are not clearly divided into power calibration areas or strategy calibration areas. Instead, an arbitrary size of each OPC area 50 is assigned as a part of area for power calibration 51 or a part of area for strategy calibration 52 before the OPC area 50 is used for recording for the first time. This will be described later in section (2) in detail.

(2) How to Use the Areas

Figure 16:
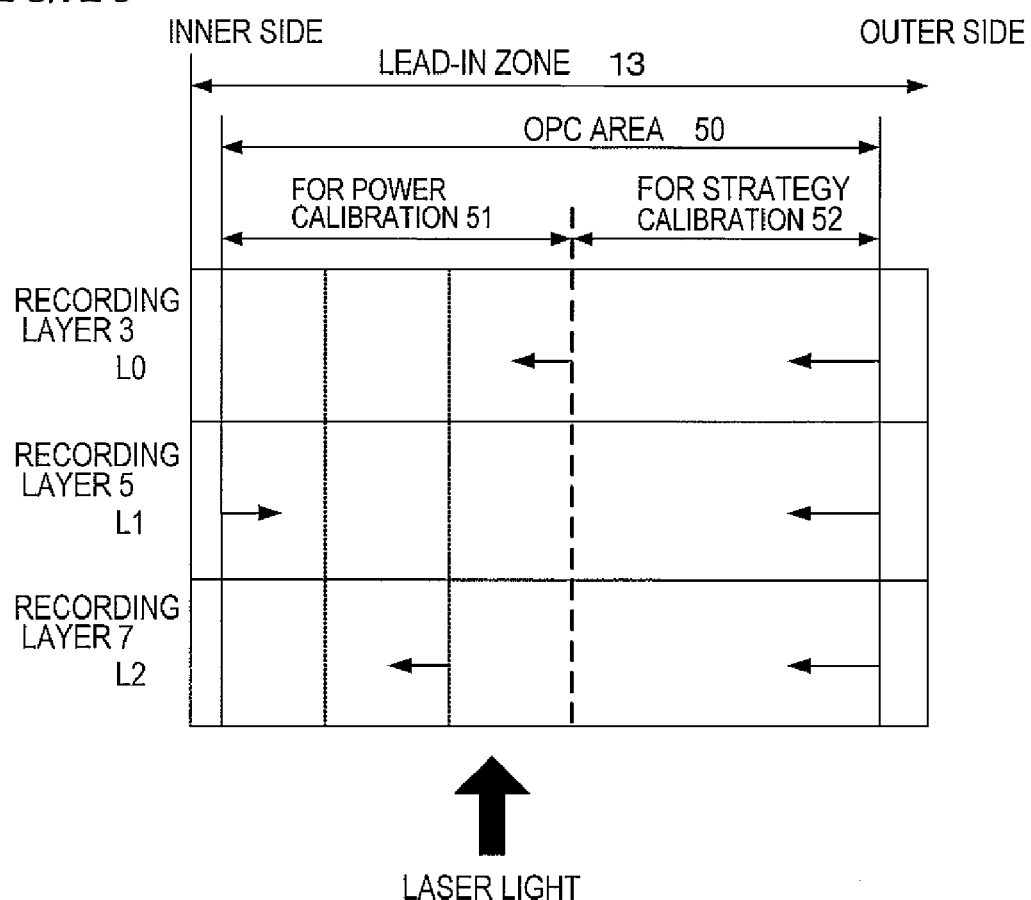
FIG. 16 shows how to use the areas of the optical disc according to Embodiment 3 of the present invention.

FIG. 16 shows an example of how to use the OPC areas 50 according to Embodiment 3 of the present invention. In FIG. 16, the same area arrangement as shown in FIG. 15 will be described as an example.

Before each OPC area 50 is used for recording for the first time, the OPC area 50 is assigned as the part of area for power calibration 51 and the part of area for strategy calibration 52, each of an arbitrary size (i.e., the areas 51 and 52 are assigned at an arbitrary assignment ratio). Also among the recording layers, the part of areas for power calibration 51 are assigned in an arbitrary size (at an arbitrary assignment ratio) so as not to overlap (so as not to be located at the same radial position). The part of areas for strategy calibration 52 may overlap among the recording layers, and therefore remain at the overlapping position (the same radial position) among the recording layer.

The part of areas for power calibration 51 are used in the opposite direction to the track path like in Embodiments 1 and 2 of the present invention. Specifically, in each of L0 layer and L2 layer, in which the track path is used from the inner side toward the outer side, the area assigned as the part of area for power calibration 51 is used from the outer side toward the inner side, with the outer border thereof being the start position of the data. In L1 layer, in which the track path is used from the outer side toward the inner side, the area assigned as the part of area for power calibration 51 is used from the inner side toward the outer side, with the inner border thereof being the start position of the data.

By contrast, as the part of areas for strategy calibration 52, overlapping areas are used among the recording layers. Specifically, the part of areas for strategy calibration 52 are used in one direction (for example, from the outer side toward the inner side) regardless of the direction of the track path.

The part of area for power calibration 51 and the part of area for strategy calibration 52 may be assigned so as to have an equal size. Alternatively, where the optical disc 1 has a narrow (small) power margin because of the feature of the manufacturer, the part of area for power calibration 51 may be assigned to have a larger size than the part of area for strategy calibration 52. Still alternatively, where the optimal power can be calculated by estimation to some degree but the optimal strategy cannot be easily found without actually performing recording calibration, the part of area for strategy calibration 52 may be assigned to have a larger size than the part of area for power calibration 51.

In Embodiment 3 of the present invention, the OPC areas 50 are provided in the lead-in zone 13. For example, the OPC areas 50 may further be provided in the lead-out zone 15. In this case, the assignment ratio of the part of area for power calibration 51 and the part of area for strategy calibration 52 may be varied between the OPC areas 50 provided in the lead-in zone 13 and the OPC areas 50 provided in the lead-out zone 15.

In Embodiment 3 of the present invention, each OPC area 50 is divided into the part of area for power calibration 51 and the part of area for strategy calibration 52. A part of the OPC area 50 may be assigned as an area for a different purpose (for example, an area for checking the margin).

(3) How to Provide Information on the OPC Areas

In Embodiment 3 of the present invention, as described in section (3) of Embodiments 1 and 2 of the present invention, it is effective that a write once optical disc or the like has pointer information which indicates how much of the areas has been used as management information.

Figure 17:
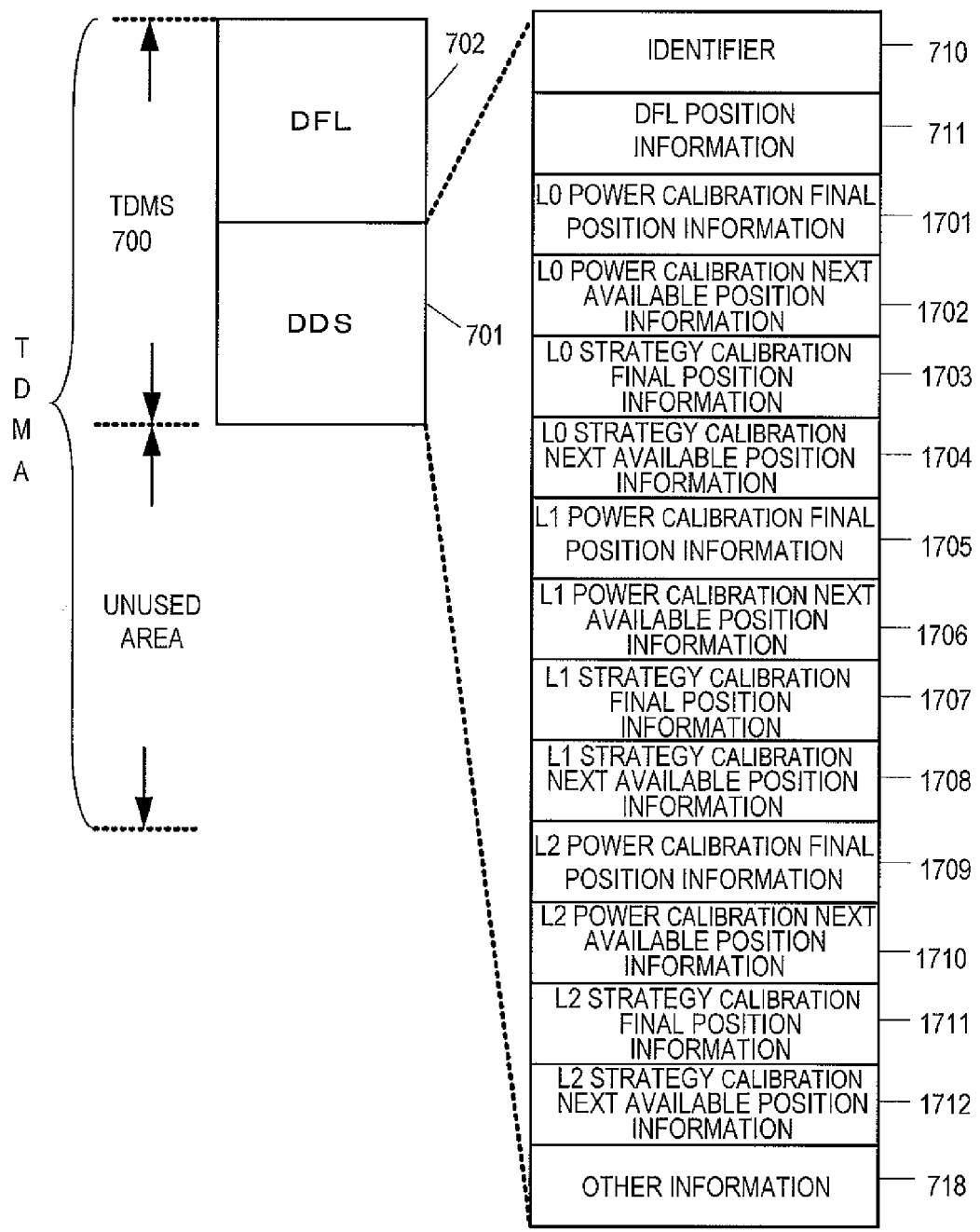
FIG. 17 shows a data structure relating to recording calibration in the optical disc according to Embodiment 3 of the present invention.
Figure 18:
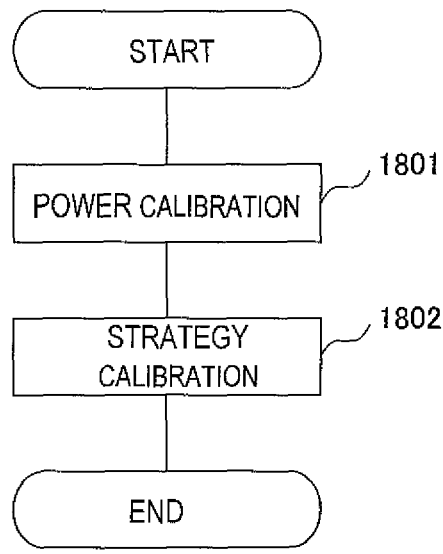
FIG. 18 shows a flow illustrating a concept of a general recording calibration procedure.
Figure 19:
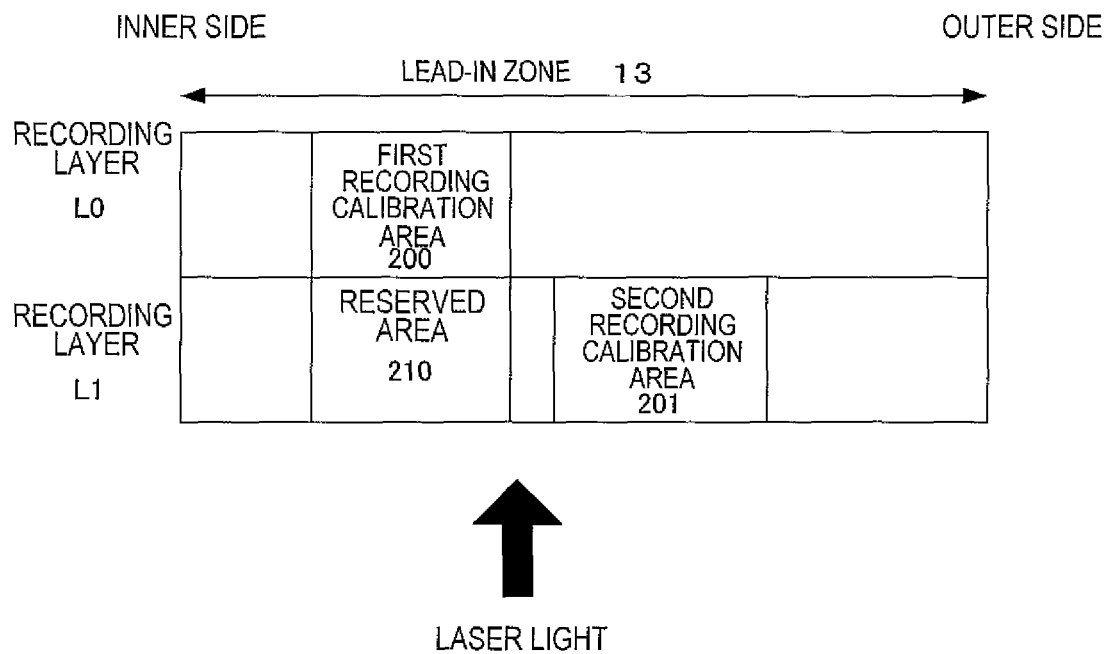
FIG. 19 shows an area arrangement of an optical disc in an example of the conventional art.

FIG. 17 shows an example of information regarding the power calibration areas and the strategy calibration areas in a write once optical disc. In FIG. 17, the same area arrangement as shown in FIG. 15 will be described as an example.

In addition to an identifier 710 and DFL position information 711, the DDS 701 includes end position information and next usable position information on the part of areas for power calibration 51 and end position information and next usable position information on the part of areas for strategy calibration 52 as information relating to the recording calibration in each recording layer. Such information relating to the recording calibration is provided by the number of the recording layers. Namely, the DDS 701 includes L0 power calibration end position information 1701, L0 power calibration next available position information 1702, L0 strategy calibration end position information 1703 and L0 strategy calibration next available position information 1704 as information on the L0 layer; L1 power calibration end position information 1705, L1 power calibration next available position information 1706, L1 strategy calibration end position information 1707 and L1 strategy calibration next available position information 1708 as information on the L1 layer; and L2 power calibration end position information 1709, L2 power calibration next available position information 1710, L2 strategy calibration end position information 1711 and L2 strategy calibration next available position information 1712 as information on the L2 layer.

As described above, the assignment of the part of area for power calibration 51 and the part of area for strategy calibration 52 in each recording layer, and the assignment of the part of areas for power calibration 51 among the recording layers, are determined with an arbitrary size before the OPC areas 50 are used for the first time (for example, at the time of the initialize format). Therefore, the power calibration end position information and the strategy calibration end position information of each recording layer are established at this timing. At the time of assignment, the power calibration next available position information and the strategy calibration next available position information each indicate the start position of the assigned area. When the end position information and the next available position information indicate the same position, or when the interval between the end position information and the next available position information (=remaining size) is less than the size used by one cycle of calibration, it is determined that the area for calibration in that recording layer is used up.

The end position information and the next available position information are each represented by, for example, a PBA, but may be represented by information such as the radial position.

In the above, the DDS 701 includes the end position information. Substantially the same effect is provided where the DDS 701 includes remaining size information, which indicates a usable size of the assigned area, instead of the end position information.

In the case where the DDS 701 includes the end position information, such information is not changed after the part of area for power calibration 51 and the part of area for strategy calibration 52 are assigned. Alternatively, such information may be changed when the areas are re-assigned as described in Embodiments 1 and 2 of the present invention. In the case where the DDS 701 includes the remaining size information, the remaining size information is updated each time the OPC area 50 is used, like the next available position information.

As described in Embodiments 1 and 2 of the present invention, in the case where next usable position information is provided, it is necessary to consider the aligning errors or the influences of the characteristic of the laser light. Therefore, for example, especially the next available position information on a power calibration area or the like, which is influenced by the recording state of another recording layer, needs to indicate position information obtained by adding the above-mentioned offset size to the position at which recording was actually finished, or the power calibration area needs to be actually used from a position obtained by adding the offset size to the position at which recording was finished.

(4) Recording and Reproduction Apparatus

The recording and reproduction apparatus in Embodiment 3 of the present invention is the same as that described in section (4) of Embodiment 1 of the present invention with reference to FIG. 9 and will not be described here.

(5) Recording Calibration Method

The procedure of the recording calibration in Embodiment 3 of the present invention is the same as that described in section (5) of Embodiment 1 of the present invention with reference to FIG. 10 except for steps 1002, 1004 and 1006. Here, only the steps different from those in Embodiment 1 of the present invention will be described.

Step 1002: A position used for the recording calibration is calculated. Specifically, the reproduction control section 156 of the system control section 150 reads the latest DDS 701 included in the latest TDMS from the TDMA of the optical disc 1 onto the memory 170. Based on the read data, the access position management section 154 obtains the information on the position in each of the power calibration area and the strategy calibration area which can be used the next time, of a recording layer on which the recording calibration is to be performed (for example, for L0 layer, the L0 power calibration next available position information 1702 and L0 strategy calibration next available position information 1704). Based on this information, the access position management section 154 determines the size of area to be used for recording in the power calibration area and the strategy calibration area, and the direction of using the power calibration area and the strategy calibration area of the recording layer on which the recording calibration is to be performed. Then, the access position management section 154 calculates the start position of recording for power calibration to be performed next and the start position of recording for strategy calibration to be performed next. The "latest" DDS 701 means the DDS 701 included in the latest of the DMS's 700 included in the TDMA, in which the transitional management information is updated.

Step 1004: The power calibration area next available position information is updated. Specifically, the power calibration section 152 updates the power calibration area next available position information, included in the data corresponding to the DDS 701 read onto the memory 170, of the recording layer on which the recording for power calibration was performed (for example, in the case of L0 layer, the power calibration area next available position information 1702). The update is made from the position at which the recording for power calibration was performed in step 1003.

Step 1006: The strategy calibration next available position information is updated. Specifically, the strategy calibration section 153 updates the strategy calibration next available position information, included in the data corresponding to the DDS 701 read onto the memory 170, of the recording layer on which the recording for strategy calibration was performed (for example, in the case of L0 layer, the L0 strategy calibration next available position information 1704). The update is made from the position at which the recording for strategy calibration was performed in step 1005.

In Embodiment 3 of the present invention, an area in each recording layer used for power calibration does not overlap the areas used in the other recording layers. It is not necessary that the areas used for power calibration are located at different radial positions among all the recording layers. More specifically, as described in Embodiment 1 of the present invention with reference to FIG. 11, the recording characteristic (transmittance or the like) of one recording layer significantly influences the recording state of an adjacent recording layer. Therefore, for example, it is acceptable that among at least adjacent recording layers, areas at different radial positions are used for power calibration, but among non-adjacent recording layers, overlapping areas (areas including the same radial position) are assigned for power calibration. This arrangement does not significantly influence the power calibration results. Namely, even where the areas used for power calibration of the adjacent recording layers (in other words, the recording layers in which the directions of the track path are opposite to each other) do not overlap, but the strategy calibration areas of such recording layers are located at the same radial position, substantially the same effect as described in Embodiment 3 of the present invention can be provided. In addition, the following control is usable: in the case where the number of recording layers is further increased to six or eight, the number of recording layers in which the power calibration areas can be located at the same radial position is limited to N (N is a positive integer of 0 or greater).

In Embodiments 1, 2 and 3 of the present invention, the power calibration area (or the part of area for power calibration 51) is described as an area used for power calibration and the strategy calibration area (or part of area for strategy calibration 52) is described as an area used for strategy calibration. Furthermore, the areas used for power calibration are described as areas which do not overlap among adjacent recording layers at the same radial position, and the areas for strategy calibration are described as areas which include overlapping parts at the same radial position among the adjacent recording layers. More strictly, "areas used for power calibration which do not overlap among adjacent recording layers at the same radial position" are areas in which recording (for example, power calibration) can be performed at a free recording power (in a certain range) including a recording power which cannot be guaranteed as a recording power suitable for the optical disc 1. The "areas used for strategy calibration which include overlapping parts at the same radial position among the adjacent recording layers" are areas in which recording is performed at a recording power which can be guaranteed as a recording power suitable for the optical disc 1, namely, a recording power which, when used for recording in an area, provides the area with a transmittance within a prescribed range without destroying the transmittance balance. These areas may be separately located in each recording layer. Namely, in the case where it is guaranteed that step-by-step recording can be performed while changing the recording power within the range which can be guaranteed as the recording power suitable for the optical disc 1 (within the range in which the post-recording transmittance is within a prescribed range), power calibration may be performed in strategy calibration areas (or parts of areas for strategy calibration 52) including areas overlapping at the same radial position among adjacent recording layers. What may be performed in such areas is not limited to power calibration and strategy calibration. The strategy calibration areas including the overlapping parts may be used for performing, for example, margin checking. Margin checking is to check whether the recording calibration result truly indicates the optimal condition by performing recording at a calibration-calculated recording power or, for example, at a power increased or decreased therefrom within a range which is guaranteed to be suitable to the optical disc 1 (at a power with which the post-recording transmittance is within a prescribed range) and thus to do fine-tuning to find the optical power. Using such a method, the number of times non-overlapping areas are used can be reduced. As a result, the size of the non-overlapping area provided in each recording layer can be reduced. Accordingly, the size of the area including the overlapping part can be increased. Thus, the number of times the areas are used for recording calibration can be advantageously increased.

Some specific examples of such a method will be described in detail.

For example, it is assumed that the optical disc 1 as a recording target is registered in the optical disc recording and reproduction apparatus 100 as a tuned optical disc 1. In this case, the strategy calibration areas including overlapping parts at the same radial position among adjacent recording layers can be used for power calibration and strategy calibration, assuming that the recording can be guaranteed. Alternatively, in the case where the results of calibration performed in the past on a target recording layer by the optical disc recording and reproduction apparatus 100 (calibration history) are left in a drive inherent information area (also referred to as a "drive area") or the like of the optical disc 1, i.e., in the case where calibration is performed using the history information, the strategy calibration areas may be used for power calibration and strategy calibration as the recording calibration on the recording layer, assuming that the recording power for the recording layer can be guaranteed. Alternatively, in the case where the results of recording layer on all the recording layers are left as a calibration history, the following method is effective. From the calibration history, the power ratio, the strategy change amount or the like between a reference recording layer and another recording layer is found. Actual recording calibration (power calibration or strategy calibration) is performed on the reference recording layer, whereas actual recording layer is not performed on the another recording layer. The calibration value of the another recording layer is found using the power ratio or the strategy change amount which was found based on the calibration result on the reference recording layer on which actual calibration was performed and also based on the calibration history. Using such a method, the consumed amount of the power calibration area or the strategy calibration area used for recording calibration is suppressed. In this case, what is used is history calibration. Therefore, the strategy calibration areas including the overlapping parts at the same radial position among adjacent recording layers are used for actual recording calibration. In addition, the following method is usable. As the reference recording layer, the recording layer, for example, farthest from the disc surface (for example, L0 layer in the case of the optical disc 1 shown in FIG. 3A) is first used. When the strategy calibration area in that recording layer is used up, the recording layer next farthest from the disc surface (for example, L1 layer in the case of the optical disc 1 shown in FIG. 3A) is used as the reference layer. Using this method, the following effect is provided for the strategy calibration area on which recording is performed at a power suitable for the optical disc 1. When recording is performed on a certain recording layer, even the strategy calibration area in a recording layer closer to the laser light radiation side can be kept unused (in the case of a write once optical disc, unrecorded). Therefore, it is absolutely unnecessary to consider the influence of the transmittance.

In Embodiments 1, 2 and 3 of the present invention, the recording calibration area (OPC area) for recording calibration is divided into an area for power calibration and an area for strategy calibration, which are separately secured as different areas in each recording layer. This concept is not limited to recording calibration areas. In more detail, the fundamental concept of the present invention is to provide a rough calibration areas used for rough calibration by which conditions are narrowed down to conditions suitable to recording to some extent by changing the recording power, like power calibration in recording calibration, and a precise calibration area used for precise calibration (fine-tuning) by which conditions are to narrowed down to an optimal condition, like strategy calibration area in recording calibration. These areas are provided as separate areas in each recording layer. In addition, in Embodiments 1, 2 and 3 of the present invention, because calibration of the recording power is the target, the rough calibration areas used for power calibration are located at different radial positions in consideration of the recording state (transmittance balance) of the other recording layers. Namely, the fundamental concept of providing a rough calibration area and a precise calibration area as separate areas in each recording layer is applicable to various calibrations other than recording calibration.

As described above, an apparatus (drive) such as an optical disc recording and reproduction apparatus 100 can use the strategy calibration area as an area for calibration as long as the above-described restricting conditions on the recording power are fulfilled. However, the calibration performed in this area is not limited to strategy calibration. The drive can perform any calibration in the strategy calibration area with no limitation on the use. The strategy calibration areas, which are usable by the drive for any calibration, do not need to be arranged so as not to be located at the same radial position unlike the power calibration areas.

As described above, the power calibration in the power calibration areas can be performed at a free recording power (in a certain range). By contrast, in the strategy calibration areas, a recording power within a prescribed range is used after the optimal recording power is determined by the power calibration. This means that the range of the recording power used for the strategy calibration areas is smaller than the range of the recording power used for the power calibration areas. In other words, the varying rate width of the recording power used for the strategy calibration areas is restricted to be equal to or smaller than the varying rate width of the recording power used for the power calibration areas. Herein, the "varying rate width of the recording power" is defined as the ratio of the varying rate of the maximum recording power and/or the varying rate of the minimum recording power with respect to the reference power or the optimal power as 100%.

This will be described with specific examples. FIGS. 28(A) through 28(D) respectively show the relationship between the varying rate width of the recording power used for the power calibration area and that used for the strategy calibration area.

Figure 28:
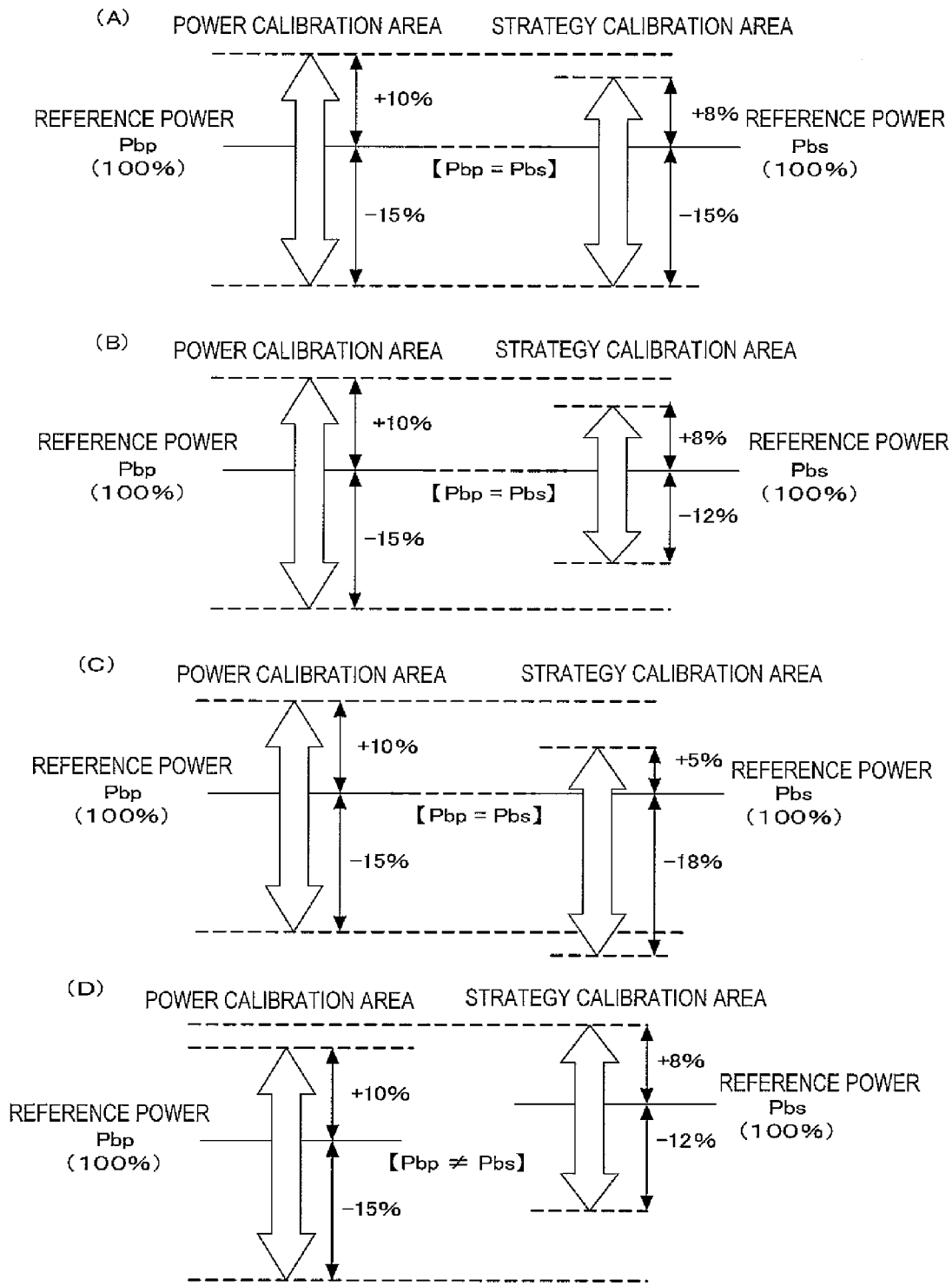
FIG. 28 shows the relationship between the varying rate width of the recording power used for the power calibration area and that used for the strategy calibration area.

In FIG. 28, the reference power of the recording power used for the power calibration area is represented as "Pbp", and the reference power of the recording power used for the strategy calibration area is represented as "Pbs". Herein, the "reference power" is the reference value of the recording power used for performing recording on each individual optical disc. In general, the reference power can be calculated from information on the recording power embedded in the control area or the like of the optical disc 1. Alternatively, the reference power may be calculated from information on the recording power suitable to each type of the optical disc 1 which is held in the optical disc recording and reproduction apparatus 100, or may be calculated based on the calibration history left in the drive inherent information area (Drive Area) of the optical disc 1.

The reference power, even for the same optical disc 1, may have a different value in accordance with the recording speed used for recording or among the recording layers. In general, as the recording speed increases, the recording power increases. Therefore, the above-described information on the recording power may be occasionally prepared for each recording speed or for each recording layer. The reference power Pbp used for the power calibration area and the reference power Pbs used for the strategy calibration area may be the same as each other or different from each other.

FIG. 28(A) shows an example of the varying width of the recording power used for the power calibration area and that used for the strategy calibration area when the reference power used for these areas is the same.

Where the reference power Pbp is 100%, the range of the recording power used for the power calibration area is up to +10% toward the upper limit and up to −15% toward the lower limit, namely, is the range of 110% to 85% with respect to the reference power Pbp (this range will be referred to as the "varying rate width"). By contrast, where the reference power Pbs is 100%, the range of the recording power used for the strategy calibration area is up to +8% toward the upper limit and up to −15% toward the lower limit, namely, is the range of 108% to 85% with respect to the reference power Pbs. When performing the recording calibration in the power calibration area and the strategy calibration area, the drive can set a power in the respective varying rate ranges described above.

As described above, the reference power is the same, and the range toward the lower limit is the same. However, the range toward the upper limit is narrower for the strategy calibration area than for the power calibration area. Namely, the varying rate width and the absolute value of the recording power used for the strategy calibration area are both smaller than those of the recording power used for the power calibration area.

FIG. 28(B) shows another example of the varying width of the recording power used for the power calibration area and that used for the strategy calibration area when the reference power used for these areas is the same.

The range of the recording power used for the power calibration area is 110% to 85% with respect to the reference power Pbp like in FIG. 28(A). By contrast, where the reference power Pbs is 100%, the range of the recording power used for the strategy calibration area is up to +8% toward the upper limit and up to −12% toward the lower limit, namely, is the range of 108% to 88% with respect to the reference power Pbs. In this example, whereas reference power is the same for the power calibration area and the strategy calibration area, the range toward the upper limit and the range toward the lower limit are both narrower for the strategy calibration area than for the power calibration area. Namely, the varying rate width and the absolute value of the recording power used for the strategy calibration area are both smaller than those of the recording power used for the power calibration area.

FIG. 28(C) shows still another example of the varying width of the recording power used for the power calibration area and that used for the strategy calibration area when the reference power used for these areas is the same. The range of the recording power used for the power calibration area is 110% to 85% with respect to the reference power Pbp like in FIG. 28(A). By contrast, where the reference power Pbs is 100%, the range of the recording power used for the strategy calibration area is up to +5% toward the upper limit and up to −18% toward the lower limit, namely, is the range of 105% to 82% with respect to the reference power Pbs. In this example, whereas the range from the reference power to the upper limit power is larger for the power calibration area than for the strategy calibration area, the range from the reference power to the lower limit power is smaller for the power calibration area than for the strategy calibration area.

However, the range from the upper limit power to the lower limit power for the power calibration area, i.e., the varying rate difference between the upper limit power and the lower limit power is 25% for the power calibration area (110%–85%=25%) and is 23% for the strategy calibration area (105%–82%=23%). Thus, the varying rate width is smaller for the strategy calibration area than for the power calibration area.

FIG. 28(D) shows an example of the varying width of the recording power used for the power calibration area and that used for the strategy calibration area when the reference power used for the power calibration area is different from that used for the strategy calibration area. In this example, the reference power Pbs used for the strategy calibration area is larger than the reference power Pbp used for the power calibration area. This corresponds to, for example, when the recording speed of calibration (recording) performed in the strategy calibration area is higher than the recording speed of calibration (recording) performed in the power calibration area.

Where the reference power Pbp is 100%, the range of the recording power used for the power calibration area is up to +10% toward the upper limit and up to −15% toward the lower limit, namely, is the range of 110% to 85% with respect to the reference power Pbp (this range will be referred to as the "varying rate width"). By contrast, where the reference power Pbs is 100%, the range of the recording power used for the strategy calibration area is up to +8% toward the upper limit and up to −12% toward the lower limit like for the power calibration area, namely, is the range of 108% to 88% with respect to the reference power Pbs.

Unlike in FIGS. 28(A) through 28(C), the reference power Pbs is different from the reference power Pbs (Pbp<Pbs). Therefore, in this example, the upper limit value of the recording power used for the strategy calibration area is higher than the upper limit value of the recording power used for the power calibration area. However, regarding the varying rate width of the recording power with respect to the reference power, the range to the upper limit power and the range to the lower limit power are both narrower for the strategy calibration area than for the power calibration area. Namely, the varying rate width of the recording power used for the strategy calibration area is smaller than the varying rate width of the recording power used for the power calibration area.

Such relationships can be expressed by the following expressions:

$$Kp\max \geq Ks\max, \text{ or } Kp\min \leq Ks\min$$

and $$(Kp\max - Kp\min) \geq (Ks\max - Ks\min)$$

In the above expressions, the reference power for the power calibration area is "Pbp", the varying rate toward the upper limit (the ratio between the upper limit power and the reference power) is "Kpmax", the varying rate toward the lower limit (the ratio between the lower limit power and the reference power) is "Kpmin", the reference power for the strategy calibration area is "Pbs", the varying rate toward the upper limit is "Ksmax", and the varying rate toward the lower limit is "Ksmin".

In this manner, suppressing the varying rate width of the recording power has an effect of securely obtaining the transmittance balance in the strategy calibration areas located at the same radial position in all the recording layers and thus securely obtaining the calibration precision.

The examples in FIG. 28 are merely exemplary, and the ranges to (values of) the upper limit and the lower limit are not limited to the above. In other words, it is sufficient as long as the condition that the varying rate width of the recording power used for the strategy calibration area is smaller than (alternatively, equal to or smaller than) the varying rate width of the recording power used for the power calibration area is fulfilled.

In relation with FIG. 28, the following method, for example, is effective for the strategy calibration areas located at the same radial position in all the recording layers. Under the same conditions (e.g., the same recording speed or the same recording layer), the absolute value of the recording power used for the strategy calibration area is restricted to be smaller than (alternatively, equal to or smaller than) the absolute value of the recording power used for the power calibration area. Namely, $$Pbs \times Kp\max \geq Pbs \times Ks\max$$

Restricting the magnitude of the recording power used for the strategy calibration area becomes more effective as the number of stacked recording layers increases. As described above, in the embodiments of the present invention, the strategy calibration areas are located at the same radial position in all the recording layers. Therefore, as the calibration is performed on a recording layer deeper from the laser light incidence surface, the calibration is more likely to be influenced by the transmittance balance of the strategy calibration area of a shallower recording layer which is already subjected to the calibration. By restricting the magnitude of the recording power used for the strategy calibration area, the destruction of the transmittance balance on a shallower recording layer can be suppressed. This is more conspicuous as the number of recording layers increases.

Normally, as the number of recording layers increases, it should become disadvantageous to locate the calibration areas at the same radial position. Nonetheless, according to the present invention, the strategy calibration areas are located at the same radial position. This is realized by restricting the magnitude of the recording power, which is not conventionally considered.

In Embodiments 1, 2 and 3 of the present invention, the optical disc 1 includes three recording layers, for example. The number of the recording layers does not need to be three. Substantially the same effect can be provided where the optical disc 1 includes six or eight recording layers, needless to say.

In Embodiments 1, 2 and 3, a write once information recording medium is used as an example. Substantially the same effect can be provided for a rewritable information recording medium.

In Embodiments 1 and 2 of the present invention, the power calibration areas have the same size among the recording layers, and the strategy calibration areas have the same size among the recording layers. In Embodiment 3 of the present invention, the OPC areas 50 have the same size among the recording layers. Alternatively, these areas may have different sizes among the recording layers. Specifically, for example, the size of the power calibration area or the strategy calibration area may be varied in accordance with the size of the management information area (not shown) included in the lead-in zone 13 or the lead-out zone 15 of each recording layer. Alternatively, the size of the power calibration area or the strategy calibration area may be varied in accordance with the size of a spare area (not shown) provided in the data zone 14 as an alternative area or the like for the defect block of the like.

In Embodiments 1, 2 and 3 of the present invention, the recording calibration is performed at the same timing for all the recording layers. It is not necessary to perform the recording calibration at the same timing. The recording calibration on the target recording layer only needs to be done before usual recording is performed on the target recording layer at the latest. It is not necessary to actually perform the recording calibration on all the recording layers. For example, it is acceptable that the recording calibration is performed on at least one recording layer and the optimal parameters for the other recording layers are found by calculation based on the results obtained for the at least one recording layer. Even in this case, it is regarded that actual calibration is performed on the other recording layers. As one recording layer, for example, a recording layer having the largest remaining size in the area for recording calibration (power calibration area, strategy calibration area, OPC area) may be selected, or a recording layer having the largest size of the area for recording calibration may be selected.

This will be described in detail including the effect. In Embodiments 1, 2 and 3 of the present invention, for example, when the optical disc 1 including a plurality of recording layers is mounted and then a recording request from the host to the user data zone 14 is accepted for the first time, the recording calibration is performed at the same timing on all the recording layers. This method has a disadvantage that the recording calibration at that timing is significantly time-consuming. However, this method also has the following advantages.

After the recording calibration is performed once, even when, for example, the recording layer is replaced with another recording layer in the middle of continuous recording, it is not necessary to perform recording calibration. Therefore, the recording processing performance of the drive system can be kept constant.

For all the recording layers, a uniform recording speed, for example, the highest speed at which the recording calibration was successful for all the recording layers, can be used. Therefore, it is not necessary to manage the recording speed which is different for each recording layer. This can simplify the drive control processing.

This method is effective to, for example, a system which allows a certain period of time to be used before the start of calibration but cannot permit a delay in the recording processing during the continuous recording, which may cause a loss of recording data or the like, for example, a recorder system which has a timer recording function and cannot permit a loss of an image during the recording.

As described above, the following method is also conceivable. For example, when the optical disc 1 including a plurality of recording layers is mounted and then a recording request from the host to the user data zone 14 is accepted for the first time, the recording calibration is performed only on the recording layer indicated by the request. This method has a disadvantage that during continuous recording, it is necessary to perform recording calibration when, for example, the recording layer is replaced with an other recording layer and so the recording processing performance may be occasionally varied. However, this method also has the following advantages.

The time for the recording calibration when the first recording request is accepted can be shortened (the maximum response time for the recording request can be shortened).

Recording calibration is not performed on a recording layer on which recording is not to be performed. Therefore, recording calibration is not performed when unnecessary, for example, when the optical disc 1 is discharged after user data is recorded only on the recording layer L0. Therefore, the use efficiency of the recording calibration areas can be maximized.

This method is effective to, for example, a PC drive system in which a time-out is provided for the recording request from the host and so the response needs to be made within a prescribed time.

When the latter method is adopted, it is necessary to record management information updated by the recording of user data, in addition to performing recording calibration on a recording layer, the recording request on which is accepted. Therefore, the recording calibration on a recording layer including a management information area in which management information is to be recorded the next time (e.g., DMA, or TDMA in the case of a write once optical disc) may be performed at the same time.

In section (3) of Embodiments 1, 2 and 3 of the present invention, as information for identifying the usable position (i.e., for distinguishing a used position or an unused position), information regarding the next usable position is provided. Other than this method, for example, a method of managing the used area and the unused area by a bitmap provides substantially the same effect.

As described in Embodiments 1, 2 and 3 of the present invention, in order to realize a method of re-assigning a part of the strategy calibration area as a power calibration area when the power calibration area is used up, information on the final usable position (end position) of each area, the remaining size, using direction or the like may be further provided. Considering that after the power calibration area is used, a reserved area located at the same radial position in another recording layer is also used, it is effective to consider that one recording layer includes a plurality of power calibration areas and strategy calibration areas, and to keep a list of the start position and the size of such a plurality of power calibration areas and such a plurality of strategy calibration areas, in addition to the next usable position information.

In Embodiments 1, 2 and 3 of the present invention, the power calibration areas are used for the opposite direction to the track path, and the strategy calibration areas are used in the same direction among all the recording layers. This is merely an example.

For example, a track may be destroyed by performing recording in a power calibration area at an excessive power. A method of calibration considering such destruction of the track may be applied to the strategy calibration area as an idea common to the recording calibration processing. In this case, the power calibration area and the strategy calibration area of the same recording layer are used for recording in the same direction. For example, in the L0 layer, both the power calibration area and the strategy calibration area may be used from the outer side toward the inner side, namely, in the opposite direction to the track path.

Alternatively, it is possible to simply use the power calibration area in the opposite direction from the track path but to use the strategy calibration area, in which the recording is performed at a recording power generally suitable to the optical disc 1, in the same direction as the track path. This method works even when an area in the power calibration area is destroyed. Even if recording results in a failure due to a medium defect or the like during the strategy calibration, re-try processing can be performed in continuation from the previous recording. In this manner, access performance can be improved. In the case where the recording fails in the middle of calibration where the area is used in the opposite direction to the track path, a recorded area and an unrecorded area are both left in the calibration area. This causes a problem that it is difficult to search for a border between the recorded area and the unrecorded area when an abnormality occurs. This problem can be solved where the area is used in the same direction as the track path.

In the above, a possible destruction of the power calibration area is mentioned. Some of the medium can never be put into a state where a PBA embedded as wobbles or the like cannot be obtained even when recording is performed at a high power to some extent. Therefore, the direction of use may not be limited for the power calibration areas either, and both the power calibration area and the strategy calibration area may be simply used in the same direction as the track path. Thus, the access performance can be improved both during power calibration and strategy calibration.

For a rewritable information recording medium, overwriting and random access are possible. Therefore, it is not necessary to restrict the manner of usage, unlike the write once information recording medium. Substantially the same manner of usage as described above is also applicable to the rewritable information recording medium. In that case, substantially the same effect can be provided as for the write once information recording medium.

In Embodiments 1, 2 and 3 of the present invention, the areas for power calibration and the areas for strategy calibration do not overlap. For example, power calibration may be performed with light passing through the area which was used for strategy calibration. Specifically, in the case where power calibration is to be performed on L0 layer and the area of the L1 layer at the same radial position has already been used by strategy calibration performed at a certain recording layer, the area of the L0 layer may be used for power calibration because the influence of the transmittance is low.

In Embodiments 1, 2 and 3 of the present invention, a tracking method called "opposite path" is used for the optical disc 1. Substantially the same effect can be provided even by, for example, "parallel path" by which the physical addresses are assigned from the inner side toward the outer side in an ascending order (or in a descending order) in all the recording layers.

(Embodiment 4)

(1) Area Arrangement

Figure 21:
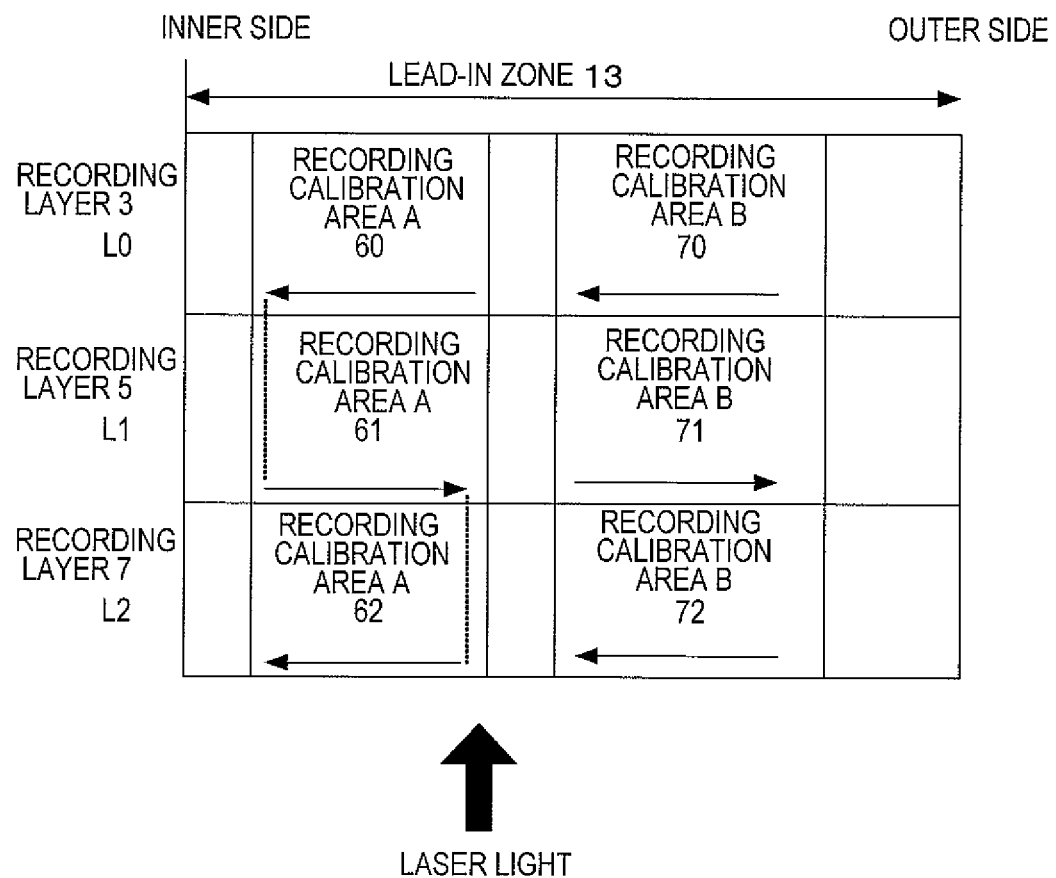
FIG. 21 shows an area arrangement of an optical disc according to Embodiment 4 of the present invention.

FIG. 21 shows an area arrangement of a write once optical disc including three recording layers according to Embodiment 4 of the present invention.

The lead-in zone 13 of the optical disc 1 includes, for recording calibration performed on each recording layer, recording calibration areas A (a recording calibration area A 60 in the L0 layer, a recording calibration area A 61 in the L1 layer and a recording calibration area A 62 in the L2 layer) and recording calibration areas B (a recording calibration area B 70 in the L0 layer, a recording calibration area B 71 in the L1 layer, and a recording calibration area B 72 in the L2 layer). The recording calibration areas A and the recording calibration areas B are of different types from each other. The recording calibration areas A (the recording calibration area A 60 in the L0 layer, the recording calibration area A 61 in the L1 layer, and the recording calibration area A 62 in the L2 layer) are located so as to include overlapping parts at the same radial position. The recording calibration areas B (the recording calibration area B 70 in the L0 layer, the recording calibration area B 71 in the L1 layer, and the recording calibration area B 72 in the L2 layer) are also located so as to include overlapping parts at the same radial position. Herein, the "same radial position" may not be the same radial position in a precise sense. Namely, the "same radial position" has the meaning described in Embodiment 1, and radial positions which are deviated due to aligning errors of the recording layers, influences of characteristics of laser light and the like are regarded as the "same radial positions".

The recording calibration areas A are, like the power calibration area or the like described in Embodiment 1, areas where recording calibration may be performed at an arbitrary recording power with no limitation (hereinafter, such recording calibration will occasionally be referred to as the "recording calibration A"). For example, power calibration by which recording is conducted while changing the recording power step by step (step-by-step recording) may be performed.

The recording calibration areas A are located so as to include overlapping parts at the same radial position in the recording layers, and recording is permitted to be performed at an arbitrary power. Therefore, in the case where, for example, laser light used for performing recording calibration in the recording calibration area A of one recording layer is transmitted through the corresponding area of another recording layer on which power calibration with step-by-step recording has already been performed, the transmittance is possibly varied to cause an obstacle to provide proper calibration results. In order to avoid this, the recording calibration areas A are restricted to be used sequentially from the recording layer farthest from the side on which laser light is incident. Namely, in the case of, for example, the optical disc 1 shown in FIG. 21, the recording layer on the laser light incidence side is the L2 layer, and the recording layer located farthest therefrom is the L0 layer. Therefore, the recording calibration areas A are sequentially used from the recording calibration area A 60 in the L0 layer. When the recording calibration area A 60 in the L0 layer is used up, the recording calibration area A 61 in the L1 layer and then the recording calibration area A 62 in the L2 layer are used sequentially. By using the areas in this manner, the recording calibration layer(s) A in the recording layer(s) on the laser incidence side with respect to the recording calibration area A to be now used is(are) always in an unused (unrecorded) state. Thus, the influence of the transmittance variance or the like on the recording calibration results can be prevented.

The recording calibration areas B are, like the strategy calibration area or the like described in Embodiment 1, areas where recording is performed at a recording power guaranteed to be generally suitable to the optical disc 1, namely, at a recording power which, when used for performing recording in an area, provides the area with a transmittance within a prescribed range to such a degree that does not spoil the transmittance balance (hereinafter, such recording will occasionally be referred to as the "recording calibration B"). For example, for adjusting the pulse width, strategy calibration by which recording is conducted while changing the pulse width and fixing the recording power to the recording power which is obtained by the power calibration and is generally suitable to the optical disc 1 may be performed.

The recording calibration areas B are also located so as to include overlapping parts at the same radial position in the recording layers, and recording is performed at a recording power generally suitable to the optical disc 1, for example, the recording power obtained by the power calibration. Therefore, even if recording is performed with laser light which was passed through a recording calibration area B of another recording layer on which recording was already performed, it is considered that the current recording calibration area B is not substantially influenced by the transmittance provided by the recording state of the another recording layer (the influence can be suppressed to a negligible level). For this reason, unlike the recording calibration areas A, there is no restriction on the order of use. Namely, regardless of the state of the recording calibration area(s) B in the other recording layer(s), the recording calibration area B in an arbitrary recording layer can be used at an arbitrary timing.

Figure 22:
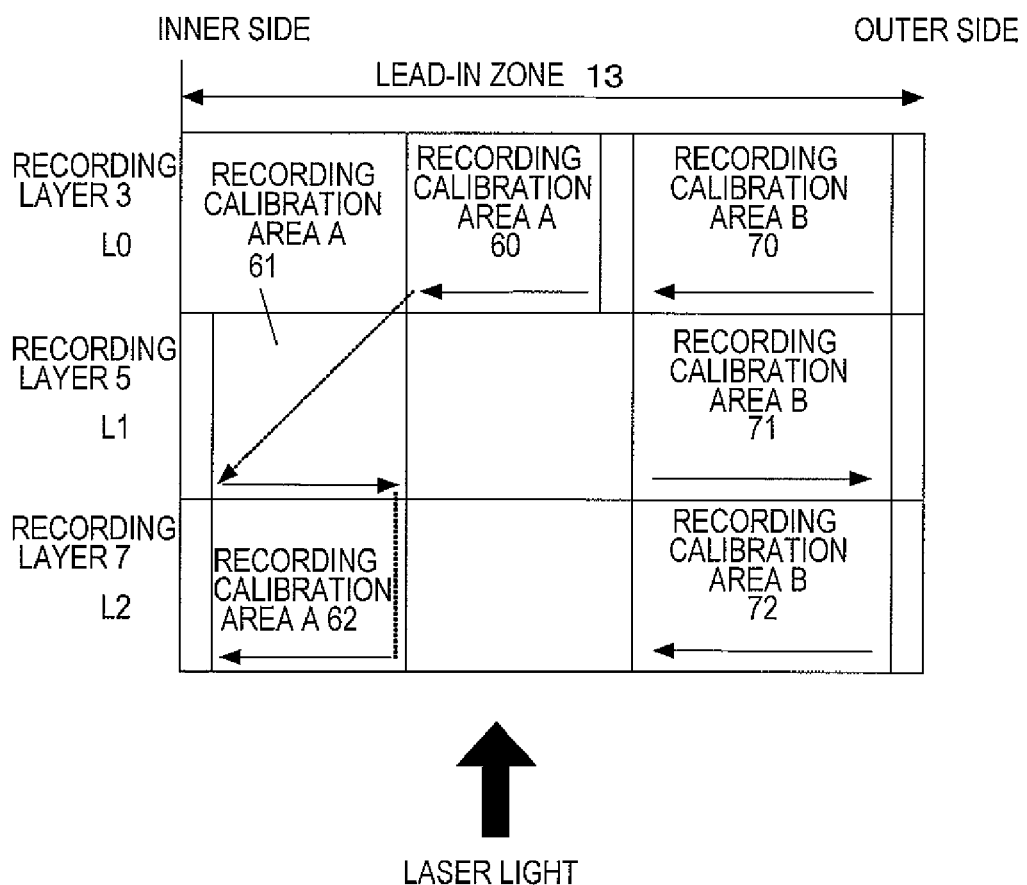
FIG. 22 shows another example of an area arrangement of an optical disc according to Embodiment 4 of the present invention.

FIG. 21 shows an example in which all the recording calibration areas A include overlapping parts at the same radial position (are located at the same radial position). It is not absolutely necessary that the recording calibration areas A in all the recording layers have overlapping parts at the same radial position. The area arrangement shown in FIG. 21 is the most efficient arrangement of the areas for recording calibration in the lead-in zone 13 (or in the lead-out zone 15). However, as shown, for example, in FIG. 22, only the recording calibration area A 60 in the L0 layer may be located at a different radial position from the other recording calibration areas A in the other recording layers. Although the ratio of the area for recording calibration occupying the lead-in zone 13 (or the lead-out zone 15) is slightly larger than in the example shown in FIG. 21, substantially the same effects as those of the example shown in FIG. 21 can be provided as long as the order of use is restricted in the same manner. Like the recording calibration areas A, even if all the recording calibration areas B do not include overlapping parts at the same radial position, substantially the same effects can be provided.

(2) How to Use the Areas

How to use the recording calibrations A and the recording calibration areas B will be described in more detail with reference to FIG. 21. In FIG. 21, the arrows represent the directions in which the recording calibration areas A and the recording calibration areas B are used (recorded).

In one recording layer, recording is performed in a write once manner both in the recording calibration area A and recording calibration area B (for example, the recording calibration area A 60 and the recording calibration area B 70 in the L0 layer). Namely, the recording calibration area A and the recording calibration area B are used in a respective prescribed direction (for example, the recording calibration area A and the recording calibration area B are both used in the opposite direction to the track path; in the case of FIG. 21, the recording calibration area A 60 and recording calibration area B 70 in the L0 layer are used from the outer side toward the inner side). As described in (2) How to use the areas in Embodiment 1 of the present invention, the areas are used in this manner in consideration of the following: at the stage of performing power calibration with step-by-step recording at an arbitrary power, the power adjustment has not been done; and so it is not guaranteed that the recording is performed at an appropriate power, and it may be possible that the recording is performed at a very high power and as a result, the track 11 is destroyed.

As described above, the recording calibration areas A are restricted to be used sequentially from the recording layer farthest from the laser incidence side (from the deepest recording layer). In the case of, for example, the optical disc shown in FIG. 21, the recording calibration areas A are sequentially used from the recording calibration area A 60 in the L0 layer farthest from the laser light incidence side (from the deepest recording layer). When the recording calibration area A 60 is used up, the recording calibration area A 61 in the L1 layer and the recording calibration area A 62 in the L2 layer are used sequentially.

The direction of use of the recording calibration areas A and the recording calibration areas B in each recording layer shown in FIG. 21 is merely an example, and the present invention is not limited to this. FIG. 21 shows an example in which the recording calibration area A and the recording calibration area B included in the same recording layer are used in the same direction, i.e., in the opposite direction to the track path. Alternatively, the direction of use may be as follows: the recording calibration area A, in which recording is not guaranteed to be performed at an appropriate recording power, is used in the opposite direction to the track path; whereas the recording calibration area B, in which recording is guaranteed to be performed at a recording power generally suitable to the optical disc 1, is used in the same direction as the track path. Regarding the recording calibration area A, this works even when the area is destroyed during the power calibration. Regarding the recording calibration area B, even if recording results in a failure in the middle of the strategy calibration due to a medium defect or the like, re-try processing can be performed in continuation from the previous recording, for example. In this manner, an effect of improving access performance is provided. In the case where the recording fails in the middle of the calibration where the recording calibration area B is used in the opposite direction to the track path, a recorded area and an unrecorded area are both left in the calibration area. This causes a problem that it is difficult to search for a border between the recorded area and the unrecorded area when an abnormality occurs. This problem can also be solved where the area is used in the same direction as the track path. In addition, in a medium in which the possibility that address acquirement results in a failure due to area destruction is very low, all the recording calibration areas A may be used in the same direction as the track path. In consideration of the re-assignment of the areas described in Embodiment 1 and the like of the present invention, all the recording calibration areas B in all the recording layers may be used in the same direction (for example, from the inner side toward the outer side).

Now, an example of using the recording calibration areas A in a restricted manner, i.e., from the recording layer farthest from the laser light incidence side will be described with reference to FIG. 23.

FIG. 23(A) shows the state of the optical disc 1 of the write once type on which recording calibration is to be performed now. It is assumed that among the recording calibration areas A which are restricted regarding the order of use, the recording calibration area A 60 in the L0 layer is being used, an R block (cluster) represents the remaining, i.e., usable size of the recording calibration area A 60 in the L0 layer, and an L block (cluster) represents the size usually used for calibration performed in the recording calibration area A (for example, power calibration). Herein, the "size usually used for calibration" means the minimum size (number of blocks) used for the calibration, which does not include a part used for processing performed when abnormality occurs, such as re-try processing.

In the case where the size usually used for the recording calibration (the size of the L block) is less (smaller) than, or equal to (the same as), the remaining size (the size of the R block) of the recording calibration area A which is being used (in the case of FIG. 23(A), the recording calibration area A 60 in the L0 layer), the recording calibration can be performed in the recording calibration area A of the target layer (in the case of FIG. 23(A), the recording calibration area A 60 in the L0 layer) from the position indicated as the next available start position.

By contrast, as actually shown in FIG. 23(A), in the case where the size usually used for the recording calibration (the size of the L block) is greater (larger) than the remaining size (the size of the R block) of the recording calibration area A which is being used (in the case of FIG. 23(A), the recording calibration area A 60 in the L0 layer), the recording calibration cannot be completed merely with the recording calibration area A of the target layer (in the case of FIG. 23(A), the recording calibration area A 60 in the L0 layer). In such a case, it is conceivable to first perform the recording calibration in the recording calibration area A of the target layer (in the case of FIG. 23(A), the recording calibration area A 60 in the L0 layer) using the usable size and then compensate for the shortage with the recording calibration area A of the next available recording layer (in the case of FIG. 23(A), the recording calibration area A 61 in the L1 layer). However, when the recording layer is replaced with another recording layer in the middle of the same cycle of recording calibration (e.g., power calibration), the difference in the recording characteristics between the recording layers causes a variance in the calibration results and brings complicated and difficult issues regarding the calibration time, the method of determination on the calibration results and the like. In order to avoid this, the following method shown in FIG. 23(B) is effective: the empty area (the size of the R block) represented by the next available start position in the recording calibration area A of the recording layer which is being used (in the case of FIG. 23(B), the recording calibration area A 60 in the L0 layer) is treated as an unusable area; and the entire calibration corresponding to the necessary size (the size of the L block) is performed in the recording calibration area A of the next available recording layer (in the case of FIG. 23(B), the recording calibration area A 61 in the L1 layer).

In this case, the area left without being unused may be left in an unused (unrecorded) state or put into a recorded state by recording arbitrary meaningless power data therein.

It can also occur that the size (number of sectors, or number of blocks) actually used for the recording calibration becomes larger than the size (the size of the L block) which was recognized as being necessary before the calibration. For example, re-try may be performed after the recording fails in the middle of the processing of power calibration. In such a case, an area larger than the L block may be possibly used by one cycle of calibration. In order to avoid this, a size (number of sectors, or number of blocks) with a margin, not the minimum possible size, may be set as the size necessary for the calibration (the size of the L block). Alternatively, the minimum possible size may be set as the size necessary for the calibration (the size of the L block); and in the case where the calibration cannot be completed merely with the recording calibration area A of the target layer as a result of performing re-try, the recording calibration may be performed from the re-try calibration in the recording calibration area A of the next available recording layer.

(3) How to Provide Information on the OPC Areas

Figure 24:
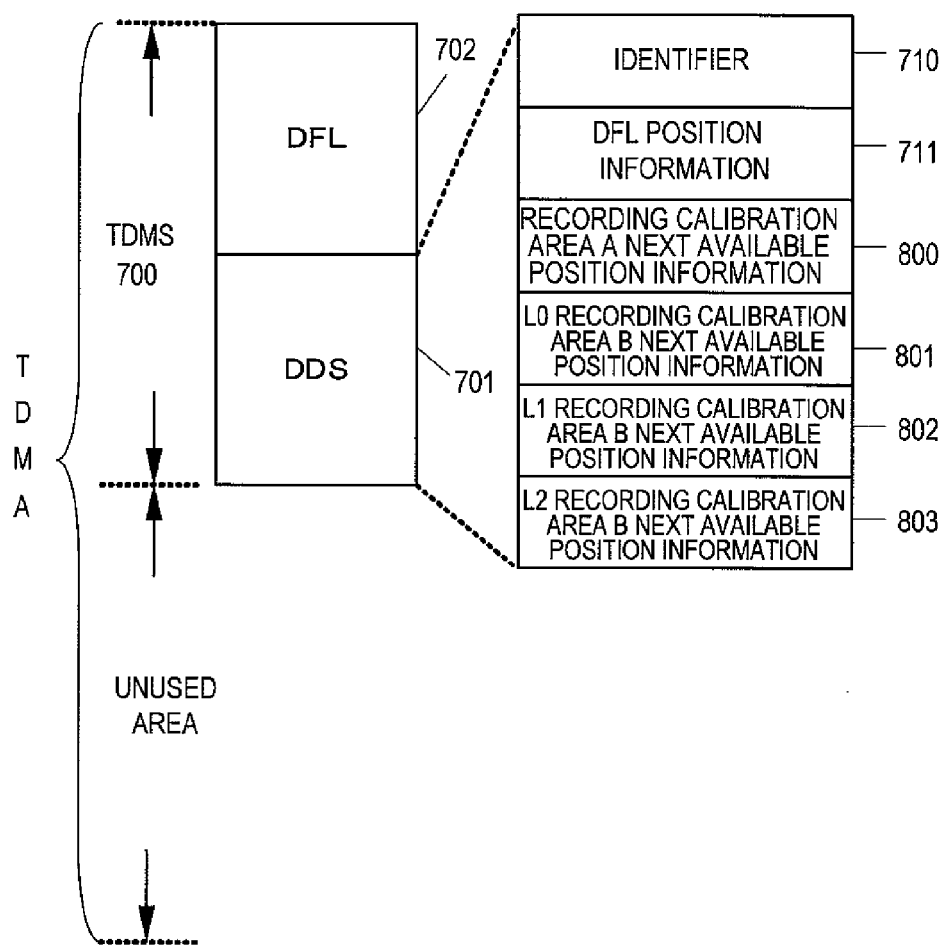
FIG. 24 shows a data structure relating to recording calibration in the optical disc according to Embodiment 4 of the present invention.

FIG. 24 shows an example of information regarding the recording calibration areas A and the recording calibration areas B in a write once optical disc. Here, the area arrangement of the optical disc 1 shown in FIG. 21 will be described as an example. FIG. 24 is provided to show information on the recording calibration like in Embodiment 1, (3) of the present invention. Therefore, the TDMS 700, which is information recorded at recordable timings, i.e., at transitional timings before the finalization, will be described as an example.

In the TDMA, a TDMS 700 is recorded including disc management information such as a DFL 702 which is information on defect positions or alternative recording and also a DDS 701 including the position information on the DFL 702, the position information on the areas of the optical disc and the like.

The DDS 701 includes an identifier 710 indicating that this information is a DDS, DFL position information 711 indicating the position at which the DFL 702 is recorded, recording calibration area A next available position information 800 (hereinafter, referred to as the "NAPA 800") which is one piece of position information representing the next available position (pointer information) provided for all the recording layers each having the recording calibration area A, L0 recording calibration area B next available position information 801 (hereinafter, referred to as the "L0-NAPB 801") for the L0 layer recording calibration area B 70, L1 recording calibration area B next available position information 802 (hereinafter, referred to as the "L1-NAPB 802") for the L1 layer recording calibration area B 71, and L2 recording calibration area B next available position information 803 (hereinafter, referred to as the "L2-NAPB 803") for the L2 layer recording calibration area B 72. The L0-NAPB 801, the L1-NAPB 802 and the L2-NAPB 803 each represent the next available position in the recording calibration area B in the corresponding recording layer (pointer information). Unlike the information for the recording calibration areas B, there is only one piece of information for the recording calibration areas A of all the recording layers each having the recording calibration area A. The reason for this is that the recording calibration areas A are restricted to be used sequentially from the recording layer farthest from the laser light incidence side, and thus it is not necessary that each recording layer holds this information as the start position information.

The information included in the TDMS (DMS) is not limited to the DFL 702 which is the disc management information and the DDS 701 including the information on the position thereof. Specifically, for example, the information included in the TDMS (DMS) may include SRRI, which represents the location, or the state of use, of a track (SRR) in the data zone 14 on the optical disc 1, and SBM, which represents the recorded/unrecorded state which is used for random recording, as the disc management information in addition to the DFL 702.

The DFL 702 and the DDS 701 are not necessarily recorded continuously, for the following reason. In the case where, for example, the DFL 702 is already recorded in the TDMA and does not need to be updated but only the data in the DDS 701 needs to be updated, there may be the case where only the DDS 701 is recorded as DFL position information 711 which represents the position of the DFL 702 already recorded.

Figure 25:
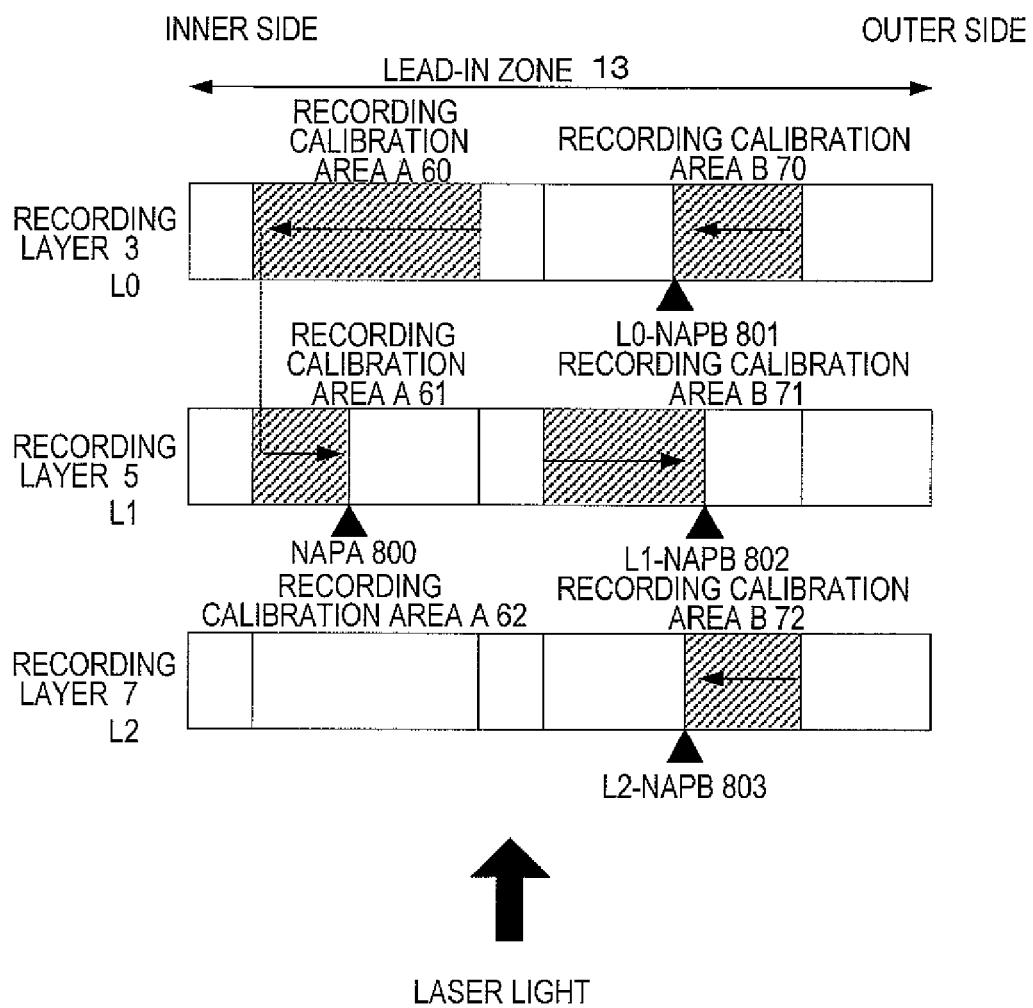
FIG. 25 shows a specific example of information relating to recording calibration in the optical disc according to Embodiment 4 of the present invention.

FIG. 25 illustrates the next available position information described with reference to FIG. 24.

In FIG. 25, the only one NAPA 800 for all the recording layers each having the recording calibration area A points to a position in the middle of the recording calibration area A 61 in the L1 layer. This indicates the following: the recording calibration area A 60 in the L0 layer is all used up (no area of a usable size is left); regarding the recording calibration area A 61 in the L1 layer which is used from the inner side toward the outer side, a part from the inner border of the recording calibration area A 61 to the position pointed to by the NAPA 800 has been used; and for performing next calibration using the recording calibration area A, a part outer to the position pointed to by the NAPA 800 is usable.

The recording calibration area B is not restricted regarding the order of use or the like. FIG. 25 indicates the following: regarding the recording calibration area B 70 in the L0 layer and the recording calibration area B 72 in the L2 layer which are used from the outer side toward the inner side, a part from the outer border of the recording calibration area B 70 to the position pointed to by the L0-NAPB 801 and a part from the outer border of the recording calibration area B 72 to the position pointed to by the L2-NAPB 803 have been used; and regarding the recording calibration area B 71 in the L1 layer which is used from the inner side toward the outer side, a part from the inner border of the recording calibration area B 71 to the position pointed to by the L1-NAPB 802 has been used.

Regarding the recording calibration areas B, as the number of recording layers included in the optical disc 1 increases or decreases, the number of pieces of information required increases or decreases accordingly. Regarding the recording calibration areas A, even if the number of recording layers increases or decreases, the number of pieces of information required remains one.

The above-described next available position information is represented by, for example, PBA, which is position information on the optical disc 1.

(4) Recording and Reproduction Apparatus

Figure 26:
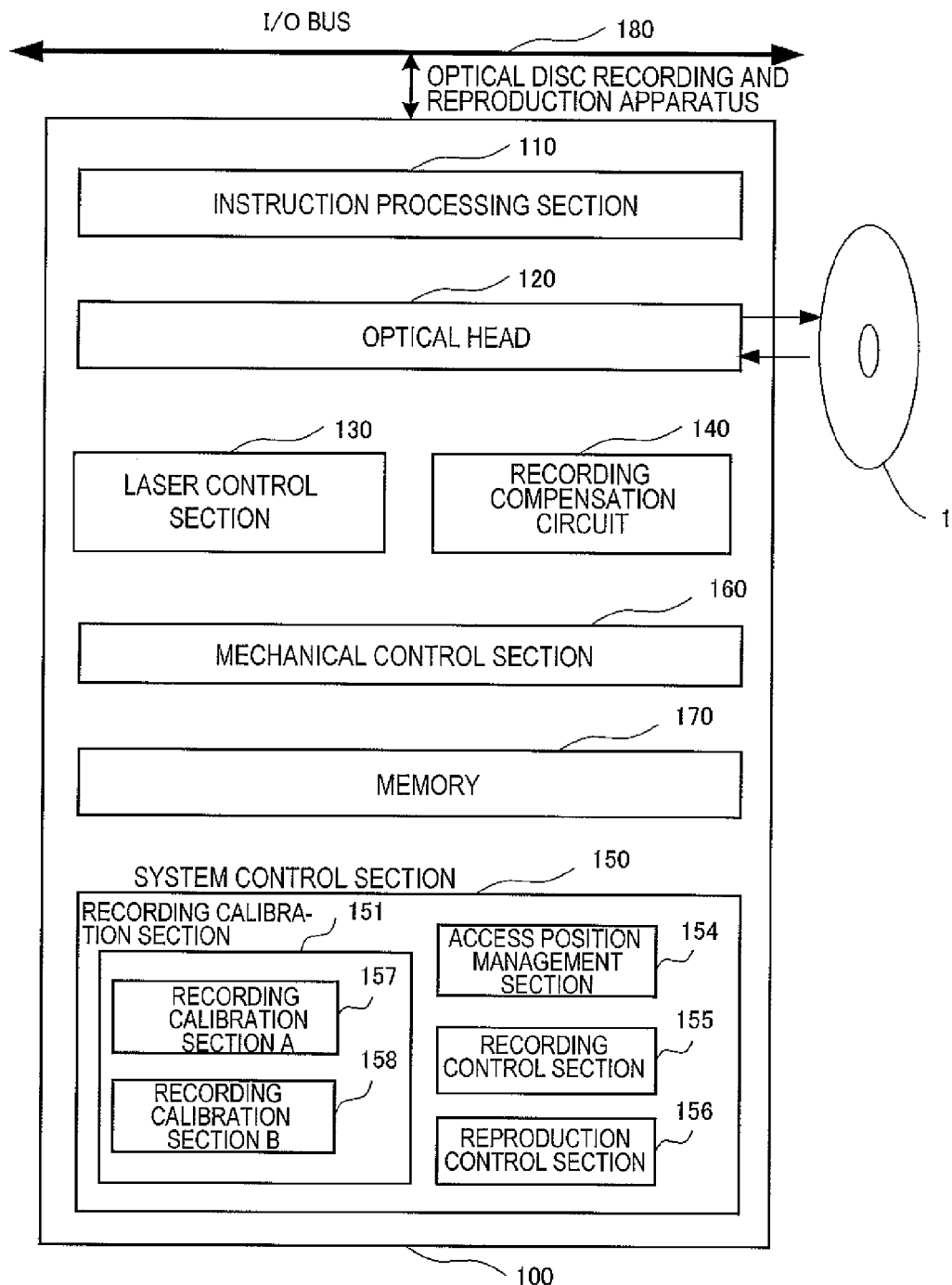
FIG. 26 is a structural view of an optical disc recording and reproduction apparatus according to Embodiment 4 of the present invention.

FIG. 26 shows a structure of an optical disc recording and reproduction apparatus 100 according to Embodiment 4 of the present invention, for performing recording to, or reproduction from, the optical disc 1.

The optical disc recording and reproduction apparatus 100 according to Embodiment 4 of the present invention is the same as that described in Embodiment 1, (4) of the present invention with reference to FIG. 9, except for a recording calibration section A 157 and a recording calibration section B 158 included in the recording calibration section 151. Identical elements as those in FIG. 9 will not be described again.

The recording calibration section A 157 is a block for controlling recording calibration performed in the recording calibration areas A (recording calibration A), and controls recording calibration performed at an arbitrary recording power, such as power calibration with step-by-step recording.

The recording calibration section B 158 is a block for controlling recording calibration performed in the recording calibration areas B (recording calibration B), and controls recording calibration performed at a power in the range which is guaranteed to be suitable to the optical disc 1. Such recording calibration is, for example, strategy calibration of adjusting the pulse width, or margin checking for performing recording at a power increased or decreased within a range which is guaranteed to be generally suitable to the optical disc 1 (at a power with which the post-recording transmittance is within a prescribed range) and thus doing fine-tuning to find an optimal power.

(5) Recording Calibration Method

A recording calibration method on the optical disc 1 according to Embodiment 4 of the present invention will be described.

The recording calibration areas A in which recording may be performed at an arbitrary recording power are used sequentially from the recording layer farthest from the laser light incidence side, and power calibration with step-by-step recording of changing the power step by step may be performed therein. The recording calibration areas A are located so as to include overlapping parts at the same radial position, and are used sequentially from the recording layer farthest from the laser light incidence side. Therefore, even if recording is performed on a recording layer at an excessively high power, this does not influence the recording calibration results in the other recording layers. The reason is that it can be guaranteed that there is no recording layer with a recording calibration area A farther (deeper) than the recording layer in which such recording at an excessively high power is performed or that the recording calibration area(s) in such farther (deeper) recording layer(s) have been already used.

However, for example, power calibration in the recording calibration area A cannot be performed on all the recording layers at the same timing, but can be performed on only one recording layer. Therefore, the recording power suitable for the recording layers of the optical disc 1, other than the recording layer in which the power calibration has been performed, cannot be obtained by the power calibration.

One solution to this problem is to use the results of the recording calibration (power calibration) in one recording layer and a recommended recording power pre-recorded in the control area (also referred to as the "physical management information area"; not shown) in the lead-in zone or the lead-out zone at the time of disc production.

The optical disc 1 includes an area called the control area (in the case of a BD, a PIC (Permanent Information & Control data) area) in which various parameters on the optical disc 1 are embedded at the time of the production thereof. In this area, information on the recommended recording power, the recommended strategy or the like suitable for each recording layer or each recording speed is embedded. Therefore, if the recording is performed at the recommended recording power or the recommended strategy embedded in the control area, there should be no need to perform recording calibration. However, the recording power or the recording pulse width suitable for actual recording does not necessarily match the recording power or the like embedded in the control area because of the temperature or humidity at the time of actually performing recording on the optical disc 1, the individual variation of the optical head 120 in the optical disc recording and reproduction apparatus 100 used for directing the optical laser, dust or stain attached to the optical head 120 or the optical disc 1, and the like. For this reason, recording calibration such as power calibration or strategy calibration is performed before the optical disc is actually used by the optical disc recording and reproduction apparatus 100. However, as described above, the object of the recording calibration is to make the recording power or the recording pulse width suitable to the various environmental parameters in which the recording is performed, and it is considered that the recording characteristic of each recording layer is not substantially changed as a result of the recording calibration. Namely, power calibration is actually performed on one recording layer of the optical disc 1. A difference (change ratio) between the recording power found by the power calibration and the recommended recording power embedded in the control area of the optical disc 1 is found. The change ratio and the recommended recording power for another recording layer for which power calibration could not be performed are used (for example, multiplied) to obtain, by calculation, the recording power suitable for the another recording layer for which power calibration could not be performed. In this manner, a recording power generally suitable to the another recording layer can be obtained which is substantially equal to the recording power which would be obtained by actual power calibration performed on the another recording layer. By using the recording power thus obtained, the strategy calibration, margin checking for fine-tuning the power or like is performed in the recording calibration areas B of the recording layers for which there is a limitation on the recording power but there is no restriction on the order of use. In this manner, the recording parameter such as the recording power or the recording pulse width (recording strategy) suitable to the recording layers other than the recording layer on which the power calibration has been actually performed in the recording calibration area A can be confirmed.

The above-described method will be described with reference to the flowchart shown in FIG. 27.

Step 2701: Information necessary for the recording calibration is obtained. Specifically, the reproduction control section 156 of the system control section 150 reads the latest DDS 701 included in the latest DMS 700 from the TDMA of the optical disc 1 onto the memory 170 and also reads physical management information (information such as PIC or the like) from the control area onto the memory 170. In the case where the results of the calibration performed in the past by the optical disc recording and reproduction apparatus 100 (calibration history) are left in a drive inherent information area (also referred to as a "drive area") or the like of the optical disc 1 which is the recording calibration target, this information is also read. Based on the latest DDS 701 read, the access position management section 154 obtains the NAPA 800, which is information on the next available position in the recording calibration area A, and information on the next available position in the recording calibration area B of each recording layer (L0-NAPB 801, L1-NAPB 802, L2-NAPB 803). Based on the physical management information, the recording calibration section 151 obtains the recording parameters suitable to the conditions of the recording calibration to be performed (for example, information such as the recommended recording power corresponding to the recording speed of the recording calibration to be performed on the recording layer which includes the position pointed to by the NAPA 800). The "latest" DDS 701 means the DDS 701 included in the latest of the DMS's 700 included in the TDMA, in which the transitional management information is updated.

Step 2702: Recording calibration A (for example, power calibration) is performed in the recording calibration area A. Specifically, the access position management section 154 confirms the start position of the power calibration based on the position pointed to by the NAPA 800 in the recording calibration area A of a recording layer Ln (n is the layer number and a positive number of 0 or greater) (for example, in the case of FIG. 25, the NAPA 800 points to a position in the recording layer L1, and so n is 1 and the recording calibration area A is the recording calibration area A 61 in the recording layer L1). The recording calibration section A 157 determines the laser radiation power suitable to the target recording layer, the recording speed and the like (for example, a plurality of patterns of laser power for performing step-by-step recording) and sets the laser radiation power in the laser control section 130. The recording calibration section A 157 also sets a prescribed strategy (for example, the strategy described in the control area) in the recording compensation circuit 140. Furthermore, the recording calibration section A 157 moves the optical head 120 using the mechanical control section 160 to the start position of the power calibration calculated by the access position management section 154, and performs the recording. Based on the recording quality of the recorded area (for example, the modulation degree or BER), the recording calibration section A 157 finds an optimal recording power (for example, a power, among the plurality of patterns of laser power, at which the modulation degree is closest to the expected value). Then, the recording calibration section A 157 updates the recording calibration area A next available position information (NAPA) 800, among the data corresponding to the DDS 701 in the memory 170, by the part used for the power calibration.

As described above in Embodiment 4, (2) of the present invention with reference to FIG. 23, the power calibration is not necessarily performed in the recording calibration area A of the recording layer pointed to by the NAPA 800 depending on the usable size of the recording calibration area A of the recording layer pointed to by the NAPA 800.

If the recording for power calibration results in a failure, the access position may by found again by the access position management section 154 based on the position at which the failed recording was performed, and step 2702 may be performed again as a retry.

Step 2703: The power change ratio is calculated. Specifically, the recording calibration section 151 stores, in the memory 170, a power change ratio 2700 obtained from the recommended recording power (referred to as Pwi) for the recording layer Ln, which is read from the control area into the memory 170, and the optimal recording power (referred to as Pwo) found in step 2702 (the power change ratio 2700 is, for example, Pwo/Pwi). In the case where the power change ratio 2700 is not within a prescribed range (for example, in the range of 95% to 100%), the found power may be determined not to be suitable to the optical disc 1 and the processing may be re-executed from step 2702 as a re-try.

The power change ratio 2700 does not need to be a value obtained by dividing Pwo by Pwi, and may be any value which represents the power change ratio.

Step 2704: Recording calibration B is performed in the recording calibration area B in the recording layer Ln on which calibration was performed using the recording calibration area A (the recording calibration B is strategy calibration, margin checking, etc.; hereinafter, it is assumed that strategy calibration is performed as the recording calibration B). Specifically, the access position management section 154 confirms the start position of the strategy calibration based on the position pointed to by the Ln-NAPB, which is the next available position information on the recording calibration area B in the recording layer Ln on which the calibration was performed in step 2702 using the recording calibration area A (for example, in the case where the NAPA 800 is as shown in FIG. 25, the Ln-NAPB is L1-NAPB 802, which is the next available position information on the recording calibration area B 71 in the recording layer L1 on which the recording calibration A (power calibration) was performed). The recording calibration section B 158 sets the optimal recording power, found by the power calibration in step 2702, in the laser control section 130. The recording calibration section B 158 also sets a strategy (for example, a plurality of patterns of strategy) in the recording compensation circuit 140. Furthermore, the recording calibration section B 158 moves the optical head 120 using the mechanical control section 160 to the start position of the strategy calibration calculated by the access position management section 154, and performs the recording. Based on the recording quality of the recorded area (for example, the modulation degree or BER), the recording calibration section B 158 finds an optimal recording strategy (for example, a strategy, among the plurality of patterns of strategy conditions, at which the phase error is smallest). Then, the recording calibration section B 158 updates the Ln recording calibration area B next available position information (in the case where n is 1 (in the case of the recording layer L1), L1-NAPB 802), among the data corresponding to the DDS 701 in the memory 170, by the part used for the strategy calibration.

If the recording for strategy calibration results in a failure, the access position may be found again by the access position management section 154 based on the position at which the failed recording was performed, and step 2704 may be performed again as a retry.

Step 2705: Processing from steps 2706 through 2707 (recording calibration processing in the recording calibration area B) described later is repeated for all the recording layers Lm except for the recording layer on which the recording calibration B was performed in step 2704 (except for the recording layer Ln) (m is the layer number and is a positive number of 0 or greater which fulfills n≠m). For example, in the case of the optical disc 1 in the state shown in FIG. 25, the recording calibration A (power calibration) using the recording calibration area A is performed on the recording layer 5 (L1 layer), and so the recording calibration B in step 2704 is also performed on the L1 layer. Therefore, the processing from steps 2706 through 2707 is repeated on the recording layer 3 (L0 layer) and the recording layer 7 (L2 layer) other than the recording layer 5 (L1 layer).

Step 2706: An optimal recording power for the recording layer Lm is found. Specifically, the recording calibration section 151 multiplies the power change ratio 2700 calculated by step 2703 and the recommended recording power for the recording layer Lm which is read from the control area into the memory 170 to find the optimal recording power for the recording layer Lm (precisely, the recording power is generally suitable to the recording layer Lm because such a power is found by calculation).

Step 2707: Recording calibration B (strategy calibration, margin checking, etc.; hereinafter, it is assumed that strategy calibration is performed as the recording calibration B) is performed on the recording layer Lm. Specifically, the access position management section 154 confirms the start position of the strategy calibration based on the position pointed to by the Lm-NAPB, which is the next available position information on the recording calibration area B in the recording layer Lm (for example, in the case where m is 0 (in the case of the recording layer L0), L0-NAPB 801, which is the next available position information on the recording calibration area B 70). The recording calibration section B 158 sets the optimal recording power, found in step 2706, in the laser control section 130. The recording calibration section B 158 also sets a strategy (for example, a plurality of patterns of strategy) in the recording compensation circuit 140. Furthermore, the recording calibration section B 158 moves the optical head 120 using the mechanical control section 160 to the start position of the strategy calibration calculated by the access position management section 154, and performs the recording. Based on the recording quality of the recorded area (for example, the modulation degree or BER), the recording calibration section B 158 finds an optimal recording strategy (for example, a strategy, among the plurality of patterns of strategy conditions, at which the phase error is smallest). Then, the recording calibration section B 158 updates the Lm recording calibration area B next available position information (in the case where m is 0 (in the case of the recording layer L0), L0-NAPB 801), among the data corresponding to the DDS 701 in the memory 170, by the part used for the strategy calibration.

If the recording for strategy calibration results in a failure, the access position may be found again by the access position management section 154 based on the position at which the failed recording was performed, and step 2707 may be performed again as a retry.

Step 2708: The processing from steps 2706 through 2707 described above is repeated for all the recording layers Lm except for the recording layer Ln on which the recording calibration B was performed in step 2704. When there is a recording layer on which recording calibration has not been finished, the processing returns to step 2705. When recording calibration has been finished on all the recording layers except for the recording layer on which calibration was performed in the recording calibration area A in step 2704, the processing advances to step 2709.

Step 2709: When the recording calibration is finished, the latest management information is recorded (the management information is updated to the latest management information) in the TDMA. Specifically, the system control section 150 uses the recording control section 155 to record data, corresponding to a DDS including the new next available position information updated in steps 2702, 2704 and 2707 and stored in the memory 170, in the TDMA as the new TDMS 700 in a write once manner. At this timing (in actuality, before the TDMA (DDS 701) is updated, because the DDS 701 includes the pointer information representing the position from which the drive area was used), the results of the calibration (calibration history) performed by the optical disc recording and reproduction apparatus 100 may be recorded in the drive inherent information area (also referred to as a "drive area") of the optical disc 1 as the recording calibration target when necessary.

The management information does not need to be updated after the recording calibration, and may be updated anytime before the optical disc 1 is discharged from the optical disc recording and reproduction apparatus 100.

Thus, the recording calibration processing is finished.

As described above, the information on the next available position (pointer information) in the recording calibration area A and the recording calibration area B is included in the management information (DDS 701). This eliminates the need to search for the next available position for each cycle of recording calibration, and allows the access position management section 154 to find the recording calibration position efficiently in step 2701. Thus, the efficiency of the entire recording calibration processing is improved (the time required for the recording calibration can be shortened). Especially, the recording calibration areas A are used from the layer farthest from the laser light incidence side. Therefore, if the next available position needs to be actually searched for, it may be necessary to access the recording calibration areas A in all the recording layers in the worst case. The effect of managing the recording calibration areas A in all the recording layers with one piece of pointer information is significant.

Regarding the recording calibration areas B, there is a restriction that the recording needs to be performed at a recording power generally suitable to the optical disc 1. Therefore, the recording calibration areas B need to be used after the recording calibration A (power calibration) is performed in the recording calibration area A at the earliest. In fact, the system control section 150 controls the recording calibration section 151 (the recording calibration section A 157 and the recording calibration section B 158) for performing the calibration in these areas, regarding the order of recording calibration.

Figure 27:
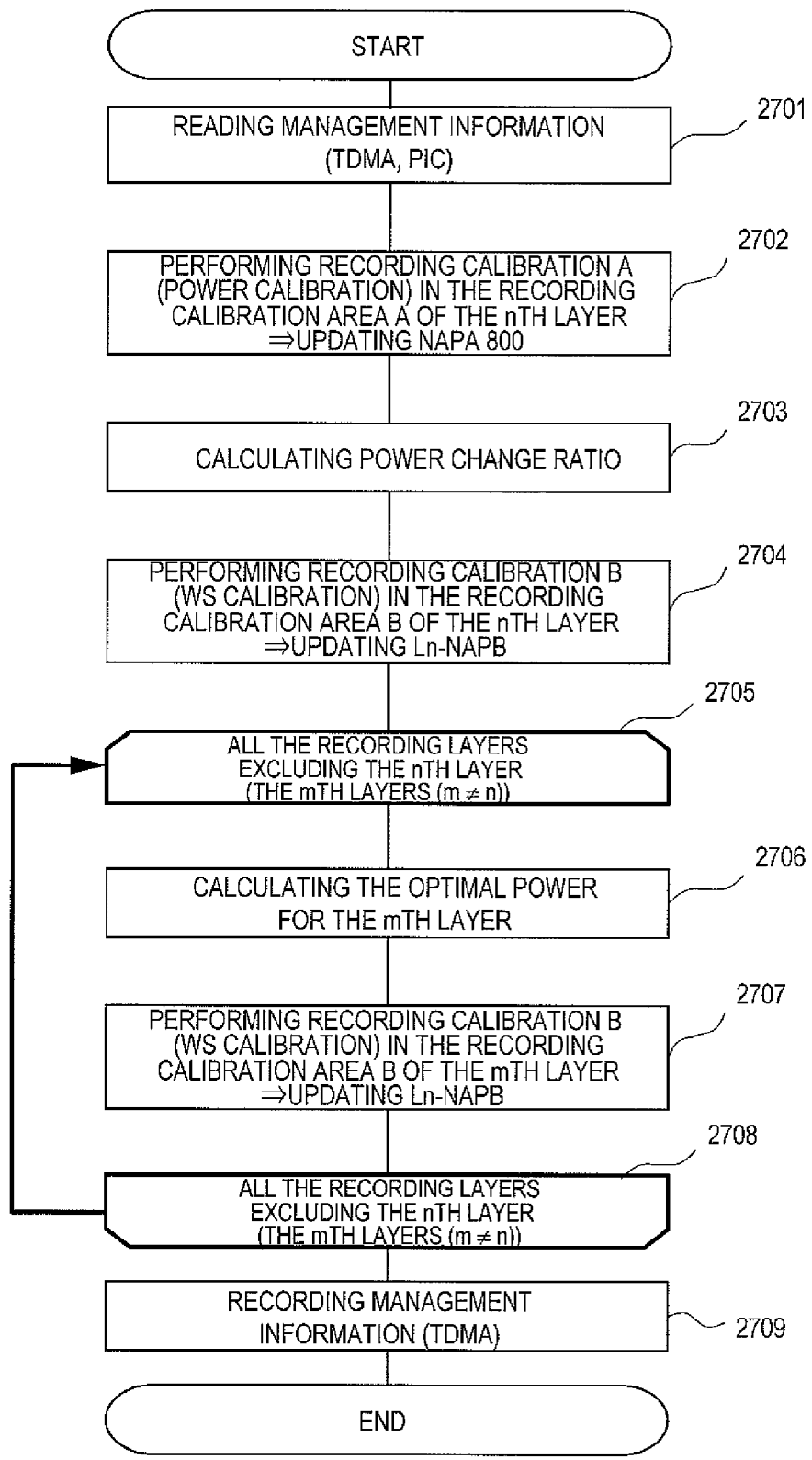
FIG. 27 shows a recording calibration procedure according to Embodiment 4 of the present invention.

In the above description given with reference to FIG. 27, the system control section 150 is explained as performing the total control of the recording calibration including the procedure of the series of processing, and the recording calibration section 151 (the recording calibration section A 157 and the recording calibration section B 158) is explained as performing an individual calibration operation in the recording calibration, such as power calibration, the strategy calibration or the like. Needless to say, the same effect is provided by means for realizing the processing (functions) corresponding to the above-described steps. Namely, the recording calibration section 151 may perform the total control of the recording calibration, or one means may realize a plurality of steps (functions).

In step 2705, the processing is repeated on the recording layers Lm (m is the layer number and is a positive number of 0 or greater which fulfills n≠m). Alternatively, the processing may be performed on all the recording layers including the layer of n=m. In this case, step 2704 of performing the calibration using the recording calibration area B in the recording layer Ln on which the recording calibration A was performed may be eliminated, and the processing in steps 2706 and 2707 may be performed in common on all the recording layers including the layer of n=m.

For example, in the case where the results of the calibration performed in the past by the optical disc recording and reproduction apparatus 100 (calibration history) are left in a drive inherent information area (also referred to as a "drive area") or the like of the optical disc 1 which is the recording calibration target, the strategy left in the calibration history may be used as the initial value of the strategy for the power calibration in step 2702. Alternatively, in the case where the calibration history is left, the processing may be controlled such that step 2704 of performing recording calibration B (strategy calibration, etc.) on the recording layer on which the recording calibration (power calibration) was performed using the recording calibration area A is not executed, or such that steps 2704 and 2707 regarding the recording calibration B are not performed on all the recording layers. Still alternatively, information corresponding to the power change ratio 2700 found in the past or information regarding the same (for example, temperature information when the calibration was performed in the past) may be left in the calibration history. In the case where the conditions of the current recording calibration fulfill the conditions left in the calibration history, the recording calibration A in the recording calibration area A in step 2702 may be skipped.

In step 2705, the recording calibration B is performed on all the recording layers except for the recording layer Ln. It is not necessary that the recording calibration B is performed on all the recording layers. It is sufficient that the processing up to the recording calibration B is performed on at least the recording layer(s) on which data is to be recorded in the management information area such as the data zone 14, the lead-in zone 13 or the like.

At the time when the recording calibration area A becomes short of an empty area for the new calibration (at the time when the recording calibration area A is used up) in all the recording layers, recording on the optical disc 1 is prohibited because new calibration cannot be performed thereon anymore. Similarly, in the case where the recording calibration B (strategy calibration, etc.) needs to be performed using the recording calibration area B in steps 2704 and 2707, at the time when the recording calibration area B in the target recording layer becomes short of an empty area for the new calibration (at the time when the recording calibration area B is used up), recording on the optical disc 1 (precisely, at least the target recording layer) is prohibited because new calibration cannot be performed thereon anymore.

For example, in the case where the results of the calibration performed in the past on the target recording layer by the optical disc recording and reproduction apparatus 100 (calibration history) are left in a drive inherent information area (also referred to as a "drive area") or the like of the optical disc 1, namely, the history information is used for the calibration, recording on the optical disc 1 is not necessarily prohibited in the following case as long as the recording calibration area B has a usable area: for example, in the case where the recording power for the target recording layer is adjustable by the recording calibration in the recording calibration area B, e.g., in the where the recording power for the target recording layer is guaranteed as being suitable.

In Embodiment 4 of the present invention, a write once optical disc is described as an example. Substantially the same idea may be applied to a rewritable optical disc. Substantially the same effects as described above can be provided in the following conditions. The recording layers each have a recording calibration area A and a recording B; the recording calibration areas A are used from the recording layer farthest from the laser light incidence side (for example, from the recording calibration area A 60 in the L0 layer); such a restriction is provided that when the recording calibration area A in the recording layer is determined not to be usable due to cycle deterioration or the like, the recording calibration area A in the next recording layer (for example, the recording calibration area A 61 in the L1 layer) should be used; and recording in the recording calibration areas B is performed at a recording power generally suitable to the optical disc 1. In the case of a rewritable optical disc, the recording calibration areas are also rewritable. Therefore, recording calibration may be performed at any position in the recording calibration area. For this reason, a rewritable optical disc does not need to keep the next available position information (NAPA 800, L0-NAPB 801, etc.), but needs to keep the position information on the next available recording calibration area A (physical address, recording layer number, etc.) in order to restrict the order of use of the recording calibration areas A.

(Embodiment 5)

<Main Parameters>

Examples of the recording mediums to which the present invention is applicable include Blu-ray disc (BD) and optical discs of other formats. Hereinafter, BDs will be described. There are the following types of BD in accordance with the characteristics of the recording layers: reproduction-only BD-ROM, write once BD-R, rewritable BD-RE and the like. The present invention is applicable to any of the R (write once) type and the RE (rewritable type) of BDs and other format recording mediums. The main optical constants and physical formats of the Blu-ray disc are disclosed in "Illustrated Blu-ray Disc Reader" (Blu-ray Handbook) published by Ohmsha, Ltd. or the white papers put on the web site of the Blu-ray Association (http://www.blu-raydisc.com/).

For the BD, laser light having a wavelength of about 405 nm (where the tolerable error range is ±5 nm with respect to the standard value of 405 nm, 400 to 410 nm) and an objective lens having a numerical value (NA) of about 0.85 (where the tolerable error range is ±0.01 nm with respect to the standard value of 0.85, 0.84 to 0.86) are used. The track pitch of the BD is about 0.32 μm (where the tolerable error range is 0.010 μm with respect to the standard value of 0.320 μm, 0.310 to 0.330 μm), and one or two recording layers are provided. One or two recording layers each having a recording surface are provided on the side on which the laser light is incident. The distance from the surface of a protective layer of the BD to the recording surface is 75 μm to 100 μm.

As the modulation system for a recording signal, 17PP modulation is used. The length of the shortest mark to be recorded (2T mark; T is a cycle of the reference clock (the reference cycle of modulation in the case where a mark is recorded by a prescribed modulation rule)) is 0.149 μm (or 0.138 μm) (channel bit length T is 74.50 nm (or 69.00 nm)). The recording capacity is 25 GB (or 27 GB) (more precisely, 25.025 GB (or 27.020 GB) where one layer is provided on one side, or 50 GB (or 54 GB) (more precisely, 50.050 GB (or 54.040 GB) where two layers are provided on one side. The channel clock frequency is 66 MHz (channel bit rate: 66.000 Mbits/s) at the standard transfer rate (BD1×), 264 MHz (channel bit rate: 264.000 Mbits/s) at the 4× transfer rate (BD4×), 396 MHz (channel bit rate: 396.000 Mbits/s) at the 6× transfer rate (BD6×) rate, and 528 MHz (channel bit rate: 528.000 Mbits/s) at the 8× transfer rate (BD8×).

The standard linear velocity (reference linear velocity, 1×) is 4.917 m/sec. (or 4.554 m/sec.). The linear velocity at 2×, 4×, 6× and 8× is respectively 9.834 m/sec., 19.668 m/sec., 29.502 m/sec., and 39.336 m/sec. A linear velocity higher than the reference liner velocity is generally a positive integral multiple of the reference liner velocity, but is not limited to an integral multiple and may be a positive real number multiple of the reference liner velocity. A linear velocity lower than the reference liner velocity, such as 0.5 times (0.5×), may also be defined.

The above description is regarding BDs already developed into commercial products, which include one layer or two layers and have a recording capacity per layer of, mainly, about 25 GB (or about 27 GB). For realizing a higher capacity, a high density BD having a recording capacity per layer of about 32 GB or about 33.4 GB and a BD including three or four layers are also under research, and these BDs will also be described below.

<Modulation>

Now, the modulation system of the recording signal will be briefly described.

For recording data (original source data/pre-modulation binary data) on a recording medium, the data is divided into parts of a prescribed size, and the data divided into parts of the prescribed size is further divided into frames of a prescribed length. For each frame, a prescribed sync. code/synchronization code stream is inserted (frame sync. area). The data divided into the frames is recorded as a data code stream modulated in accordance with a prescribed modulation rule matching the recording/reproduction signal characteristic of the recording medium (frame data area).

The modulation rule may be, for example, an RLL (Run Length Limited) coding system by which the mark length is limited. The notation "RLL(d,k)" means that the number of 0's appearing between 1 and 1 is d at the minimum and k at the maximum (d and k are natural numbers fulfilling d<k). For example, when d=1 and k=7, where T is the reference cycle of modulation, the length of the mark or space is 2T at the shortest and 8T at the longest. Alternatively, the modulation rule may be 1-7PP modulation, in which the following features [1] and [2] are added to the RLL(1,7) modulation. "PP" of 1-7PP is an abbreviation of Parity preserve/Prohibit Repeated Minimum Transition Length.

[1] "Parity preserve" represented by the first "P" means that whether the number of 1's of the pre-modulation source data bits is an odd number or an even number (i.e., Parity) matches whether the number of 1's of the corresponding post-modulation bit pattern is an odd number or an even number.

[2] "Prohibit Repeated Minimum Transition Length" represented by the second "P" means a mechanism for limiting the number of times the shortest marks and spaces are repeated on the post-modulation recording wave (specifically, a mechanism for limiting the number of times 2T is repeated to 6).

<Frame Sync Pattern>

The prescribed modulation rule is not applied to the sync. code/synchronization code stream inserted between the frames. Therefore, the sync. code/synchronization code stream can have a pattern other than the code length restricted by the modulation rule. The sync. code/synchronization code stream determines the reproduction processing timing for reproducing the recorded data and so may include any of the following patterns.

From the viewpoint of allowing the sync. code/synchronization code stream to be distinguished from the data code stream more easily, a pattern which does not appear in the data code stream may be included. For example, a mark/space longer than the longest mark/space included in the data code stream or a repetition of such a mark/space may be included. Where the modulation system is 1-7 modulation, the length of the mark or space is limited to 2T through 8T. Therefore, a 9T mark/space (9TM and/or 9TS) longer than 8T mark/space, or a repetition of a 9T mark/space (9T/9T) may be included, for example.

From the viewpoint of facilitating the synchronization lock-up processing or the like, a pattern having many mark-space transfers (zero-cross points) may be included. For example, among marks/spaces included in the data code stream, a relatively short mark/space or a repetition of such a mark/space may be included. Where the modulation system is 1-7 modulation, a 2T mark/space (2TM and/or 2TS) which is shortest, a repetition thereof (2T/2T), a 3T mark/space (3TM and/or 3TS) which is second shortest or a repetition thereof (3T/3T) may be included, for example. Depending on the wavelength, numerical aperture, channel bit length, recording density or the like, a mark and/or space of a length which does not provide a sufficient reproduction characteristic may be included. In such a case, the mark and/or space of a length which does not provide a sufficient reproduction characteristic or a shorter mark and/or space (for example, the shortest mark and/or space) may be excluded.

<Inter-Code Distance of the Frame Sync.>

Here, an area including the synchronization code stream and the data code stream is referred to as a "frame area", and a unit including a plurality of (e.g., 31) frame areas is referred to as an "sector" (or "address unit"). In a sector, an inter-code distance between a synchronization code stream included in an arbitrary frame area of the sector and a synchronization code stream included in a frame area other than the arbitrary frame area may be 2 or greater. The "inter-code distance" means the number of bits which are different between two code streams. Owing to the arrangement in which the inter-code distance is 2 or greater, even if a 1-bit shift error occurs in one of the streams to be read due to an influence of noise or the like during reproduction, such a stream is not identified as the other stream by mistake. Alternatively, the inter-code distance between a synchronization code stream included in a frame area located at the start of the sector and a synchronization code stream included in a frame area located at a position other than the start of the sector may be 2 or greater. Owing to such an arrangement, it is easily distinguished whether the synchronization code stream is at the start or not, or whether the synchronization code stream is at the junction of address units or not.

The term "inter-code distance" encompasses an inter-code distance in an NRZ notation of the code stream in the case of NRZ recording and also an inter-code distance in an NRZI notation of the code stream in the case of NRZI recording. Therefore, in the case of recording performed by the RLL modulation, "RLL" means that the number of continuous high-level or low-level signals on the recording wave of NRZI is limited and so means that the inter-code distance is 2 or greater in the NRZI notation.

<Recording System: In-Groove/On-Groove>

Now, the recording system will be described. By forming a groove in a medium, groove parts and inter-groove parts between groove parts are formed. There are various recording systems; namely, data may be recorded in the groove parts, in the inter-groove parts, or both in the groove parts and the inter-groove parts. A system of recording on a convex side as seen from the light incidence surface, among the groove parts and the inter-groove parts, is called "on-groove system", whereas a system of recording on a concave side as seen from the light incidence surface is called "in-groove system". According to the present invention, it is not specifically limited whether the on-groove system is used, the in-groove system is used, or a system of permitting either one of the two systems is used.

In the case of using the system of permitting either one of the two systems, recording system identification information which indicates whether the on-groove system is used or the in-groove system is used may be recorded on the medium, so that the recording system of the medium, the on-groove system or the in-groove system, can be easily identified. For a multi-layer information recording medium, recording system identification information on each layer may be recorded. In such a case, recording system identification information on all the layers may be recorded on a reference layer (the layer farthest from the light incidence surface (L0), the layer closest to the light incidence surface, the layer to which the optical head is determined to access first after the optical disc apparatus is started, etc.). Alternatively, recording system identification information on each layer may be recorded on the respective layer, or recording system identification information on all the layers may be recorded on each layer.

The areas in which the recording system identification information can be recorded include a BCA (Burst Cutting area), a disc information area (an area which is inner or/and outer to the data recording area and mainly stores control information; in the reproduction-only area, such an area may have a track pitch larger than that of the data recording area), a wobble (recorded in superimposition on the wobble), and the like. The recording system identification information may be recorded in any one of these areas, a plurality of areas among these areas, or all of these areas.

The wobble start direction may be opposite between the on-groove system and the in-groove system. Namely, where the wobble start direction in the on-groove system is from the inner side of the disc, the wobble start direction in the in-groove system may be from the outer side of the disc (alternatively, where the wobble start direction in the on-groove system is from the outer side of the disc, the wobble start direction in the in-groove system may be from the inner side of the disc). By setting the wobble start direction to be opposite between the on-groove system and the in-groove system in this manner, the tracking polarity can be the same whichever system, the on-groove system or the in-groove system, may be used. The reason is as follows. In the on-groove system, the recording is made on the convex side as seen from the light incidence surface, whereas in the in-groove system, the recording is made on the concave side as seen from the light incidence surface. Therefore, if the groove depth is the same in these systems, the tracking polarity is opposite. By setting the wobble start direction to be opposite between the two systems, the tracking polarity can be made the same.

<Recording Characteristic and Reflectance: High to Low, Low to High>

A recording film can have the following two recording characteristics because of the relationship between the reflectance of the recorded part and the reflectance of the unrecorded part. They are HtoL characteristic at which the reflectance of the unrecorded part is higher than the reflectance of the recorded part (High-to-Low), and LtoH characteristic at which the reflectance of the unrecorded part is lower than the reflectance of the recorded part (Low-to-High). According to the present invention, it is not specifically limited whether the HtoL characteristic is used, the LtoH characteristic is used, or either one of the two is permissible as the characteristic of the recording film of the medium.

In the case where either one of the two is permissible, recording film characteristic identification information which indicates whether the recording film has the HtoL characteristic or the LtoH characteristic may be recorded on the medium, so that it can be easily identified which characteristic the recording film has. For a multi-layer information recording medium, recording film characteristic identification information on each layer may be recorded. In such a case, recording film characteristic identification information on all the layers may be recorded on a reference layer (the layer farthest from the light incidence surface (L0), the layer closest to the light incidence surface, the layer to which the optical head is determined to access first after the optical disc apparatus is started, etc.). Alternatively, recording film characteristic identification information on each layer may be recorded on the respective layer, or recording film characteristic identification information on all the layers may be recorded on each layer.

The areas in which the recording film characteristic identification information can be recorded include a BCA (Burst Cutting area), a disc information area (an area which is inner or/and outer to the data recording area and mainly stores control information; in the reproduction-only area, such an area may have a track pitch larger than that of the data recording area), a wobble (recorded in superimposition on the wobble), and the like. The recording film characteristic identification information may be recorded in any one of these areas, a plurality of areas among these areas, or all of these areas.

<Multiple Layers>

Figure 29:
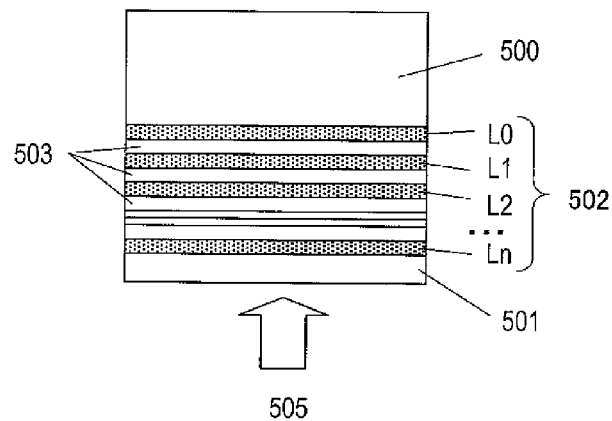
FIG. 29 shows an example of a structure of a multi-layer disc.

In the case of a one-sided disc used for information reproduction and/or recording with laser light incident on the side of the protective layer, where there are two or more recording layers, there are a plurality of recording layers between the substrate and the protective layer. An example of a structure of such a multi-layer disc is shown in FIG. 29. The disc shown here includes (n+1) information recording layers 502 (n is an integer of 0 or greater). A specific structure of the optical disc is as follows. A cover layer 501, the (n+1) information recording layers (Ln through L0 layers) 502, and a substrate 500 are sequentially stacked from a surface on which laser light 505 is incident. Between each two adjacent layers of the (n+1) information recording layers 502, an intermediate layer 503 acting as an optical buffer member is inserted. The reference layer (L0) is provided at a deepest position which is away from the light incidence surface by a prescribed distance (a position closest to the light source), and the other layers (L1, L2, . . . Ln) are stacked on the reference layer (L0) toward the light incidence surface.

The distance from the light incidence surface to the reference layer L0 of the multi-layer disc may be substantially the same as the distance from the light incidence surface to the recording layer of a single layer disc (e.g., about 0.1 mm). By keeping the distance to the deepest (farthest) layer the same regardless of the number of layers in this manner (i.e., by making the distance the same as the distance in the single layer disc), the following effects are provided. The compatibility can be maintained between a single layer disc and a multi-layer disc regarding the access to the reference layer. In addition, the influence of the tilt is prevented from being increased even when the number of layers increases, for the following reason. The deepest layer is most influenced by the tilt. However, in the case where the distance to the deepest layer is made the same as the distance in the single layer disc, the distance to the deepest layer is not increased even if the number of layers increases.

Regarding the spot advancing direction (also referred to as the "track direction or spiral direction"), either the parallel path or the opposite path is usable.

By the parallel path, the reproduction direction is the same in all the layers. Namely, the spot advancing direction is from the inner side toward the outer side in all the layers, or from the outer side toward the inner side in all the layers.

By the opposite path, the reproduction direction in one layer is opposite to the reproduction direction in a layer adjacent thereto. Specifically, where the spot advancing direction is from the inner side toward the outer side in the reference layer (L0), the reproduction direction is from the outer side toward the inner side in the recording layer L1 and is from the inner side toward the outer side in the recording layer L2. Namely, the reproduction direction is from the inner side toward the outer side in the recording layer Lm (m is 0 or an even number) and is from the outer side toward the inner side in the recording layer Lm+1. Alternatively, the reproduction direction is from the outer side toward the inner side in the recording layer Lm (m is 0 or an even number) and is from the inner side toward the outer side in the recording layer Lm+1.

The thickness of the protective layer (cover layer) is set to be smaller because the numerical aperture (NA) is higher and so the focal distance is shorter, and also in order to suppress the influence of the distortion of the spot caused by the tilt. The numerical aperture NA is set to about 0.85 for the BD whereas the numerical aperture NA is set to 0.45 for the CD and 0.65 for the DVD. For example, among the total thickness of the recording medium of about 1.2 mm, the thickness of the protective layer may be 10 to 200 µm. More specifically, on a substrate having a thickness of about 1.1 mm, a transparent protective layer having a thickness of about 0.1 mm may be provided in the case of a single layer disc, and a protective layer having a thickness of about 0.075 mm and an intermediate layer (spacer layer) having a thickness of about 0.025 mm may be provided in the case of a two-layer disc. For a disc including three or more layers, the thickness of the protective layer and/or space layer may be thinner.

Regarding the various formats and systems described above, when the recording density (recording capacity per layer) increases, a plurality of recording densities may be possibly provided. Depending on the difference in the recording density or the number of recording layers, a part of the plurality of recording densities may be adopted and another part thereof may not be adopted while another format or system is adopted. Hereinafter, a multi-layer disc (especially, a three-layer disc) and a high density disc (for example, having a capacity per layer of 30 GB) will be described.

<Structural Examples of Discs Having one Through Four Layers>

Figure 30:
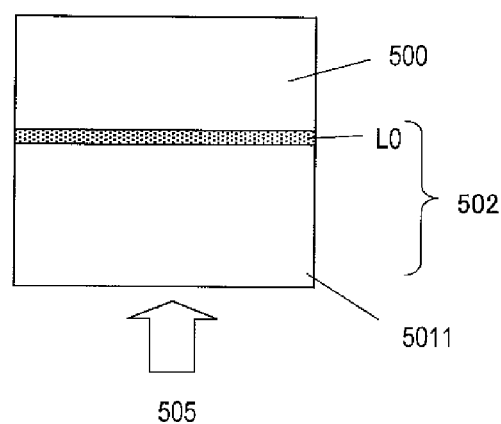
FIG. 30 shows an example of a structure of a single layer disc.
Figure 31:
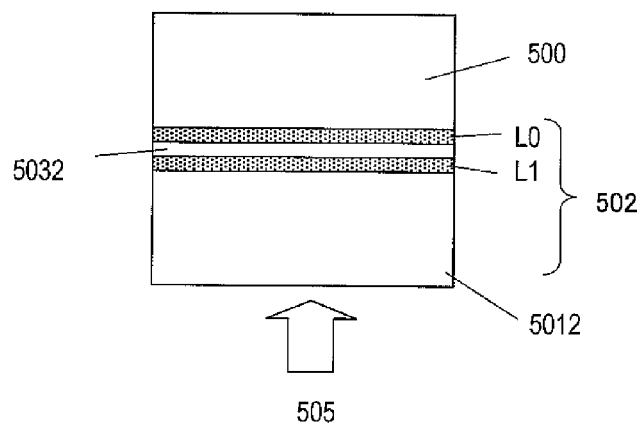
FIG. 31 shows an example of a structure of a two-layer disc.
Figure 32:
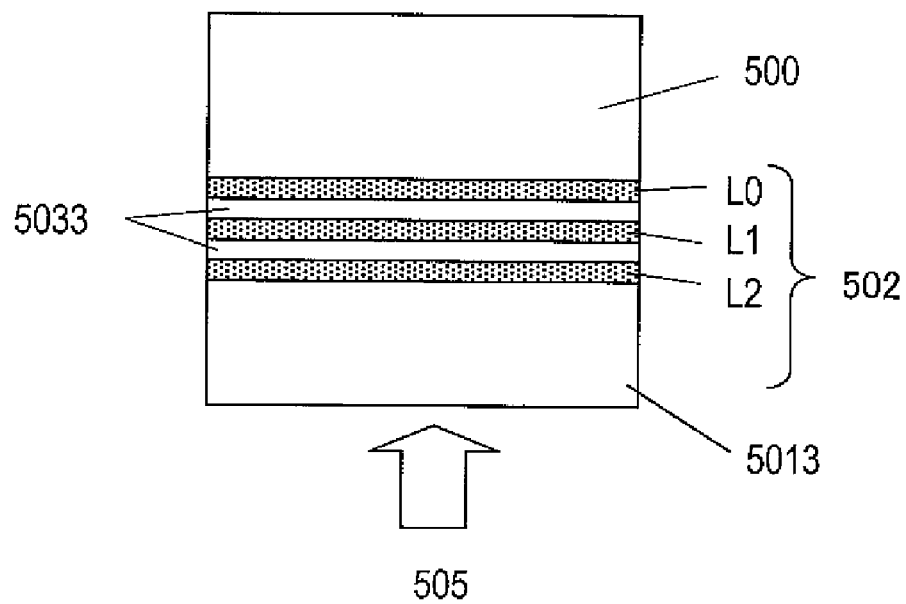
FIG. 32 shows an example of a structure of a three-layer disc.
Figure 33:
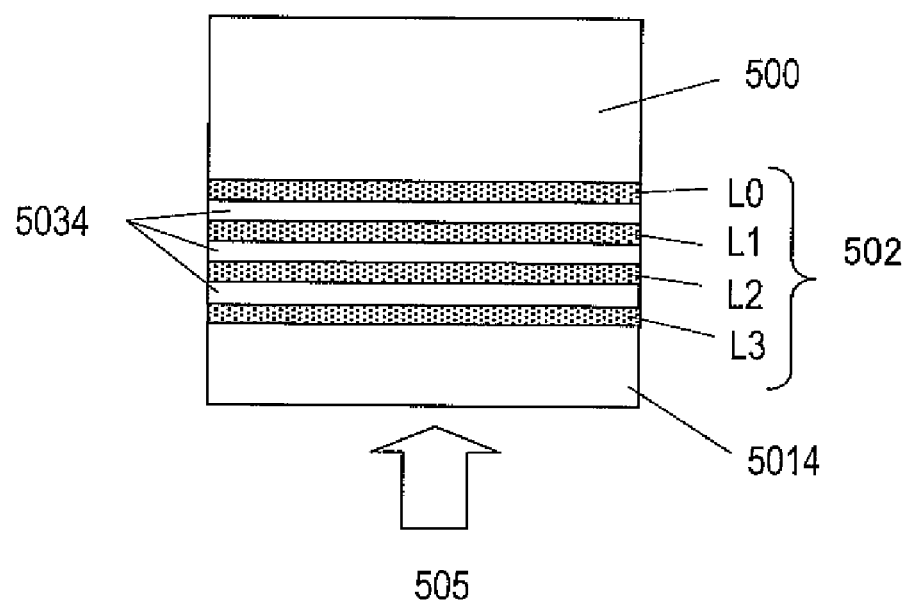
FIG. 33 shows an example of a structure of a four-layer disc.

Now, FIG. 30 shows an example of a structure of a single layer disc, FIG. 31 shows an example of a structure of a two-layer disc, FIG. 32 shows an example of a structure of a three-layer disc, and FIG. 33 shows an example of a structure of a four-layer disc. As described above, where the distance from the light incidence surface to the reference layer L0 is made the same, the total thickness of the disc is about 1.2 mm (it is preferable that the total thickness is equal to or less than 1.40 mm including label printing or the like), the thickness of the substrate 500 is about 1.1 mm, and the distance from the light incidence surface to the reference layer L0 is about 0.1 mm in any of the discs shown in FIG. 31 through FIG. 33. In the single layer disc shown in FIG. 30 (n=0 in FIG. 29), the thickness of a cover layer 5011 is about 0.1 mm. In the two-layer disc shown in FIG. 31 (n=1 in FIG. 29), the thickness of a cover layer 5012 is about 0.075 mm and the thickness of a space layer 5032 is about 0.025 mm. In the three-layer disc shown in FIG. 32 (n=2 in FIG. 29) and the four-layer disc shown in FIG. 33 (n=3 in FIG. 29), the thickness of cover layers 5013 and 5014 and/or the thickness of space layers 5033 and 5034 are still thinner.

(Embodiment 6)

Figure 34:
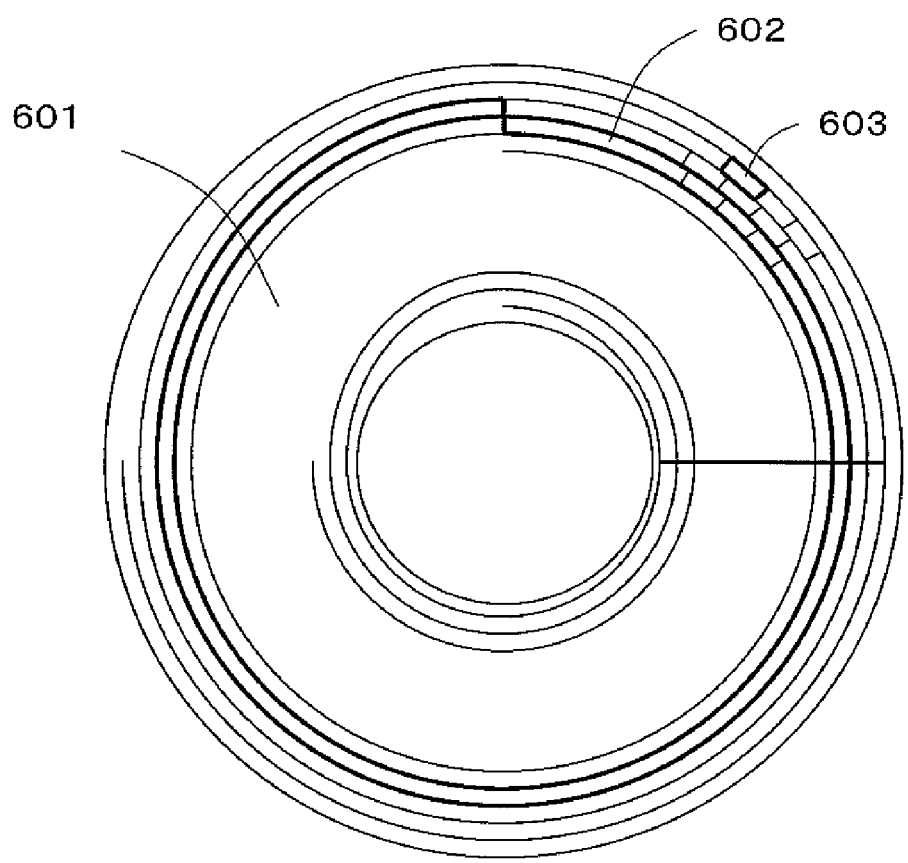
FIG. 34 shows a physical structure of an optical disc 601 according to Embodiment 5.

FIG. 34 shows a physical structure of an optical disc 1 according to this embodiment. In the discus-shaped optical disc 601, a great number of tracks 602 are formed concentrically or in a spiral, for example. In each track 602, a great number of tiny sectors are formed. As described later, data is recorded on each track 602 in units of blocks 603 each having a predetermined size.

The optical disc 601 according to this embodiment has an expanded recording capacity per information recording layer as compared with a conventional optical disc (for example, a BD of 25 GB). The recording capacity is expanded by raising the recording linear density, for example, by decreasing the length of a recording mark recorded on the optical disc. Here, the expression "raising the recording linear density" means to decrease the channel bit length. The "channel bit length" refers to a length corresponding to cycle T of the reference clock (the reference cycle T of modulation in the case where a mark is recorded by a prescribed modulation rule). The optical disc 1 may include a plurality of layers. In the following, only one information recording layer will be described for the convenience of explanation. Even where the width of the track is the same among a plurality of layers provided in the optical disc, the recording linear density may be varied on a layer-by-layer basis by making the mark length different among different layers while making the mark length the same in the same layer.

The track 602 is divided into blocks by a data recording unit of 64 kB (kilobytes), and the blocks are sequentially assigned block address values. Each block is divided into sub blocks each having a prescribed length. Three sub blocks form one block. The sub blocks are assigned sub block numbers of 0 through 2 from the first sub block.

<Recording Density>

Now, the recording density will be described with reference to FIG. 35, FIG. 36 and FIG. 37.

FIG. 35(A) shows an example of a 25 GB BD. For the BD, the wavelength of laser light 623 is 405 nm and the numerical aperture (NA) of an objective lens 220 is 0.85.

Like in the case of a DVD, also in the case of a BD, the recording data is recorded as marks 620 and 621 formed by a physical change on the track 602 of the optical disc. A mark having the shortest length among these marks is referred to as the "shortest mark". In the figure, the mark 621 is the shortest mark.

When the recording capacity is 25 GB, the physical length of the shortest mark 621 is 0.149 µm. This corresponds to about ½.7 of that of a DVD. Even if the resolving power of the laser light is raised by changing the wavelength parameter (405 nm) and the NA parameter (0.85) of the optical system, the physical length of the shortest mark is close to the limit of the optical resolving power, i.e., the limit at which a light beam can identify a recording mark.

Figure 36:
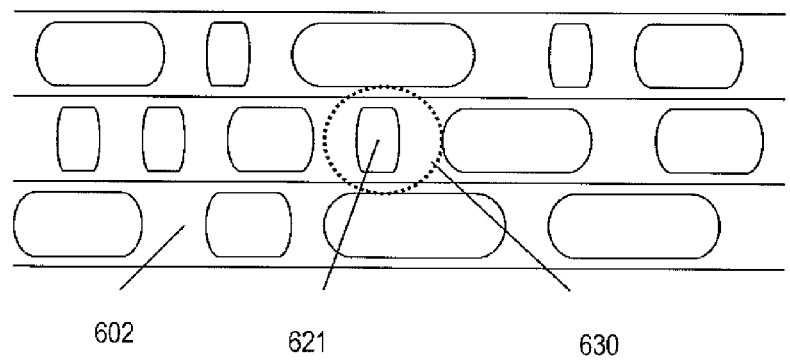
FIG. 36 shows how a mark stream recorded on a track is irradiated with a light beam.

FIG. 36 shows how a mark stream recorded on the track is irradiated with a light beam. In the case of a BD, an optical spot 630 has a diameter of about 0.39 µm because of the above-mentioned parameters of the optical system. When the recording linear density is raised without changing the structure of the optical system, the recording mark becomes smaller with respect to the diameter of the optical spot 630, and therefore the resolving power for reproduction is declined.

For example, FIG. 35(B) shows an example of an optical disc having a recording density higher than that of the 25 GB BD. For this disc also, the wavelength of the laser light 623 is 405 nm and the numerical aperture (NA) of an objective lens 720 is 0.85. A mark shortest among the marks 625 and 624 of the disc, namely, the mark 625, has a physical length of 0.1115 μm. In the disc in FIG. 35(B), as compared with the disc shown in FIG. 35(A), the diameter of the spot is the same at about 0.39 μm but the recording mark is smaller and the inter-mark gap is narrower. Therefore, the resolving power for reproduction is declined.

An amplitude of a reproduction signal obtained by reproducing a recording mark using a light beam decreases as the recording mark is shortened, and becomes almost zero at the limit of the optical resolving power. The inverse of the cycle of the recording mark is called "spatial frequency", and the relationship between the spatial frequency and the signal amplitude is called OTF (Optical Transfer Function). The signal amplitude decreases almost linearly as the spatial frequency increases. The critical frequency for reproduction at which the signal amplitude becomes zero is called "OTF cutoff".

Figure 37:
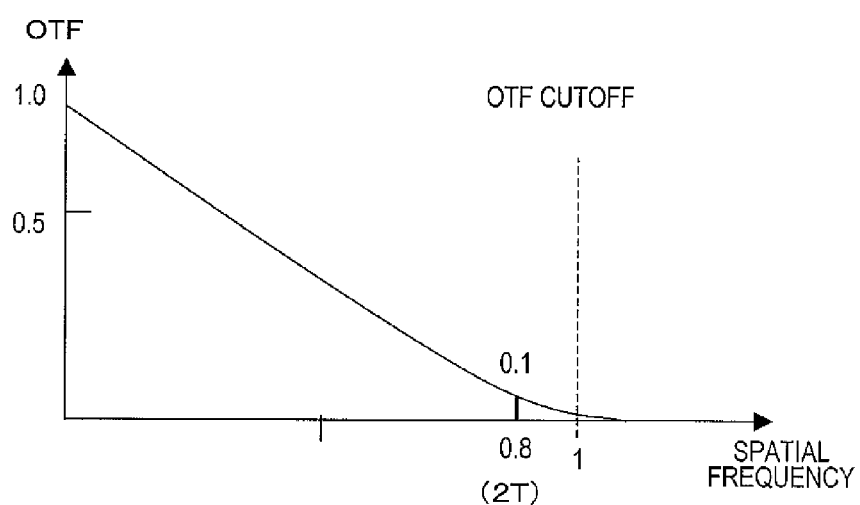
FIG. 37 shows the relationship between the OTF and the shortest recording mark when the recording capacity is 25 GB.

FIG. 37 is a graph showing the relationship between the OTF and the shortest recording mark when the recording capacity is 25 GB. The spatial frequency of the shortest recording mark of the BD is about 80% with respect to the OTF cutoff, which is close to the OTF cutoff. It is also seen that the amplitude of the reproduction signal of the shortest mark is very small at about 10% of the maximum detectable amplitude. For the BD, the recording capacity at which the spatial frequency of the shortest recording mark is very close to the OTF cutoff, i.e., the recording capacity at which the reproduction amplitude of the shortest mark is almost zero, is about 31 GB. When the frequency of the reproduction signal of the shortest mark is around, or exceeds, the OFF cutoff frequency, the resolving power of the laser light is close to the limit or may exceed the limit. In such an area, the amplitude of the reproduction signal decreases and the S/N ratio is drastically deteriorated.

Therefore, with the recording linear density which is assumed for the high density optical disc shown in FIG. 35(B), the frequency of the shortest mark of the reproduction signal is in the vicinity of the OTF cutoff (including a case where the frequency is equal to or lower than the OTF cutoff, but is not significantly lower than the OTF cutoff) or equal to or higher than the OTF cutoff.

Figure 38:
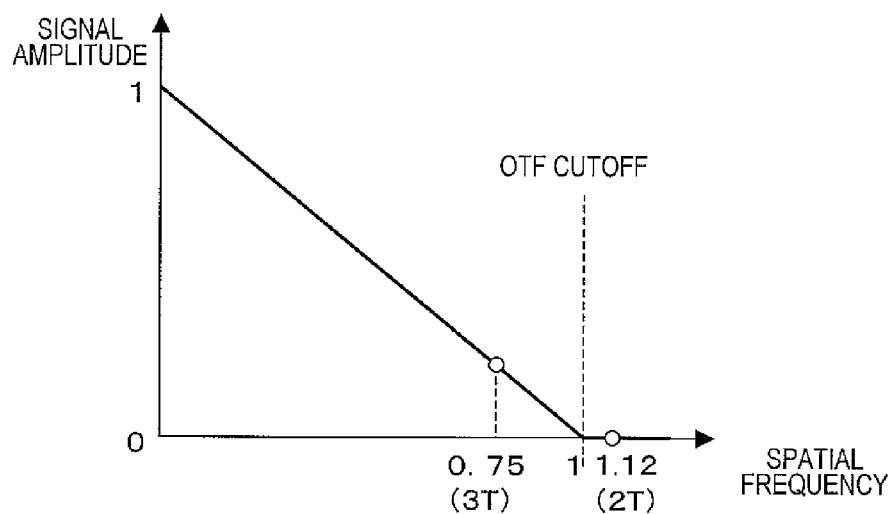
FIG. 38 shows an example in which the spatial frequency of the shortest mark (2T) is higher than the OTF cutoff frequency and the amplitude of a 2T reproduction signal is 0.

FIG. 38 is a graph showing an example the relationship between the signal amplitude and the spatial frequency when the spatial frequency of the shortest mark (2T) is higher than the OTF cutoff frequency and the amplitude of a 2T reproduction signal is 0. In FIG. 38, the spatial frequency of the shortest mark (2T) is 1.12 times of the OTF cutoff frequency.

<Relationship Among the Wavelength, Numerical Aperture and Mark Length>

The relationship among the wavelength, numerical aperture and length of a mark/space of a higher recording density disc B is as follows.

Where the shortest mark length is TM nm and the shortest space length is TS nm, (shortest mark length+shortest space length) P is represented as (TM+TS) nm. In the case of 17 modulation, P=2T+2T=4T. Where the three parameters, i.e., the laser light wavelength λ (405 nm±5 nm, i.e., 400 to 410 nm), the NA (0.85±0.01, i.e., 0.84 to 0.86), and the length P of the shortest mark+the shortest space (in the case of 17 modulation, P=2T+2T=4T because the shortest length is 2T) are used, when the reference T decreases to fulfill P≦λ/2NA, the spatial frequency of the shortest mark exceeds the OTF cutoff frequency.

The reference T corresponding to the OTF cutoff frequency when NA=0.85 and λ=405 nm is:
T=405/(2×0.85)/4=59.558 nm. (When P>λ/2NA, the spatial frequency of the shortest mark is lower than the OTF cutoff frequency.)

In this manner, merely by increasing the recording linear density, the S/N ratio is deteriorated by the limit of the optical resolution. The deterioration of the S/N ratio caused by increasing the number of information recording layers may be occasionally intolerable from the viewpoint of the system margin. As described above, the deterioration of the S/N ratio is conspicuous especially where the frequency of the shortest mark is higher than the OTF cutoff frequency.

In the above, the frequency of the reproduction signal of the shortest mark and the OTF cutoff frequency are compared in relation with the recording density. When the density improvement is more advanced, a recording density (recording linear density, recording capacity) corresponding to each case can be set by the principle described above based on the relationship between the frequency of the reproduction signal of the next shortest mark (also the shortest mark next to the next shortest mark (also the next shortest mark and the recording marks which become gradually less shorter in this manner) and the OTF cutoff frequency.

<Recording Density and the Number of Layers>

For a BD usable with laser light having a wavelength of 405 nm and an objective lens having a numerical aperture of 0.85, the following can be considered as a specific recording capacity per layer in the case where the frequency of the shortest mark is in the vicinity of the OTF cutoff: about 29 GB (e.g., 29.0 GB±0.5 GB or 29 GB±1 GB, etc.) or larger, about 30 GB (e.g., 30.0 GB±0.5 GB or 30 GB±1 GB, etc.) or larger, about 31 GB (e.g., 31.0 GB±0.5 GB or 31 GB±1 GB, etc.) or larger, about 32 GB (e.g., 32.0 GB±0.5 GB or 32 GB±1 GB, etc.) or larger, and the like.

In the case where the frequency of the shortest mark is equal to or higher than the OTF cutoff, the following can be considered as a recording capacity per layer: about 32 GB (e.g., 32.0 GB±0.5 GB or 32 GB±1 GB, etc.) or larger, about 33 GB (e.g., 33.0 GB±0.5 GB or 33 GB±1 GB, etc.) or larger, about 33.3 GB (e.g., 33.3 GB±0.5 GB or 33.3 GB±1 GB, etc.) or larger, about 33.4 GB (e.g., 33.4 GB±0.5 GB or 33.4 GB±1 GB, etc.) or larger, about 34 GB (e.g., 34.0 GB±0.5 GB or 34 GB±1 GB, etc.) or larger, about 35 GB (e.g., 35.0 GB±0.5 GB or 35 GB±1 GB, etc.) or larger, and the like.

Especially where the recording density is about 33.3 GB, a recording capacity of about 100 GB (99.9 GB) is realized with three layers. Where the recording density is about 33.4 GB, a recording capacity of 100 GB or greater (100.2 GB) is realized with three layers. This generally matches the recording capacity of a BD including four layers each having a recording density of 25 GB. For example, where the recording density is 33 GB, 33×3=99 GB, which is different from 100 GB by 1 GB (equal to or less than 1 GB). Where the recording density is 34 GB, 34×3=102 GB, which is different from 100 GB by 2 GB (equal to or less than 2 GB). Where the recording density is 33.3 GB, 33.3×3=99.9 GB, which is different from 100 GB by 0.1 GB (equal to or less than 0.1 GB). Where the recording density is 33.4 GB, 33.4×3=100.2 GB, which is different from 100 GB by 0.2 GB (equal to or less than 0.2 GB).

As described above, when the recording density is significantly expanded, precise reproduction becomes difficult because of the influence of the reproduction characteristic of the shortest mark. A recording density which is suppressed from being expanded significantly but realizes a recording capacity of 100 GB or greater, about 33.4 GB is realistically usable.

In this situation, there are the following alternatives for the disc structure: including four layers each having 25 GB, or including three layers each having 33 to 34 GB. When the number of layers increases, the reproduction signal amplitude of each recording layer is decreased (the S/N ratio is deteriorated) or the influence of multi-layer stray light (signal from an adjacent recording layer) is exerted, for example. A disc including three layers each having 33 to 34 GB, as opposed to a disc including four layers each having 25 GB, can realize a recording capacity of about 100 GB while suppressing the influence of the stray light as much as possible, i.e., with a smaller number of layers (with three layers as opposed to four layers). Thus, a disc manufacture wishing to realize about 100 GB while avoiding the increase of the number of the layers as much as possible can choose a disc including three layers each having 33 to 34 GB. By contrast, a disc manufacturer wishing to realize about 100 GB while keeping the conventional format (the recording density of 25 GB) can choose a disc including four layers each having 25 GB. In this manner, manufacturers with different purposes can realize the respective purposes with different structures. This provides a certain degree of freedom in disc designing.

Where the recording density per layer is about 30 to 32 GB, a recording capacity of 120 GB or greater is realized with a four-layer disc although 100 GB is not reached by a three-layer disc (about 90 to 96 GB). Where the recording density is about 32 GB, a four-layer disc realizes a recording capacity of about 128 GB. The numerical value of 128 matches a power of 2 (seventh power of 2) which is convenient to be processed by a computer. As compared to the disc realizing about 100 GB with three layers, the disc realizing about 128 GB with four layers has less influence on the reproduction characteristic of the shortest mark.

Based on this, for expanding the recording density, a plurality of recording densities may be provided (for example, about 32 GB and about 33.4 GB) and combined with a plurality of numbers of layers. In this manner, the disc manufacturers can be provided with a certain degree of freedom in designing. For example, a manufacturer wishing to increase the capacity while suppressing the influence of a larger number of layers can choose to produce a three-layer disc of about 100 GB. A manufacture wishing to increase the capacity while suppressing the influence on the reproduction characteristic can choose to produce a four-layer disc of about 120 GB in which each of four layers has 30 to 32 GB.

Industrial Applicability

An information recording medium according to the present invention is applicable to a write once optical disc and a rewritable optical disc including a plurality of recording layers.

An information recording and reproduction method according to the present invention is applicable to, for example, an optical disc drive apparatus capable of performing recording to, or reproducing from, a write once optical disc and a rewritable optical disc including a plurality of recording layers.

REFERENCE SIGNS LIST 1 optical disc
2 substrate
3, 5, 7 recording layer
4, 6 intermediate layer
8 cover layer
11 track
12 block
13 lead-in zone
14 data zone
15 lead-out zone
20, 21, 22, 23 power calibration area
30, 31, 32 strategy calibration area
40 reserved area
50 OPC areas
51 power calibration
52 strategy calibration
60, 61, 62 recording calibration area A
70, 71, 72 recording calibration area B
100 optical disc recording and reproduction apparatus
110 instruction processing section
120 optical head
130 laser control section
140 recording compensation circuit
150 system control section
151 recording calibration section
152 power calibration section
153 strategy calibration section
154 access position management section
155 recording control section
156 reproduction control section
157 recording calibration section A
158 recording calibration section B
160 mechanical control section
170 memory
180 I/O bus
200 first recording calibration area
201 second recording calibration area
210 reserved area
400 area on which recording is performed
401, 402 range influenced by laser light
410, 411 range irradiated with laser light
700 IDMS
701 DDS
702 DFL
710 identifier
711 DFL position information
712, 713, 714 power calibration area next available position information
715, 716, 717 strategy calibration area next available position information
718 other information
800 recording calibration area A next available position information
801, 802, 803 recording calibration area B next available position information
1301 power calibration area inner side next available position information
1302 power calibration area outer side next available position information
1701, 1705, 1709 power calibration end position information
1702, 1706, 1710 power calibration next available position information
1703, 1707, 1711 strategy calibration end position information
1704, 1708, 1712 strategy calibration next available position information
2700 power change ratio

The invention claimed is:

1. An information recording medium, wherein data is recorded on at least one of a plurality of recording layers by laser light incident on a surface of the information recording medium, wherein:

the plurality of recording layers include a first recording layer, and second through N-th recording layers (N is an integer of 3 or greater) which are sequentially located in a direction from the first recording layer toward the surface on which the laser is incident;

each of the plurality of recording layers has a first calibration area and a second calibration area located outer to the first calibration area;

the first calibration area located in each of the first through N-th recording layers is located at a different radial position from a radial position of the first calibration area in each of the other recording layers; and the second calibration area located in each of the first through N-th recording layers is located at the same radial position as a radial position of the second calibration area in each of the other recording layers.

2. The information recording medium of claim 1, wherein a varying rate width of a recording power used for the second calibration area is equal to or smaller than a varying rate width of a recording power used for the first calibration area.

3. The information recording medium of claim 1, wherein:
the first through N-th recording layers are each assigned physical addresses;
the physical addresses in the first recording layer are assigned in an ascending order from an inner side toward an outer side, the physical addresses in the second recording layer are assigned in an ascending order from the outer side toward the inner side, and the physical addresses in the third recording layer are assigned in an ascending order from the inner side toward the outer side; and
the first calibration area and the second calibration area located in the first recording layer are used from the outer side toward the inner side, the first calibration area and the second calibration area located in the second recording layer are used from the inner side toward the outer side, and the first calibration area and the second calibration area located in the third recording layer are used from the outer side toward the inner side.

4. A recording method for recording information on the information recording medium of claim 1, the recording method comprising the steps of:
performing recording calibration in at least one of the first calibration area and the second calibration area; and
recording information on the information recording medium based on a result of the recording calibration.

5. A reproduction method for reproducing information from the information recording medium of claim 1, wherein at least one of the first through N-th recording layers of the information recording medium has a control area in which information on the information recording medium is recorded;
the reproduction method comprising the step of reproducing information on the information recording medium from the control area.

6. A recording method for recording information on the information recording medium of claim 1, wherein each of the plurality of recording layers has a recording calibration area usable for performing recording calibration to find an optimal recording condition; and
by the recording method, the recording calibration is performed only on a k-th (k is an integer of 1 or greater and N or smaller) recording layer at the timing when recording is performed on the k-th recording layer for the first time.

* * * * *